US012786043B2

(12) United States Patent
Boyle, III et al.

(10) Patent No.: US 12,786,043 B2
(45) Date of Patent: *Nov. 3, 2026

(54) METHODS, APPARATUS AND SYSTEMS FOR EFFICIENT CROSS-LAYER NETWORK ANALYTICS

(71) Applicant: Ribbon Communications Operating Company, Inc., Westford, MA (US)

(72) Inventors: Charles W. Boyle, III, Upton, MA (US); Ashish Sharma, Bangalore (IN)

( * ) Notice: Subject to any disclaimer, the term of this patent is extended or adjusted under 35 U.S.C. 154(b) by 162 days.

This patent is subject to a terminal disclaimer.

(21) Appl. No.: 18/656,216

(22) Filed: May 6, 2024

(65) Prior Publication Data

US 2024/0291709 A1 Aug. 29, 2024

Related U.S. Application Data

(63) Continuation of application No. 17/499,858, filed on Oct. 12, 2021, now Pat. No. 11,979,270.

(30) Foreign Application Priority Data

Oct. 12, 2020 (IN) ............................. 202041044278

(51) Int. Cl.

| | |
|---|---|
| ***H04L 41/0631*** | (2022.01) |
| ***H04L 41/0816*** | (2022.01) |
| ***H04L 41/22*** | (2022.01) |
| ***H04L 43/0823*** | (2022.01) |

(52) U.S. Cl.
CPC ...... *H04L 41/0631* (2013.01); *H04L 41/0816* (2013.01); *H04L 41/22* (2013.01); *H04L 43/0823* (2013.01)

(58) Field of Classification Search
CPC .................................................. H04L 41/0631
See application file for complete search history.

(56) References Cited

U.S. PATENT DOCUMENTS

| | | | | |
|---|---|---|---|---|
| 2005/0010638 | A1 * | 1/2005 | Richardson | H04L 12/1827 709/204 |
| 2017/0005887 | A1 * | 1/2017 | Lad | H04L 12/4633 |
| 2017/0208487 | A1 * | 7/2017 | Ratakonda | H04L 43/55 |
| 2020/0267047 | A1 * | 8/2020 | Safavi | H04L 41/5067 |

* cited by examiner

*Primary Examiner* — Benjamin Lamont

(57) ABSTRACT

Methods, apparatus, and system for generating efficient cross-layer key performance indicators for monitoring, managing and debugging communications networks. An exemplary method embodiment includes the steps of: generating a plurality of different cross-layer key performance indicators (CL-KPIs) from a set of event data records corresponding to a first period of time and a first base protocol, each CL-KPI in said plurality of different CL-KPIs being for a different failure cause scenario; identifying a CL-KPI in the plurality of different CL-KPIs corresponding to the first period of time and the first base protocol having a highest CL-KPI value and determining a most likely failure cause scenario for said first base protocol to be the failure cause scenario associated with the identified CL-KPI having the highest CL-KPI value.

21 Claims, 28 Drawing Sheets

300

305

302 304 306 308 310 311 312

| | Type | Prot. 1 | Cause | Reason | Prot. 2 | Subcat. | A | B | C | D |
|---|---|---|---|---|---|---|---|---|---|---|
| 301a | | | | | | | 1 | 0 | 0 | 0 |
| 301b | | | | | | | 1 | 0 | 0 | 0 |
| | | | | | | | 0 | 0 | 0 | 1 |
| 301 | | | | | | | 0 | 0 | 1 | 0 |
| | | | | | | | 0 | 0 | 0 | 1 |
| | | | | | | | 0 | 0 | 0 | 1 |
| | | | | | | | 1 | 0 | 0 | 0 |
| | | | | | | | 1 | 0 | 0 | 0 |
| 301c | | | | | | | 0 | 1 | 0 | 1 |
| | | | | | | | 0 | 1 | 0 | 0 |
| | | | | | | | 0 | 0 | 1 | 0 |
| | | | | | | | 0 | 1 | 0 | 0 |
| | | | | | | | 0 | 0 | 0 | 1 |

FIGURE 3

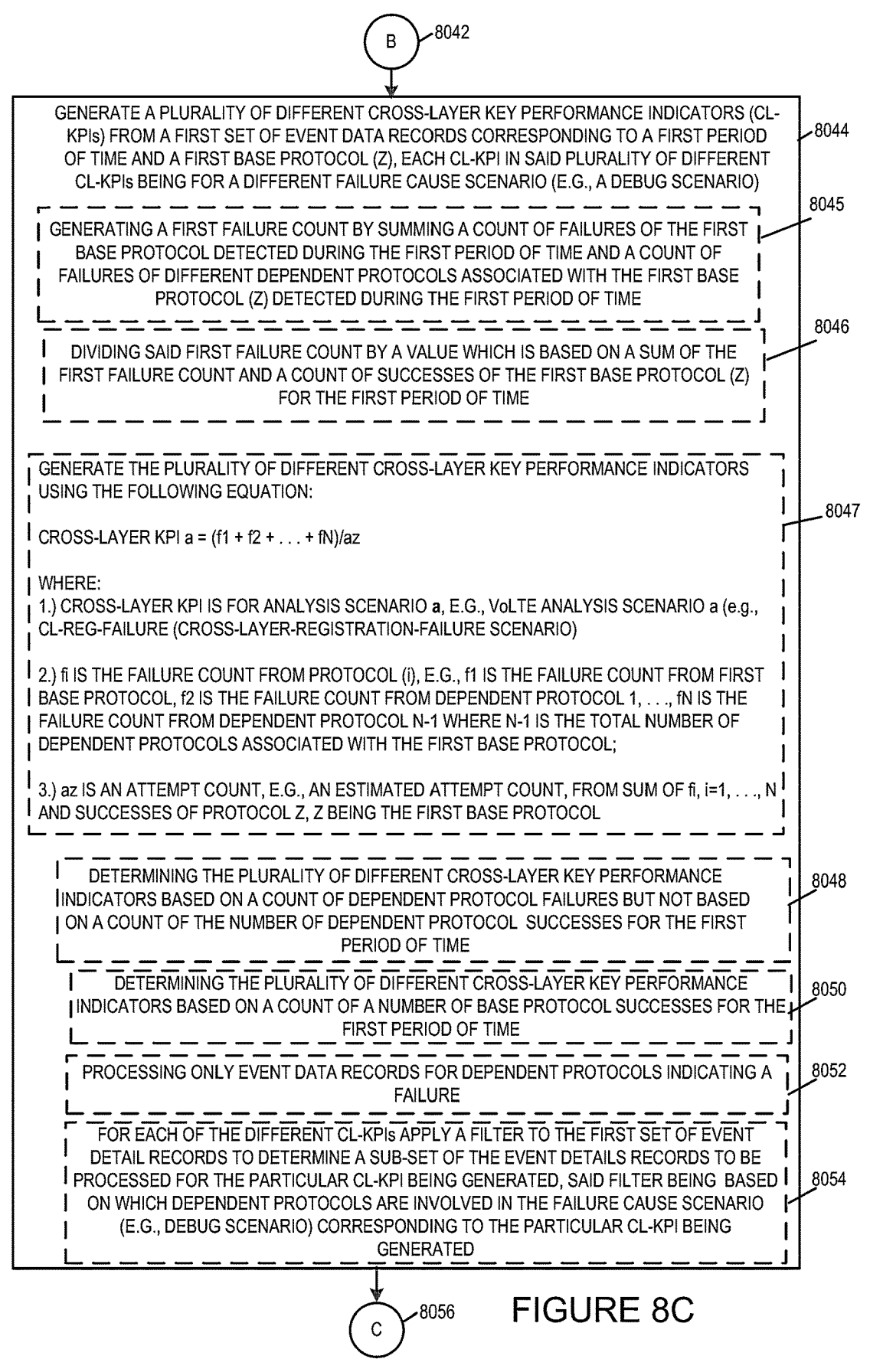

B 8042

GENERATE A PLURALITY OF DIFFERENT CROSS-LAYER KEY PERFORMANCE INDICATORS (CL-KPIs) FROM A FIRST SET OF EVENT DATA RECORDS CORRESPONDING TO A FIRST PERIOD OF TIME AND A FIRST BASE PROTOCOL (Z), EACH CL-KPI IN SAID PLURALITY OF DIFFERENT CL-KPIs BEING FOR A DIFFERENT FAILURE CAUSE SCENARIO (E.G., A DEBUG SCENARIO) 8044

GENERATING A FIRST FAILURE COUNT BY SUMMING A COUNT OF FAILURES OF THE FIRST BASE PROTOCOL DETECTED DURING THE FIRST PERIOD OF TIME AND A COUNT OF FAILURES OF DIFFERENT DEPENDENT PROTOCOLS ASSOCIATED WITH THE FIRST BASE PROTOCOL (Z) DETECTED DURING THE FIRST PERIOD OF TIME 8045

DIVIDING SAID FIRST FAILURE COUNT BY A VALUE WHICH IS BASED ON A SUM OF THE FIRST FAILURE COUNT AND A COUNT OF SUCCESSES OF THE FIRST BASE PROTOCOL (Z) FOR THE FIRST PERIOD OF TIME 8046

GENERATE THE PLURALITY OF DIFFERENT CROSS-LAYER KEY PERFORMANCE INDICATORS USING THE FOLLOWING EQUATION: 8047

CROSS-LAYER KPI a = (f1 + f2 + . . . + fN)/az

WHERE:

1.) CROSS-LAYER KPI IS FOR ANALYSIS SCENARIO a, E.G., VoLTE ANALYSIS SCENARIO a (e.g., CL-REG-FAILURE (CROSS-LAYER-REGISTRATION-FAILURE SCENARIO)

2.) fi IS THE FAILURE COUNT FROM PROTOCOL (i), E.G., f1 IS THE FAILURE COUNT FROM FIRST BASE PROTOCOL, f2 IS THE FAILURE COUNT FROM DEPENDENT PROTOCOL 1, . . ., fN IS THE FAILURE COUNT FROM DEPENDENT PROTOCOL N-1 WHERE N-1 IS THE TOTAL NUMBER OF DEPENDENT PROTOCOLS ASSOCIATED WITH THE FIRST BASE PROTOCOL;

3.) az IS AN ATTEMPT COUNT, E.G., AN ESTIMATED ATTEMPT COUNT, FROM SUM OF fi, i=1, . . ., N AND SUCCESSES OF PROTOCOL Z, Z BEING THE FIRST BASE PROTOCOL

DETERMINING THE PLURALITY OF DIFFERENT CROSS-LAYER KEY PERFORMANCE INDICATORS BASED ON A COUNT OF DEPENDENT PROTOCOL FAILURES BUT NOT BASED ON A COUNT OF THE NUMBER OF DEPENDENT PROTOCOL SUCCESSES FOR THE FIRST PERIOD OF TIME 8048

DETERMINING THE PLURALITY OF DIFFERENT CROSS-LAYER KEY PERFORMANCE INDICATORS BASED ON A COUNT OF A NUMBER OF BASE PROTOCOL SUCCESSES FOR THE FIRST PERIOD OF TIME 8050

PROCESSING ONLY EVENT DATA RECORDS FOR DEPENDENT PROTOCOLS INDICATING A FAILURE 8052

FOR EACH OF THE DIFFERENT CL-KPIs APPLY A FILTER TO THE FIRST SET OF EVENT DETAIL RECORDS TO DETERMINE A SUB-SET OF THE EVENT DETAILS RECORDS TO BE PROCESSED FOR THE PARTICULAR CL-KPI BEING GENERATED, SAID FILTER BEING BASED ON WHICH DEPENDENT PROTOCOLS ARE INVOLVED IN THE FAILURE CAUSE SCENARIO (E.G., DEBUG SCENARIO) CORRESPONDING TO THE PARTICULAR CL-KPI BEING GENERATED 8054

C 8056

FIGURE 8C

1200

| Field Name | S1mme | GTPC | S6a/d | Sv | Gx | Rx | Sw | RTP | SIP_INV | SIP_REG |
|---|---|---|---|---|---|---|---|---|---|---|
| protocol_interface | 1 | 1 | 1 | 1 | 1 | 1 | 1 | 1 | 1 | 1 |
| start_timestamp | 1 | 1 | 1 | 1 | 1 | 1 | 1 | 1 | 1 | 1 |
| duration | 1 | 1 | 1 | 1 | 1 | 1 | 1 | 1 | 1 | 1 |
| protocol_command | 1 | 1 | 1 | 1 | 1 | 1 | 1 | 1 | 1 | 1 |
| call_id | 1 | 1 | 1 | 1 | 1 | 1 | 1 | 1 | 1 | 1 |
| cause | 1 | 1 | 1 | 1 | 1 | 1 | 1 | 1 | 1 | 1 |
| sub_id | 1 | 1 | 1 | 1 | 1 | 1 | 1 | 1 | 1 | 1 |
| mobile_no | 1 | 1 | 1 | 1 | 1 | 1 | 1 | 1 | 1 | 1 |
| device | 1 | 1 | 1 | 1 | 1 | 1 | 1 | 1 | 1 | 1 |
| location | 1 | 1 | 1 | 1 | 1 | 1 | 1 | 1 | 1 | 1 |
| network element | 1 | 1 | 1 | 1 | 1 | 1 | 1 | 1 | 1 | 1 |
| apn | 1 | 1 | 1 | 1 | 1 | 1 | 1 | 1 | 1 | 1 |
| mnc | 1 | 1 | 1 | 1 | 1 | 1 | 1 | 1 | 1 | 1 |
| mcc | 1 | 1 | 1 | 1 | 1 | 1 | 1 | 1 | 1 | 1 |
| rat_type | 1 | 1 | 1 | 1 | 1 | 1 | 1 | 1 | 1 | 1 |
| destination realm | | | | | 1 | 1 | 1 | | | |
| ***call_outcome*** | 1 | 1 | 1 | 1 | 1 | 1 | 1 | 1 | 1 | 1 |
| ***call_scenario*** | 1 | 1 | 1 | 1 | 1 | 1 | 1 | 1 | 1 | 1 |
| ⋮ | ⋮ | ⋮ | ⋮ | ⋮ | ⋮ | ⋮ | ⋮ | ⋮ | ⋮ | ⋮ |
| Total Fields | 111 | 46 | 64 | 41 | 68 | 57 | 49 | 89 | 72 | 45 |

FIGURE 12

1300

| transaction_type | call_id | cause | imsi | call_outcome | call_scenario | Description |
|---|---|---|---|---|---|---|
| REG | 1234 | 200 | A | success | Attach, Authenticate and Register | Example success; Note, the majority of VoLTE Service registrations will result in success. |
| REG | 2345 | 403 | B | fail | Attach, Authenticate and Register | Example failure (403 forbidden) |
| UAR | 3456 | 5012 | C | fail | Attach, Authenticate and Register | Example failure (5012 diameter unable to comply) |
| UAR | 4567 | 4181 | D | fail | Attach, Authenticate and Register | Example failure (4181 HSS authentication data unavailable) |
| Attach/EPS | 7123 | 3-1 | D | fail | Attach, Authenticate and Register | Example failure due to lower layer (S6a) |
| CCR/A | 4567 | 5002 | E | fail | Attach, Authenticate and Register | Example failure (5002 unknown session ID) |

FIGURE 13

1500

| 4G Interface | 4G Interface Type | 4G Standard | 4G NE | 5G Interface | 5G Interface Type | 5G Standard | 5G NE/NFs |
|---|---|---|---|---|---|---|---|
| S1-MME/NAS | Protocol | 24.301 | UE/MME | N1/NAS | Protocol | 24.501 | UE/AMF |
| S1-MME | Protocol | 36.413 | RAN/MME | N2 | Protocol | 38.413 | RAN/AMF |
| S1-U | Protocol | 29.281 | RAN/SGW | N3 | Protocol | 38.415 | RAN/UPF |
| Gx | Protocol | 29.212 | PGW/PCRF | N7 (Namf/Npcf) | REST API | 29.502 (Namf)<br>29.512 (Npcf) | SMF/PCF |
| S6a | Protocol | 29.272 | MME/HSS | N8 (Namf/Nudm) | REST API | 29.518 (Namf)<br>29.503 (Nudm) | AMF/UDM |
| S11 | Protocol | 29.274 | MME/SGW | N11 (Namf/Nsmf) | REST API | 29.518 (Namf)<br>29.502 (Nsmf) | AMF/SMF |

FIGURE 15

METHODS, APPARATUS AND SYSTEMS FOR EFFICIENT CROSS-LAYER NETWORK ANALYTICS

RELATED APPLICATIONS

The present application is a continuation of U.S. patent application Ser. No. 17/499,858 which was filed on Oct. 12, 2021 and published as U.S. Patent Application Publication Number: US 2022-0116265 A1 on Apr. 14, 2022 which claims the benefit of Indian Provisional Patent Application Serial Number: 202041044278 which was filed on Oct. 12, 2020. All of the above mentioned patent applications and publications are hereby expressly incorporated by reference in their entirety.

FIELD OF INVENTION

The present invention relates to methods, apparatus and systems for efficient cross-layer network analytics. The present invention further relates to methods, apparatus and systems for monitoring communications networks which implement mixed technologies and/or multiple protocols and/or multiple Representative State Transfer-Application Programming Interfaces (REST-APIs) to detect, trouble shoot, debug and/or mitigate anomalous conditions, failures and/or problems. The present invention further relates to methods, apparatus and systems for generating and utilizing cross-layer multi-protocol key performance indicator(s) and/or cross-layer multi-REST-APIs key performance indicator (s).

BACKGROUND

Complex networks such as those deployed by fixed and mobile service providers require deep monitoring and troubleshooting applications to operate their networks for day-to-day usage and for future planning. Traditional approaches rely on network elements to provide a rich set of standardized performance monitoring counters to be processed by a combination of management systems (e.g., Element Management Systems (EMSs), Network Management Systems (NMSs), and Operation Support Systems (OSSs)). This gives a high-level view per network element but does not provide the ability to debug down to each of the protocol interfaces involved in an end-to-end call flow. With the advent of big data and analytics, management systems applications have become much more data driven where data feeds of varying sorts (e.g. call detail records (CDRs), generalized data records (e.g., event data records (xDRs)), events including for example call events, transaction events, registration events, session events), log files, performance stats) are collected and processed to provide detailed visibility at each network element or protocol hop along the end-to-end call flow. This allows all event data, across each protocol to be collected, and analyzed for each call flow allowing richer monitoring and debug capability hop-by-hop. In complex services such as Voice over Long Term Evolution (VOLTE), this requires the collection of 5-10 data feeds/protocols to properly monitor and debug problems down to the service level. Unfortunately, this big data approach also results in a 5× to 50× increase in the amount of data to be processed, depending on the exact data sources/protocols to be processed. This explosion of data is further acerbated by the fact that networks normally run successfully 95% or more of the time resulting in only 5% (or less) of the data collected actually being utilized.

There is currently a need for a technology solution to the problem of how to efficiently and effectively manage and/or troubleshoot complex services such as for example, Voice over Long Term Evolution/Voice Over Wi-Fi (VOLTE/VoWiFi) to deliver service assurance and customer experience management without requiring all event data from all of the related protocols to be captured.

Another technological problem with the legacy approach of complex network monitoring, management and/or trouble shooting is that each of the 5-10 protocols are in separate domains with separate EMSs, NMSs, and OSSs. Therefore, there is no single entity that can debug a problem end-to-end which means that not only does problem resolution need to be triaged and separated to different domains and subject matter experts (SMEs), the actual triaging is a team effort between all of these groups to realize or detect a problem.

From the foregoing it is apparent that there is a need for a technological solution to the problem of how to efficiently and effectively provide cross-layer network analytics. Furthermore, there is a need for new and/or improved methods and apparatus for avoiding the collection of all event data across all protocols associated with a particular service in order to properly monitor, manage and troubleshoot a communications network. There is also a need for new and/or improved methods and apparatus that can reduce the collection of event data across protocols for troubleshooting purposes so as to be more efficient in connection with the usage of compute, network, storage and memory resources. Furthermore, there is a need for new and/or improved methods and apparatus which provide a way to bring end-to-end understanding of a multiple domain problem, thus allowing well trained operational engineers to run the network rather than subject-matter experts.

SUMMARY

The present invention solves one or more of the above mentioned problems. Various embodiments of the present invention avoid the need to collect all event data across all protocols associated with a particular service in order to properly monitor, manage and/or troubleshoot a communications network thus significantly saving on compute, network, storage and memory resources. Various embodiments of the present invention generate and utilize one or more efficient cross layer key performance indicators to monitor, manage, and/or troubleshoot a communications network which minimize resource, e.g., system, memory, processing resources. Various embodiments of the present invention further introduce and/or utilize a data driven approach to holistically manage the integration of various protocols such as automatic threshold crossing alarm generation, automatic dashboard creation, and automatic workflow drill downs into per protocol products and/or services. Various embodiments of the invention, also provide a way to bring end-to-end understanding of multiple domain problems, thus allowing well trained operational engineers to run the network rather than subject-matter experts.

An exemplary method in accordance with an embodiment of the present invention includes the steps: generating a plurality of different cross-layer key performance indicators (CL-KPIs) from a set of event data records corresponding to a first period of time and a first base protocol, each CL-KPI in said plurality of different CL-KPIs being for a different failure cause scenario (e.g., debug scenario); identifying a CL-KPI in said plurality of different CL-KPIs corresponding to the first period of time and said first base protocol having a highest CL-KPI value; and determining a most likely failure cause scenario for said first base protocol to be the failure cause scenario associated with the identified CL-KPI having the highest CL-KPI value.

In some embodiments, the method further includes the step of: determining a ranking of the different failure cause scenarios for said first base protocol for the first period of time using said generated CL-KPIs.

In some embodiments, the step of generating a plurality of different cross-layer key performance indicators (CL-KPIs) from a set of event data records corresponding to a first period of time and a first base protocol, includes: generating a first failure count by summing a count of failures of the first base protocol detected during the first period of time and a count of failures of different dependent protocols associated with the first base protocol detected during the first period of time; dividing said first failure count by a value which is based on a sum of the first failure count and a count of successes of the first base protocol for said first period of time.

In some embodiments, the step of generating a plurality of different cross-layer key performance indicators (CL-KPIs) from a set of event data records corresponding to a first period of time and a first base protocol, includes: generating a first failure count by summing a count of failures for different dependent protocols associated with the first base protocol detected during said first period of time and a count of failures of the first base protocol during the first period of time; and dividing the first failure count by a value (az) which is based on a sum of the number of protocol failures (sum of fi, i=1 to N (f1=count of failures of the first base protocol and f2+ . . . , fN=count of failures for each of the different dependent N−1 protocols)) and a count of the number of successes of the first base protocol for said first period of time.

In some embodiments, the set of event data records for the first period of time includes a plurality of subsets of event data records for the first period of time, said plurality of subsets for the first period of time including at least a first subset of event data records, a second subset of event data records and a third subset of event data records. In some such embodiments, the first subset of event data records includes event data records corresponding to the first base protocol for the first period of time;

wherein the second subset of event data records includes event data records corresponding to a first dependent protocol for the first period of time. In some such embodiments, the third subset of event data records includes event data records corresponding to a second dependent protocol for the first period of time.

In some embodiments, one or more event detail records in the set of event detail records for the first period of time are event objects.

In some embodiments, the event detail records of the set of event detail records each include a common set of elements (e.g., protocol interface, start timestamp, duration, protocol command, cause, location, device). In various embodiments, the method further includes the step of: using the common set of elements in the event detail records to correlate event detail records corresponding to the same event.

In some embodiments, the method further includes the step of: determining which one of the different dependent protocols that can cause the determined most likely failure cause scenario has the highest number of failures for the first period of time.

In some embodiments, the method further includes the step of determining which portion (e.g., domain) of the communications network is the most likely source of the failures during the first period of time based on which dependent protocol had the determined highest number of failures for the first period of time.

In some embodiments, the plurality of different cross-layer key performance indicators depends on a count of the number of dependent protocol failures but does not depend on a count of the number of dependent protocol successes for said first period of time.

In some embodiments, when a first dependent protocol is identified as having multiple different failures occur in connection with the same event, each of the multiple different failures is included in the count of the dependent protocol failures for the first dependent protocol.

In various embodiments, the plurality of different cross-layer key performance indicators further depends on a count of a number of base layer protocol successes for said first period of time.

In various embodiments, the method further includes the step of: generating a visual dashboard on a display device, said visual dashboard including the identified cross-layer key performance indicator and the failures (e.g., failure counts or percentage of failures) corresponding to each dependent protocol for the first period of time.

In various embodiments, the method further includes the step of generating a visual dashboard on a display device, said visual dashboard including the identified cross-layer key performance indicator and the failures (e.g., failure counts or percentage of failures) corresponding to the first base protocol and each dependent protocol for the first period of time.

The invention is also directed to systems and apparatus that are used to implement the various method embodiments of the invention. In some apparatus embodiments the node or device executing the network monitoring, management and/or debug operations, the sensors, data capture nodes or devices, database systems, application nodes and each of the other apparatus/nodes/devices of the system or environment include a processor and a memory, the memory including instructions which when executed by the processor control the apparatus/node/device of the system to operate to perform the steps of various method embodiments of the invention or functions ascribed to the various apparatus/node/device of the system.

An exemplary analytics system in accordance with an embodiment of the present invention is a system including: memory; and a first processor, the first processor controlling the analytics system to perform the following operations: generating a plurality of different cross-layer key performance indicators (CL-KPIs) from a set of event data records corresponding to a first period of time and a first base protocol, each CL-KPI in said plurality of different CL-KPIs being for a different failure cause scenario (e.g., debug scenario); identifying a CL-KPI in said plurality of different CL-KPIs corresponding to the first period of time and said first base protocol having a highest CL-KPI value (which models the failure rate across a number of protocols that can lead to a failure of the first base protocol); and determining a most likely failure cause scenario for said first base protocol to be the failure cause scenario associated with the identified CL-KPI having the highest CL-KPI value.

It should be understood that in at least some failure cause scenarios, e.g., debug scenarios, dependent protocol failures are prerequisites before ever getting to the first base protocol initiated action. E.g., a SIP Registration will never be initiated if a Radio Bearer is not established in dependent protocol S1MME, or Authentication is not successful in dependent protocol S6a.

In various embodiments, the analytics system is part of a monitoring, management and/or debugging system.

In some system embodiments, the first processor further controls the analytics system perform the additional operation of: determining a ranking of the different failure cause scenarios for said first base protocol for the first period of time using said generated CL-KPIs.

In some system embodiments, the operation of generating a plurality of different cross-layer key performance indicators (CL-KPIs) from a set of event data records corresponding to a first period of time and a first base protocol, includes: generating a first failure count by summing a count of failures of the first base protocol detected during the first period of time and a count of failures of different dependent protocols associated with the first base protocol detected during the first period of time; dividing said first failure count by a value which is based on a sum of the first failure count and a count of successes of the first base protocol for said first period of time.

In some system embodiments, the step of generating a plurality of different cross-layer key performance indicators (CL-KPIs) from a set of event data records corresponding to a first period of time and a first base protocol, includes: generating a first failure count by summing a count of failures for different dependent protocols associated with the first base protocol detected during said first period of time and a count of failures of the first base protocol during the first period of time; and dividing the first failure count by a value (az) which is based on a sum of the number of protocol failures (sum of fi, i=1 to N (f1=count of failures of the first base protocol and f2+ . . . , fN=count of failures for each of the different dependent N−1 protocols)) and a count of the number of successes of the first base protocol for said first period of time.

In some embodiments, the set of event data records for the first period of time includes a plurality of subsets of event data records for the first period of time, said plurality of subsets for the first period of time including at least a first subset of event data records, a second subset of event data records and a third subset of event data records; the first subset of event data records includes event data records corresponding to the first base protocol for the first period of time; and the second subset of event data records includes event data records corresponding to a first dependent protocol for the first period of time; and the third subset of event data records includes event data records corresponding to a second dependent protocol for the first period of time.

In some embodiments, one or more event detail records in the set of event detail records for the first period of time are event objects.

In some embodiments, the event detail records of the set of event detail records each include a common set of elements (e.g., protocol interface, start timestamp, duration, protocol command, cause, location, device) and the first processor further controls the analytics system to perform the additional operation of: using the common set of elements in the event detail records to correlate event detail records corresponding to the same event.

In various embodiments, the first processor further controls the analytics system to perform the additional operation of: determining which one of the different dependent protocols that can cause the determined most likely failure cause scenario has the highest number of failures for the first period of time.

In some system embodiments, the first processor further controls the analytics system to perform the additional operation of: determining which portion (e.g., domain, subdomain, network devices, protocol) of the communications network is the most likely source of the failures during the first period of time based on which dependent protocol had the determined highest number of failures for the first period of time.

In some system embodiments, the plurality of different cross-layer key performance indicators depends on a count of the number of dependent protocol failures but does not depend on a count of the number of dependent protocol successes for said first period of time.

In some system embodiments, when a first dependent protocol is identified as having multiple different failures occur in connection with the same event, each of the multiple different failures is included in the count of the dependent protocol failures for the first dependent protocol.

In various embodiments, the network being monitored, managed and/or debugged is a mixed technology network utilizing a plurality of different protocols or protocol suites (e.g., different wireless protocols (e.g., NB-IoT (Narrowband Internet of Things), 2G, 3G, LTE (Long-Term Evolution), 5G protocols), session or call establishment protocols (e.g., Session Initiation Protocol (SIP), H.324 multimedia communications protocol, TCP/IP (Transmission Control Protocol/Internet Protocol), HTTP (Hypertext Transfer Protocol)), Authentication, Authorization and Accounting protocols (e.g., Radius protocol, Diameter protocol)), and media transfer protocols (e.g., Real-time Transport Protocol (RTP), Real-time Transport Control Protocol (RTCP), Secure Real-time Transport Protocol (SRTP), Secure Real-time Transport Control Protocol (SRTCP) and protocol interfaces which define the protocol. Protocol suites typically include a plurality of protocols sometimes defined via protocol interfaces, e.g., LTE. Various nodes, devices and systems described herein include protocol interfaces that are used to communicate signals and/or data according to a particular protocol.

The present invention is also applicable to 5G networks which use REST-APIs and network functions as well as mixed technology networks which use a combination of physical devices and virtual network functions.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 is a drawing illustrating a rules table used to group, categorize or classify event objects in accordance with an embodiment of the present invention.

FIG. 8C illustrates a third part of an exemplary method in accordance with an embodiment of the present invention.

FIG. 12 is a table illustrating the commonality of various fields in event data records corresponding to different protocols.

FIG. 13 includes a table 1300 which illustrates a number of event transactions associated with call scenario "Attach, Authenticate, and Register" showing examples of success and failure on the inter-related protocols in accordance with an embodiment of the present invention.

FIG. 15 shows a table illustrating how protocols/protocol interfaces in 4G are being replaced in some instances in 5G standards with REST APIs as well as how in some instances network entities (NEs) in 4G standards are being replaced with different network entities/network functions (NE/NF) in 5G standards.

DETAILED DESCRIPTION

The present invention avoids the need to collect all or large amounts of event data across all protocols associated with a particular service in order to properly monitor, manage and troubleshoot a communications network thus significantly saving on compute, network, storage and memory resources. This invention further introduces a data driven approach to holistically monitor and manage the integration of various protocols such as automatic threshold crossing alarm generation, automatic dashboard creation, and automatic workflow drill downs into per protocol products. In various embodiments of the invention, a way is provided to bring end-to-end understanding of multiple domain problems, thus allowing well trained operational engineers to run the network rather than subject-matter experts. The use of operational engineers instead subject matter experts to operate, manage and troubleshoot complex networks in turn reduces the associated cost of operating the network and frees up subject matter experts to work on other matters such as research and/or network optimizations.

Network Analytics tools are built to allow Service Providers to debug a network in a top-down or bottom up manner. For example, to properly manage VOLTE/Voice over WiFi (VoWiFi)/Voice over Broadband (VoBB) voice services the Service Provider would require the ability to slice and dice through various data dimensions (e.g., time, subscriber, cellular sectors, mobile devices, network elements) and performance metrics (e.g., call failures, call successes, call drops, reduced MOS scores, handover failures). The problems can transcend a number of systems (e.g. radio network, packet core, or application domain) which means standard network performance metrics associated with a specific network element or network system cannot help or are insufficient to analyze the problem. The monitoring cannot be performed in one part of the network (e.g., common location for Session Initiation Protocol/Real-time Transport Protocol (SIP/RTP)), as there are a number of dependent functions which are layered in the network to handle such things as authorize subscribers, register service, allocate call resources, track mobility, and interwork with other services. Each of these areas can result in a VOLTE service failing, which requires further visibility across a number of domains (e.g. Radio Access Network (RAN), Packet Core Network, IP Multimedia Core Network Subsystem (IMS Core), and specific protocols to debug, resulting in even more data collected. The main point is typically for thorough top-down and bottom-up debugging capability all and/or very large quantities of data needs to be collected across the network resulting in a huge bloat of system resources.

Figure 1:
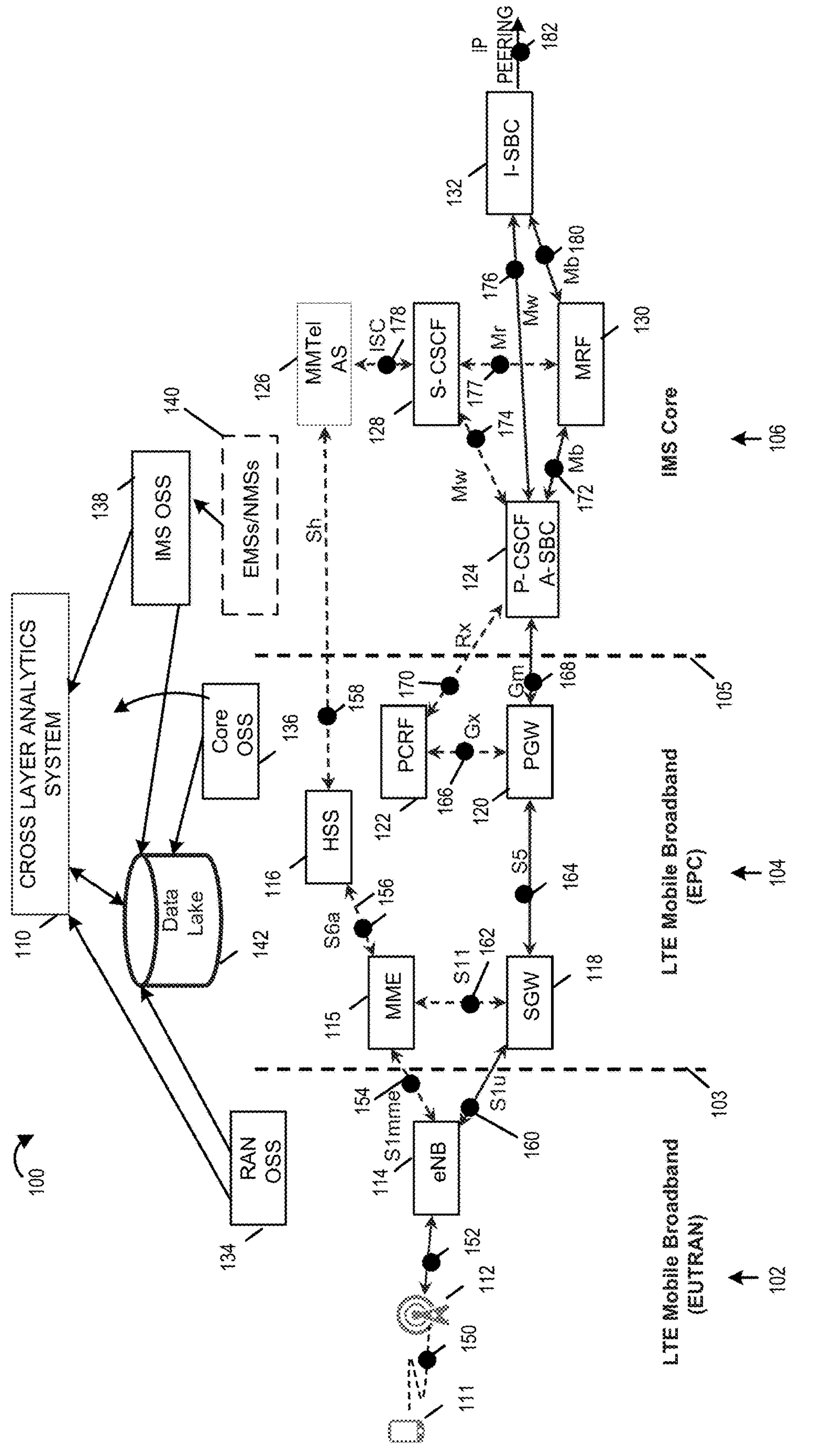
FIG. 1 is a drawing illustrating an exemplary system in accordance with an embodiment of the present invention.

FIG. 1 illustrates an exemplary communications system 100 including an analytics system 110 and a complex network including a plurality of network portions 102, 104, 106 which are sub-networks in accordance with an embodiment of the present invention. The complex network includes mixed LTE and IMS technology illustrating an exemplary environment for VOLTE Service delivery. FIG. 1 also shows example protocols involved in LTE and IMS networks when implementing VOLTE Services. The complex network includes three different portions which are delineated by vertical dashed lines 103 and 105. The first portion 102 is a LTE (Long Term Evolution) Mobile Broadband (Evolved-UMTS (Universal Mobile Telecommunication) Terrestrial Radio Access Network (E-UTRAN)) portion 102. The second portion is a LTE Mobile Broadband (Evolved Packet Core (EPC)) portion 104. The third portion is an IP Multi-media Sub-system (IMS) core portion 106. Each of the different portions of the network includes a variety of different nodes and/or devices which utilize a variety of different protocols to communicate with one another as shown. Each portion also includes a separate Operations Support System used for managing its respective portion of the network 100. Each of the first, second and third portions of the network can and sometime do form a separate network domain, a first, second, and third network domain respectively. Each of the first, second and third portions of the network are sometimes in different geographically areas.

The LTE Mobile Broadband E-UTRAN portion 1102 is made up of a number of elements such as for example antenna towers (e.g., antenna tower 112), eNBs (enhanced NodeBs) (e.g., eNB 114) and a Radio Access Network Operations Support System 134. Mobile devices such as user equipment devices, e.g., cell phones, smart phones, computers, tablets, laptops, etc.) (e.g., user equipment device 111) wirelessly communicate with the eNBs which serve as intelligent base stations. The RAN Operations Support System (OSS) 134 enables the service provider/owner of network 100 to monitor, control, analyze, and manage the LTE Mobile Broadband (E-UTRAN) portion 1 102 of the network 100. While only a single user equipment device 111, antenna tower 112 and eNB 114 are illustrated, it is it to understood that the LTE Mobile Broadband portion 1 102 typically includes a plurality of each of these devices.

The LTE Mobile Broadband EPC Network portion 2 104 also includes a number of elements such as for example a MME (Mobility Management Entity) 115 that handles session establishment and mobility management, a SGW (Serving Gateway) 118 that supports packet forwarding and intra-LTE mobility anchoring, a PGW (Packet Data Network Gateway) 120 that supports traffic delivery and Quality of Service (QOS) enforcement, a HSS (Home Subscriber Server) 116 that supports home location registration and authentication center, a PCRF (Policy and Charging Rules Function) 122 that provides QoS and accounting rules information for sessions, and a Core Operations Support System (OSS) 136 that enables a service provider to monitor, control, analyze, and manage the LTE Mobile Broadband EPC portion 2 104 of the network 100.

The IMS Core portion 3 106 is made of a number of functions which may be implemented on nodes or devices including P-CSCF/A-SBC (Proxy Call Session Control Function/Access Session Boarder Control) 124 which supports ingress/egress controls for access networks and session information to policy server, MRF (Media Resource Function) entity 130 which supports media related actions like conferencing and ring tones, MMTel AS (Mobile Telephony Application Server) 126 which supports various call control operations such as circuit switch interworking and call transfer, S-CSCF (Serving Call Session Control Function) entity 128 which is the main IMS element providing registration and session control for UEs (e.g., UE 111), I-SBC (Interconnect Session Border Control) 132 which supports interconnecting and security between service providers. The IMS Core also includes optional Element Management Systems and/or Network Management Systems 140 and IMS Operations Support System (OSS) 138 that enables a service provider to monitor, control, analyze, and manage the IMS portion 3 106 of the network 100. Though not shown the LTE Mobile Broadband (EUTRAN) portion 1 102 of the network and LTE Mobile Broadband (EPC) portion 2 104 of the network each also include Element Management Systems and/or Network Management Systems. The cross layer analytics system receives data, e.g. . . . , event data records, from network elements, probes, sensors, RAN OSS 134, Core OSS 136, IMS OSS 138 and/or EMSs/NMSs 140 in the three portions of the network 100 and generates cross-layer KPIs in accordance with various embodiments of the present invention. The data lake database 110 and the cross-layer analytics system 142 may be geographically located in any of the three portions 102, 104, and 106 of the network and are coupled to the network. Each of the elements of the network, e.g., devices nodes and probes are connected, e.g., via communications links such wireless links, optical links and/or cables. The numbered dots 150, 152, 154, 156, 158,160, 162, 164, 166, 168, 170, 172, 174, 176, 177 178, 180, 182 represent test points, probes and/or sensors used to monitor and capture event data from the communications links represented by the solid or dashed lines on which the numbered dots are placed. For reference purposes the dots will be discussed as sensors but as previously discussed they can be test points, probes or other devices used to monitor and/or capture data placed on the communications links. The test points, probes and/or sensors further monitor and capture protocol communications information from the communications links on which the numbered dots are placed. For example sensor 154 captures S1mme protocol event data, sensor 156 captures S6a protocol event data, sensor 158 captures Sh protocol event data, sensor 160 captures S1u protocol event data, sensor 162 captures S11 protocol event data, sensor 164 captures S5 protocol event data, sensor 166 captures Gx protocol event data, sensor 168 captures Gm protocol event data, sensor 170 captures Rx protocol event data, sensor 172 captures Mb protocol event data, sensor 174 captures Mw protocol event data, sensor 176 captures Mw protocol event data, sensor 177 captures Mr protocol event data, sensor 178 captures ISC protocol event data, sensor 180 captures Mb protocol information. The lines shown as connecting elements of the system are communications links. Various communications links have been labelled with a protocol utilized on the link to communicate. Though not shown the elements including sensors shown as dots of the first portion of the network are also connected to the RAN OSS 134 via communications links which are not shown. Similarly, the elements of the LTE Mobile Broadband (EPC) portion 104 of the network including sensors shown as dots are connected to the Core OSS 136 via communications links which are not shown. Likewise, the elements including sensors shown as dots of the IMS Core 106 third portion of network 100 are connected to the EMSs/NMSs 140 and the IMS OSS via communications links which are not shown. Note, RAN OSS and Core OSS may also include NMSs and EMSs which are not illustrated. The Data Lake database 142 is used to store event data and/or event data records received from network elements/devices/nodes, sensors and probes and the EMSs/NMSs, RAN OSS, Core OSS, and IMS OSS in the system 100. The cross layer analytics system is also coupled to the various elements in the system 100. Communications links connecting the cross layer analytics system to the RAN OSS 134, Data Lake database 142, Core OSS 136, and IMS OSS 138 are explicitly shown with arrows. The cross layer analytics system may, and in some embodiments, is coupled to and does receive data, e.g., event data and/or event data records, directly or indirectly from network devices, sensors and probes distributed throughout the network, e.g., on each communications link as well as from the RAN OSS 134, Core OSS 136, EMSs/NMSs 140, IMS OSS 138 and/or Data Lake database 142. In various embodiments, network elements/devices, probes and/or sensors capture event data with respect to the protocols being used to communicate between the elements of the network. Some of the network elements/devices, probes and/or sensors generate event data records from the captured event data for the protocols. In some embodiments, the network elements/devices, probes and/or sensors send the event data to other network elements, e.g., an OSS which generates event data records from the captured event data.

Combined the LTE and IMS networks are utilized to deliver VOLTE services to mobile subscribers. This also means that any failure among these network elements/network functions can result in a blocked service. Failures among the network elements/functions can interrupt VOLTE service call scenarios such as call registration, call establishment, mobility, call quality, etc.

System 100 is exemplary in other embodiments, an extended set of network elements and functions (see e.g., system 1000 in FIG. 10) are used for other services such as Voice over WiFi (VoWiFi).

Figure 10:
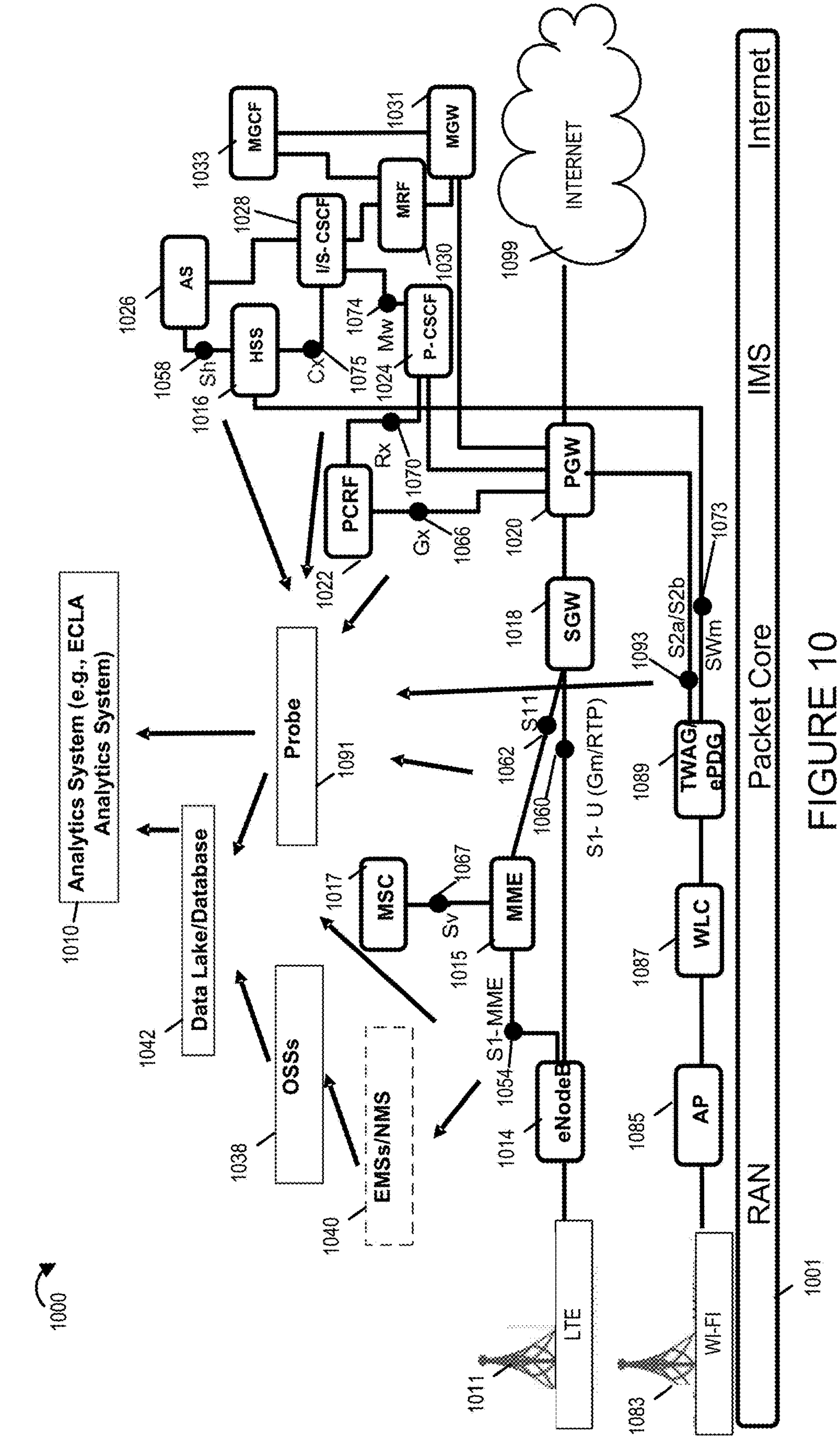
FIG. 10 is a drawing illustrating an other exemplary system in accordance with an embodiment of the present invention.

FIG. 10 illustrates another exemplary communications system 1000 in accordance with an embodiment of the present invention including an analytics system 1010 and a complex network including a plurality of network portions. Box 1001 indicates that the system 100 includes different network portions including a Radio Access Network (RAN) portion, Packet Core network portion, and IMS Core Network portion which is attached to the Internet 1099. FIG. 10 also shows example protocols involved in Wi-Fi, LTE, and IMS networks when implementing VoWiFi services and VOLTE Services. Each of the different portions of the network includes a variety of different nodes and/or devices which utilize a variety of different protocols to communicate with one another as shown. EMSs/NMSs 1040 represent one or more Element Management Systems and/or one or more Network Management system used to manage the system 1000. Operation Support Systems 1038 represent one or more OSS. Typically, and in some embodiments, one or more of the portions of the system/network 1000 (e.g., RAN, Packet Core, and IMS) include an EMS, and NMS and/or an OSS for managing its respective portion of the system/network 1000. Each of the different portions of the network, e.g., (RAN, Packet Core, IMS) can and sometime do form a separate network domain. Each of the different portions of the system/network may be, and sometimes are, located in different geographically areas.

The system/network 1000 is made up of a number of elements such as for example LTE antennas (e.g., LTE antenna tower 1011, LTE base stations (e.g., LTE eNBs (enhanced NodeBs) (e.g., eNB 1014), a Wi-Fi Antennas (e.g., Wi-Fi antenna 1083), Wi-Fi Access Points (e.g., AP 1085), Wireless Lan Controllers (e.g., WLC 1087), Trusted Wireless Access Gateway-Evolved Packet Data Gateway (e.g., TWAG cPDG 1089), a MSC (Mobile Switching Center) 1017, a MME (Mobility Management Entity) 1015 that handles session establishment and mobility management, a SGW (Serving Gateway) 1018 that supports packet forwarding and intra-LTE mobility anchoring, a PGW (Packet Data Network Gateway) 1020 that supports traffic delivery and Quality of Service (QOS) enforcement, a HSS (Home Subscriber Server) 1016 that supports home location registration and authentication center, a PCRF (Policy and Charging Rules Function) 1022 that provides QoS and accounting rules information for sessions, a P-CSCF/A-SBC (Proxy Call Session Control Function/Access Session Boarder Control) 1024 which supports ingress/egress controls for access networks and session information to policy server, MRF (Media Resource Function) entity 1030 which supports media related actions like conferencing and ring tones, AS (Server) 1026 which supports various call control operations such as circuit switch interworking and call transfer, I/S-CSCF (Interrogating/Serving Call Session Control Function) entity 1028 which is the main IMS element providing registration and session control for UEs, a Media Gateway (MGW) 1031 and a Media Gateway Control Function (MGCF) entity 1033. The Packet Gateway 1020 coupling the other elements of the system to the Internet shown as 1099.

The cross layer analytics system receives data, e.g. . . . , event data records, from one or more of the following network elements, probes, sensors, data lake/database 1042, OSSes 1038, and/or EMSs/NMSs 1040 and generates cross-layer KPIs in accordance with various embodiments of the present invention. The data lake database 1010 and the cross-layer analytics system 1042 may be geographically located in any of the portions of the network and are coupled to the different elements in the different portions of the network. Each of the elements of the network, e.g., devices nodes and probes are connected, e.g., via communications links such as for example wireless links, optical links and/or cables. The numbered dots 1054, 1058, 1060, 1062, 1066, 1067, 1070, 1073, 1074, 1075, 1093 represent test points, probes and/or sensors used to monitor and capture event data from the communications links represented by the solid lines on which the numbered dots are placed. For reference purposes the dots will be discussed as sensors but as previously discussed they can be test points, probes or other devices used to monitor and/or capture data placed on the communications links. The test points, probes and/or sensors further monitor and capture protocol communications information from the communications links on which the numbered dots are placed. For example, sensor 1054 captures S1mme protocol event data, sensor 1058 captures Sh protocol event data, sensor 1060 captures S1u (Gm/RTP) protocol event data, sensor 1062 captures S11 protocol event data, sensor 1066 captures Gx protocol event data, sensor 1070 captures Rx protocol event data, sensor 1073 SWm protocol event data, sensor 1074 captures Mw protocol event data, sensor 1075 captures Cx protocol event data, sensor 1093 captures S2a/S2b protocol event data. The lines shown as connecting elements of the system are communications links. Various communications links have been labelled with a protocol utilized on the link to communicate.

The probes 1091 represent the different probes in the system for monitoring and capturing data, e.g., the protocol event data. Event data which has been captured and/or event data records which have been generated, are transmitted/communicated from network elements/devices, test points, probes, and sensors to the EMSs/NMS 1040, the OSSs 1038, the data lake/database 1042 and/or the analytics system 1010. The EMSs/NMSes 1040 transfer data, e.g., event data and/or event data records to the OSSs 1038, the analytics system and/or store the data in the data lake 1042. The OSSs 1038 store data in the data lake/database 1042. The arrows in the drawing generally represent event data being communicated to the EMSs/NMSs OSSs, data lake/database and analytics system.

Though all communications links in the system/network are not shown all of the elements in the system are coupled and/or connected via communications links.

The cross layer analytics system is also coupled to the various elements in the system 1000. The cross layer analytics system may, and in some embodiments, is coupled to and does receive data, e.g., event data and/or event data records, directly or indirectly from network devices, sensors and probes distributed throughout the network, e.g., on each communications link as well as from the OSS s 1038, EMSs/NMSs 1040, and/or Data Lake/database 1042. In various embodiments, network elements/devices, probes and/or sensors capture event data with respect to the protocols being used to communicate between the elements of the network. Some of the network elements/devices, probes and/or sensors generate event data records from the captured event data for the protocols. In some embodiments, the network elements/devices, probes and/or sensors send the event data to other network elements, e.g., an OSS which generates event data records from the captured event data. Optimally the system 100 and/or the analytics system 1010 only takes, collects, captures, stores and/or processes needed event data at the network devices, sensors, probe, data lake, OSSs or lower layers.

The present invention provides a way to monitor, manage and trouble shoot failures across multiple protocols/protocol layers using efficient cross layer Key Performance Indicators.

When discussing base protocols and dependent protocols it should be understood that a base protocol is associated with a base application (e.g. VOLTE Services, or LTE Mobile Broadband (MBB) Services (a.k.a. Mobile Internet access for mobile applications like music delivery)) and focused on a particular protocol layer (e.g. SIP for VOLTE or HTTP for a MBB application). For example, SIP and HTTP have a series of request and response commands such as SIP Registration, or HTTP Get that are executed within that protocol layer. The base protocol may have one or more dependent protocols to succeed which can be in various relationships including: (i) lower layer protocols (e.g. TCP, UDP) where the transport layer needs to be established to carry the SIP or HTTP commands, (ii) prerequisite protocol setups (e.g. VPN connection, LTE bearer connection) where SIP or HTTP cannot be initiated unless the prerequisites have been established, or (iii) nested protocol requests (e.g. HTTP GET request initiates some internal REST APIs between a number of systems before responding).

Figure 4:
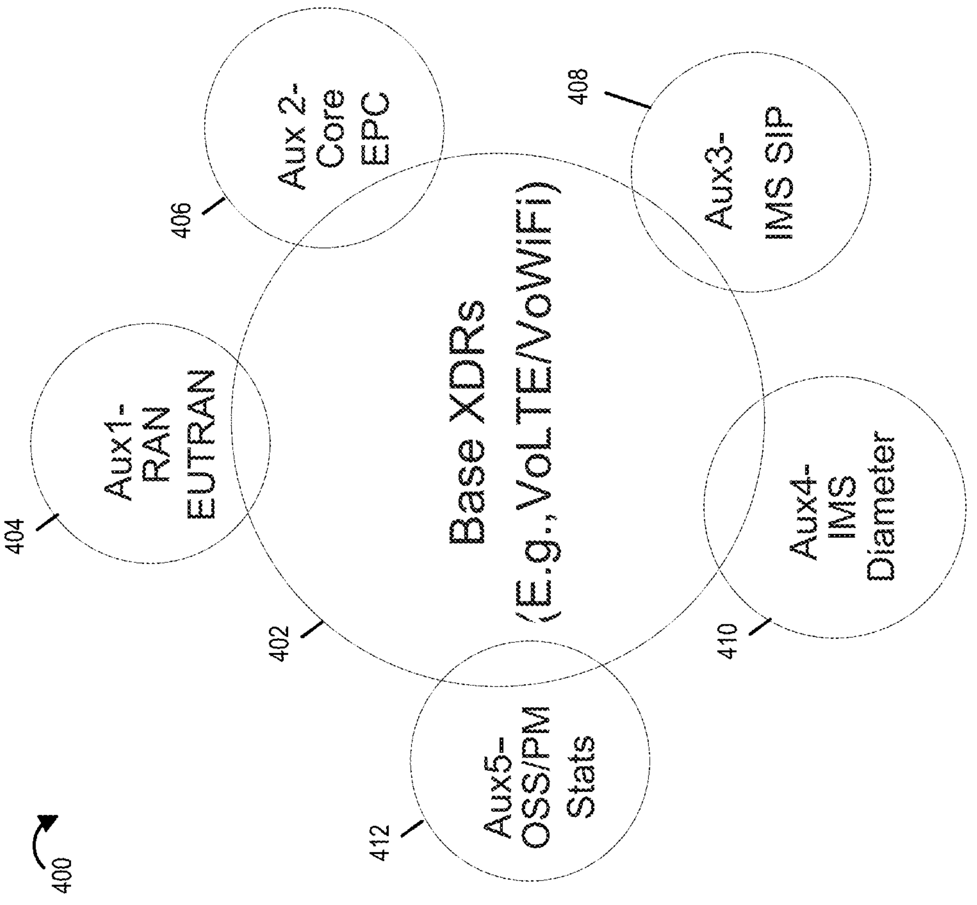
FIG. 4 is a drawing illustrating the data relationships for an exemplary application/service (e.g., VOLTE/VoWi-Fi) for which there exists a base set of event data records (XDRs) representing the core functionality of the service/application as will as auxiliary XDRs from other network components/systems.

FIG. 4 illustrates a diagram 400 which shows the data relationships for an exemplary application/service (e.g., VOLTE/VoWi-Fi) for which there exists a base set of event data records (XDRs) 402 representing the core functionality of the service/application corresponding to a base protocol as well as a plurality of auxiliary XDRs from other network components/systems corresponding to or for dependent protocols used to provide the service/application (e.g., Aux-1-Radio Access Network (RAN) Evolved Universal Terrestrial Radio Access (E-UTRAN) (404), Aux-2-Core Evolved Packet Core (EPC) 406, Aux-3-IP Multi-media Subsystem Session Initiation Protocol (IMS SIP) 408, Aux-4-IMS Diameter 410, Aux-5-Operation Support System/Performance Management (OSS/PM) statistics) 412. Each auxiliary set of XDRs can result in many multiples of the base data set (e.g., S1 Mobility Management Entity Interface (S1 MME) RAN E-UTRAN is over 4 times the size of the base set of XDRs). As explained above the collection, storage and analysis of all event data results in a huge bloat of system resources. In various embodiments, the base XDRs correspond to and/or include event data for a base protocol which is utilized to implement a service/application. In various embodiments, various other XDRs which are utilized correspond to or provide information for a dependent protocol which is utilized to provide the service/application such as the S1 protocol, Diameter protocol, SIP protocol, etc.

As previously mentioned, the present invention includes new and/or improved methods, apparatus and systems that provide a way to monitor, manage and/or troubleshoot complex services such as VOLTE/VoWiFi to deliver service assurance and customer experience management without requiring all event data from all of the related protocols to be captured. In particular without requiring event data records for dependent protocol successes to be captured, and/or stored and/or utilized to generate efficient cross-layer KPIs.

Voice over LTE, or VOLTE as described in the document "VOLTE Service Description and Implementation Guidelines" Version 1.1 dated 26 Mar. 2014 published by GSMA association is a GSMA profile of the standards definition for the delivery of services currently provided via Circuit Switch networks—mainly voice and SMS—over the Packet Switched only network of LTE, leveraging the core network IP Multimedia Sub-System (IMS). Various nodes, functions, and protocol interfaces utilized in implementing the VOLTE service are described in the document "VOLTE Service Description and Implementation Guidelines" Version 1.1 dated 26 Mar. 2014 which is incorporated herein by reference in its entirety.

The steps of an exemplary method in accordance with an embodiment of the present invention will now be described. The method may be, and in some embodiments is, implemented by one or more devices or systems, e.g., the cross layer analytics system 110 of system 100 shown in FIG. 1 or the analytics system 1010 of system 1000 shown in FIG. 10. The system 1000 supporting both LTE and Wi-Fi services. The one or more devices/systems including a processor, Input/Output Interfaces, and memory. The memory including routines which when executed by the processor in the device in which it is located control the device to perform one or more steps of the exemplary method discussed below.

1. Start with a base analytics application that has a set of Event Data Record data sources which in this example with be Call Data Records (CDR) data sources, (say B), from a particular point in the network (e.g., Session Initiation Protocol (SIP), Session Description Protocol (SDP), Real-time Transport Protocol (RTP), Real-time Transport Control Protocol (RTCP) from Gm interface (see FIG. 10 S1-U (Gm/RTP interface probe).

2. Identify each of the debug scenarios (e.g., call flow patterns) which are required for the service provider to operate, monitor and debug (e.g., call registration, call attempt, call drop, call interworking, session continuity). The debug scenarios are sometimes referred to herein as failure cause scenarios.

3. For each debug scenario, $D_s$
   a. Define what constitutes a successful outcome and maintain a successful counter, $S_s$ from CDRs in B
   b. Identify the dependent protocols (or log files, pm stats) visibility (e.g. call registration requires RRC, S1MME, S11, S5/S8, S6a, SIP (Gm), Gx),
      i. For each dependent protocol, $P_{s,i}$
         1. Intelligently filter CDR feeds to include data required to debug a failure scenario(s) in debug scenario (call flow) $D_s$, for protocol $P_{s,i}$. This may be performed on a network element (e.g. SBC), probe, or at the data ingestion point (e.g. Extraction Transform Load (ETL)) of an analytics platform/system.
            a. Filtering requires understanding of transaction or event types. This may be table driven or automated through packet tool capture analysis and pattern recognition learning.
         2. Define what constitutes a failure event data for the call flows for this debug scenario and maintain a failure counter, $F_{s,i,f}$
            a. Failures due to other dependent or underlying protocols may, and in some embodiments are, not counted, unless the other protocol is not being monitored. In some embodiments, the other protocol is counted. In some implementations, various cause codes from event data records are enriched with the underlying protocol relationship (e.g. Protocol X has cause code A, Protocol Y has cause code A' (A prime) associated with passing along cause code A due to failure at Protocol X). Such relationships can be automatically recognized and used to remove double counts from other underlying dependent protocols through a learning process. In some other embodiments, double counts of failures due to underlying protocols are not removed as the mathematical relationship of the generated Rate of failure is unaffected by the double count, though this may add to the complexity of determining the most likely cause analysis for that call scenario.

b. There may be more than one failure for each dependent protocol based on call flow pattern, which is captured as separate failure counts 3. Maintain a data structure, $DS_{s,i}$, that stores relevant information for each failure scenario for each dependent protocol, including protocol name, failure scenario, associated CDR filter for the particular event data.

c. Calculate, automatically by traversing $DS_{s,i}$, a new cross-layer KPI that models the failure rate (FR) across a number of protocols in any part of the call flow as: $FRs=SUM(F_{s,i,f})/(SUM(F_{s,i,f})+S_s)$ d. Build, automatically by traversing $DS_{s,i}$, a dashboard for $D_s$, (see exemplary dashboard 500 shown in FIG. 5) that allows visibility into FRs and $F_{s,i,f}$, for each f, which also provides the ability to drill down to protocol specific dashboard, $P_{s,i}$ 4. Generate threshold crossing alarms and dashboards, automatically by traversing DSs,i, that provides top-level visibility of all FRs for each Ds. Generating threshold crossing alarms including defining alarm threshold values corresponding to CL-KPIs values which when exceeds cause one or more actions to be taken such as for example generating an audio sound indicating an alarm condition, generating a visual indication on a display device indicating an alarm condition, generating and/or sending a message or other notification indicating an alarm condition.

It should be understood that in at least some debug scenarios, dependent protocol failures are prerequisites before ever getting to the first base protocol initiated action. E.g., a SIP Registration will never be initiated if a Radio Bearer is not established in dependent protocol S1MME, or Authentication is not successful in dependent protocol S6a.

Figure 5:
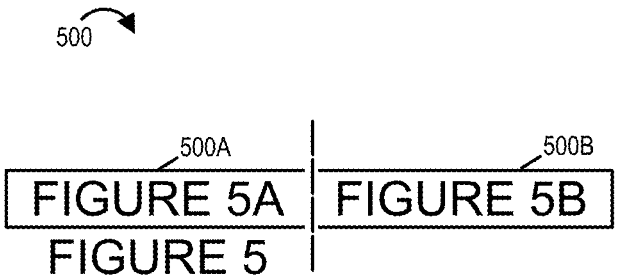
FIG. 5 comprises FIG. 5A and FIG. 5B.
Figure 5A:
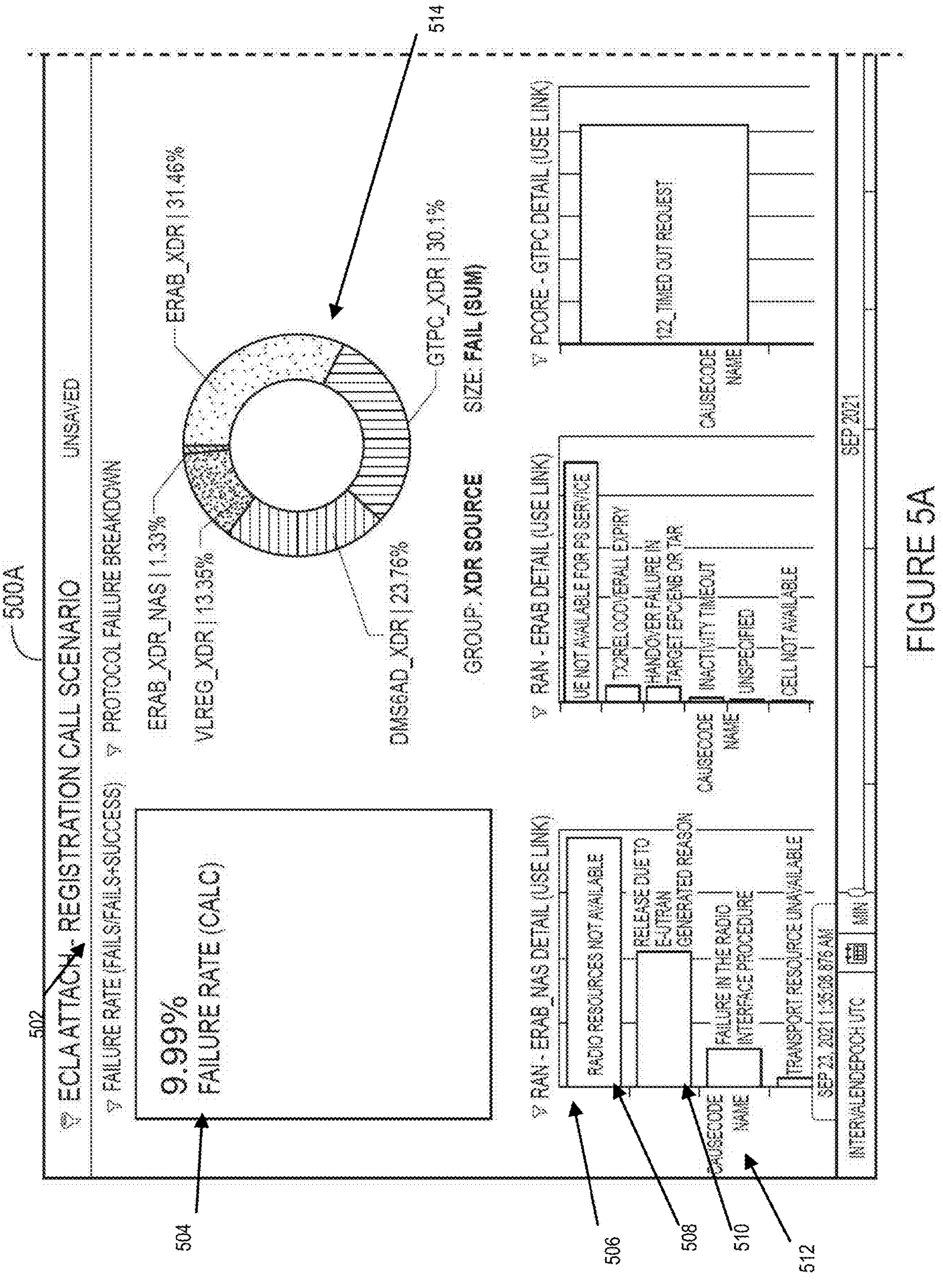
FIG. 5A is a drawing illustrating a first portion of an exemplary efficient cross-layer analytic (ECLA) dashboard in accordance with an exemplary embodiment of the present invention.
Figure 5B:
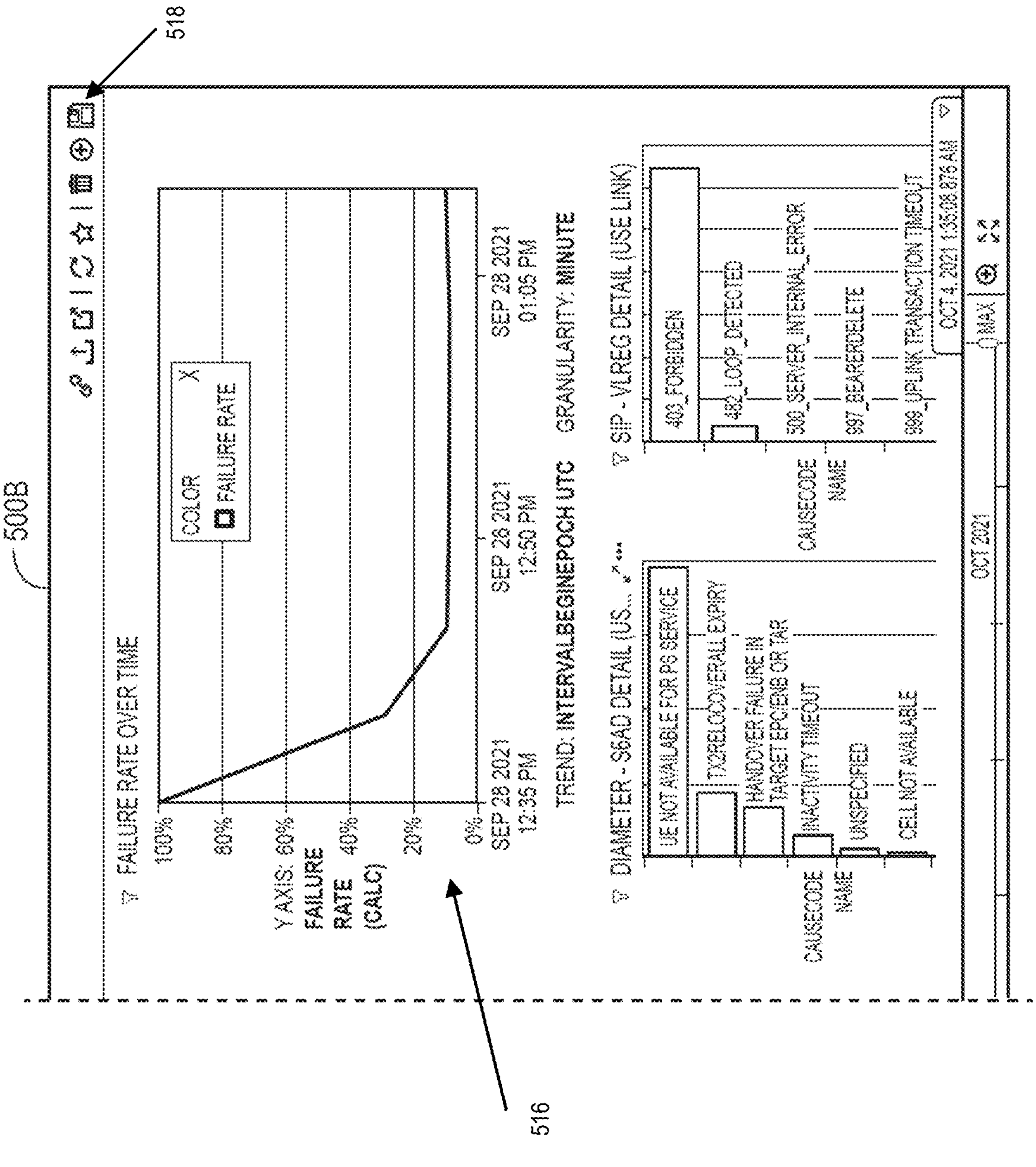
FIG. 5B is a drawing illustrating a second portion of an exemplary efficient cross-layer analytic (ECLA) dashboard in accordance with an exemplary embodiment of the present invention.

Diagram 500 of FIG. 5 illustrates the combination of 500*a* of FIGS. 5A and 500*b* of FIG. 5B. FIG. 5A illustrates the first part 500*a* of an exemplary dashboard 500 in accordance with an embodiment of the invention. FIG. 5B illustrates the second part 500*b* of a dashboard 500 in accordance with an embodiment of the invention. The dashboard may be, and in some embodiments is generated by the analytics system 110 of system 100 of FIG. 1 of system 1010 of system 1000 and displayed on the display of a display device.

The dashboard 500 shown in FIG. 5 is for Cross-Layer Attach—Registration call scenario analysis across protocols and includes information identifying the type of cross-layer KPI and/or call scenario/debug scenario/failure cause scenario to which the dashboard corresponds. Dashboard 500 includes a title "ECLA ATTACH—Registration Call Scenario" 502.

The dashboard 500 includes failure rate (fails/(fails+success)) information for a period of time shown as a percentage 504. A protocol failure breakdown 514 illustrating the percentage of failures corresponding to a base protocol and each dependent protocol in both a graphical format and in a numerical format. The failures being for a period of time. The SIP-VLREG information corresponding to the base protocol which in this example is Session Initiation Protocol. The dashboard 500 also includes a Failure Rate over time graph 516 illustrating on the Y Axis Failure Rate as a percentage with time on the X Axis. Additionally, the dashboard 500 includes a separate chart for each of the dependent protocols (RAN-ERAB_NAS (S1MME NAS), RAN-ERAB (S1MME), PCORE-GTPC (GPRS (General Packet Radio Service) Tunnel Protocol-Control Protocol) (e.g. S11), DIAMETER-S6AD, and also for base protocol SIP-VLREG (base protocol failures) analyzed to generate the cross-layer KPI. Each chart showing a breakdown of the causecode name and amount of failures in a graphic bar chart with one bar for each causecode. For example, RAN-ERAB_NAS Detail graph on FIG. 5A has causecode name 512 plotted vs. the amount of failures for the identified cause code shown as a bar graph, e.g., see radio resource not available cause code 508 and release due to E-UTRAN generated reasons 510. The dashboard 500 also includes actionable links, e.g., hyperlink 506, that when selected cause the analytics system retrieve and generate on the display of the display device additional information corresponding to the description on the selected actionable link, e.g., additional data for the dependent protocol, e.g., RAN-ERAB_NAS. This allows a user, e.g., system operator, to drill down into dependent protocol failures directly from the dashboard by retrieving data on one or more dependent protocols of interest. The dashboard also include actionable icons for saving, deleting and performing other actions with respect to the displayed dashboard. For example, the dashboard 500 includes a save icon 518 for saving the generated dashboard to a file 518. The dashboard also includes the source of the event data records and size or amount of the event data records indicating a failure for each dependent protocol as well as the sum of all failures so that the operator can determine whether the amount of failures is significant. In some embodiments, the generated dashboard includes alarm displays indicating when thresholds have been exceeded for failures on one or more of the dependent protocols or the failure rate of the generated CL-KPI for which data is being displayed has exceeded a threshold value.

Figure 18:
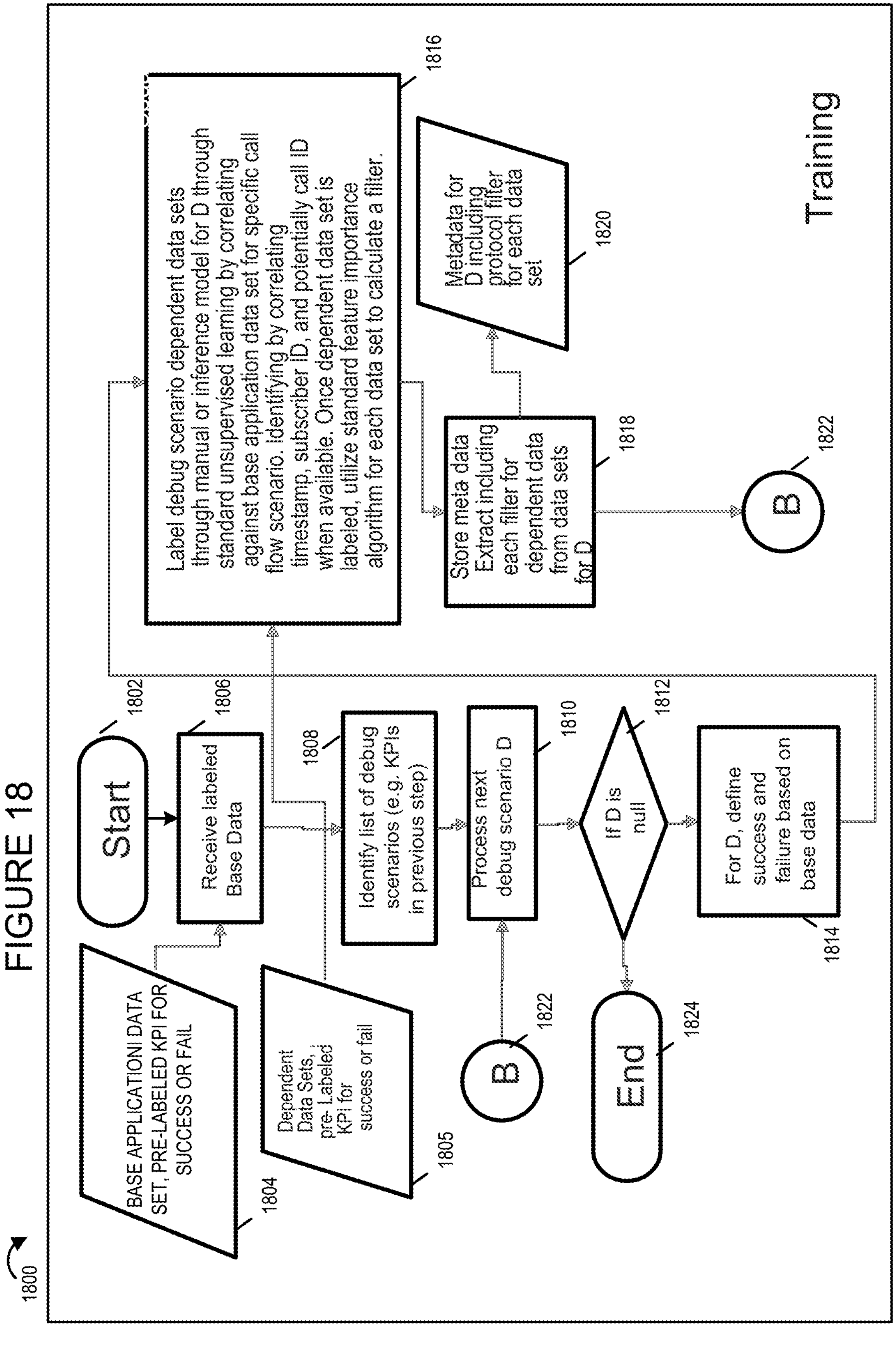
FIG. 18 is a drawing illustrating a flowchart of another method in accordance with an embodiment of the present invention.

FIG. 18 illustrates a flowchart 1800 of an exemplary method in accordance with an embodiment of the present invention. The flowchart shows a method involving training and/or generating metadata for a debug scenario as well as a protocol filer for each data set for use in generating a cross-layer KPI. In some embodiments the steps in flowchart 1800 are performed by an analytics system, e.g., analytics system 110 of system 100 or analytics system 1010 of system 1000.

The method commences in start step 1802. Operation proceeds from step 1802 to step 1806. In step 1806, receive labeled base application data 1804 which is pre-labeled KPI for success or failure. In some embodiments the pre-labeling for success or failure is done as discussed below in connection with FIGS. 2 and 3. Operation proceeds from step 1806 to step 1808.

In step 1808, identify list of debug scenario (e.g., KPIs in previous step). Operation proceeds from step 1808 to step 1810. In step 1810, process next debug scenario D. Operation proceeds from step 1810 to decision step 1812. In decision step 1812 determine if debug scenario D is null (e.g., there are no more debug scenarios to be processed). If D=null, operation proceeds from step 1812 to end step 1824 where the method 1800 ends. Otherwise, operation proceeds from step 1812 to step 1814. In step 1814, for debug scenario D, define success and failure based on the base application data. Operation proceeds from step 1814 to step 1816. In step 1816, received dependent data sets, pre-labeled KPI for success or fail 1805 and label debug scenario dependent data sets through manual or inference model for D through standard unsupervised learning by correlating against base application data set for specific call flow scenario. Identifying by correlating timestamp, subscriber ID, and/or call ID when available. Once dependent data set is labeled, utilize standard feature importance algorithm for each data set to calculate a filter. Operation proceeds from step 1816 to step 1818.

In step 1818, store in a storage device meta data extract including each filter for dependent data from data sets for D. Metadata for D including protocol filter for each data set 1820 may be retrieved from the storage for use during generation of a cross-layer KPI for the debug scenario. Operation proceeds from step 1818 via connection node B 1822 to process next debug scenario D step 1810 where the method continues as previously described.

Figure 19:
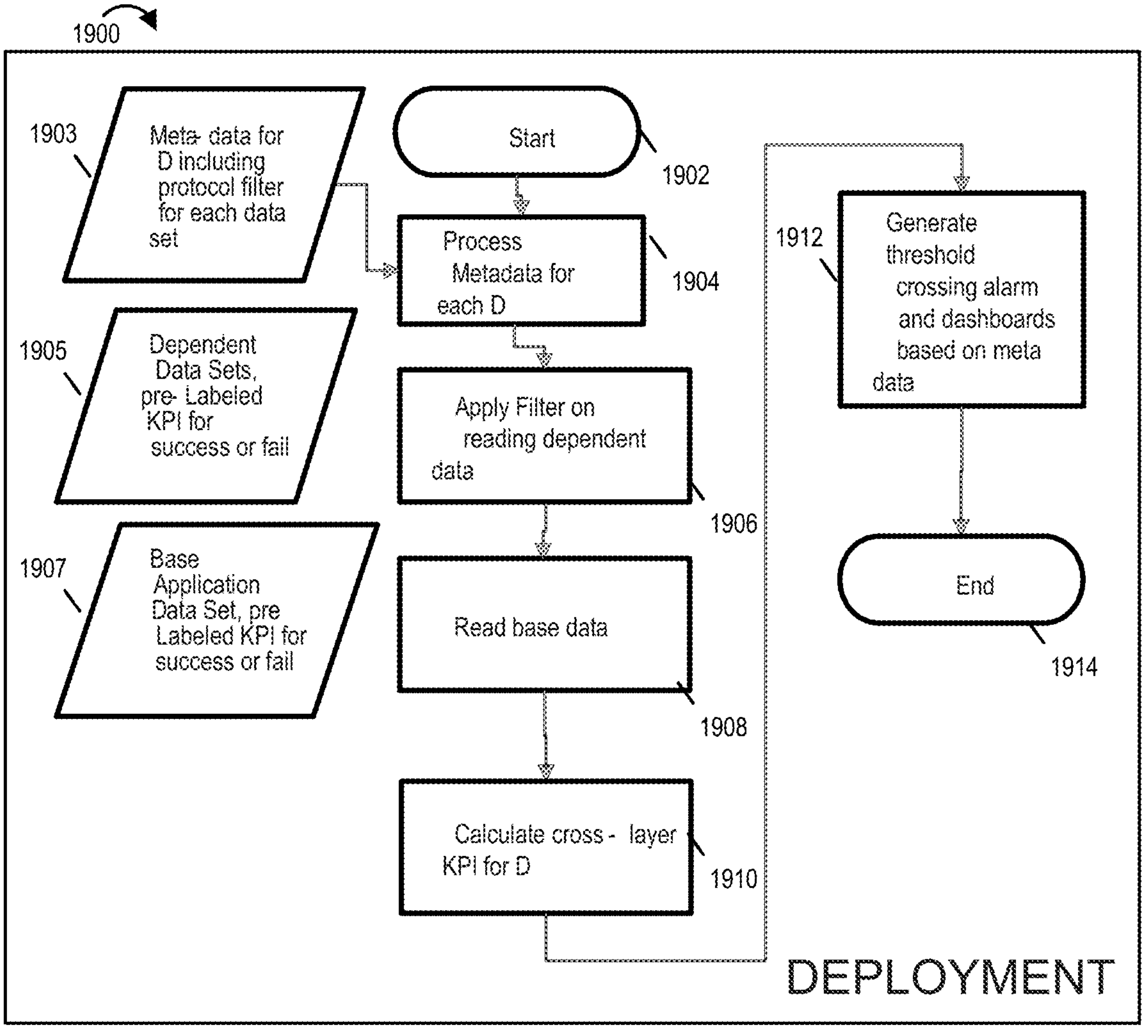
FIG. 19 is a drawing illustrating a flowchart of another method in accordance with an embodiment of the present invention.

FIG. 19 illustrates a flowchart 1900 of an exemplary method in accordance with an embodiment of the present invention. The steps of the method may be, and in some embodiments are implemented, by an analytics system 110 of system 100 or analytics system 1010 of system 1000 which has been deployed to generate cross-layer KPIs based on debug scenarios, e.g., after training of the system. The flowchart shows a method involving generating/calculating a cross-layer KPI for a debug scenarios as well as generating threshold crossing alarms and dashboards based on meta-data. The method starts in start step 1902. Operation proceeds from step 1902 to step 1904. In step 1904, meta data for debug scenario D including protocol filter for each data 1903 is received. In step 1904 process metadata for each D (debug scenario). Operation proceeds from step 1904 to step 1906. In step 1906, apply filter on reading dependent data, e.g., dependent data sets, pre-labeled KPI for success or fail data 1905. Operation proceeds from step 1906 to step 1908. In step 1908 read base data, e.g., base application data set, pre-labeled KPI for success or fail 1907. Operation proceeds from step 1908 to step 1910. In step 1910, the analytics system generates and/or calculates a cross-layer KPI for the debug scenario D. Operation proceeds from step 1910 to step 1912. In step 1912, generate threshold crossing alarm and dashboards based on meta. Operation proceeds from step 1912 to end step 1914 wherein the method ends.

Network Based Analysis: Example 1-Failed Registration Call Scenario

The operator receives a complaint from subscriber(s)—"I Can't Make VOLTE Calls". The operator from CDRs generates a cross layer dashboard depicting a registration debug call scenario. Refer to Figure B shown above.

The following "failure-only" data sources are collected as well as successful data sources for SIP registrations:

- LTE Control Plane
  - Failure-1—Access side—RRC, ECM and EMM Establishment—$F_{fr,s1mme,f\text{-}1}$
  - Failure-2—Core Side—Session and (Default) Bearer Establishment—$F_{fr,s11,f\text{-}2}$
  - Failure-3—Core Side—Authentication and Update Location—$F_{fr,S6a,f\text{-}3}$
  - Failure-4—Policy Related—IPCAN Establishment procedure to setup default QoS profile and 5 tuple—$F_{fr,Gx,f\text{-}4}$
- IMS Control Plane (SIP Registration Failures in this scenario)
  - Failure-5—non 200 OK received IMS Authorization—$F_{fr,Gm,f\text{-}5}$ A Failure Rate for Failed Registration is calculated as follows:

$$FR_{fr} = (F_{fr,s1mme,f-1}+F_{fr,s11,f-2}+F_{fr,s6a,f-3}+F_{fr,Gx,f-4}+F_{fr,Gm,f-5}) / (F_{fr,s1mme,f-1}+F_{fr,s11,f-2}+F_{fr,s6a,f-3}+F_{fr,Gx,f-4}+F_{fr,Gm,f-5})+Ss)$$

The user finds that there are failures at the IMS Control plane because Ffr,Gm,f-5 !=0, and the underlying cause code is 401 Unauthorized, while all other protocol interface have Fs,i,f=0.

Problem resolution: IPSec failures for certain subscribers. They use IPSec encryption algorithms !=ESP_NULL.

Network Based Analysis: Example 2—Dropped Call Call Scenario

The operator receives a complaint from subscriber(s)—"I am having Call Drops when I move out from my office". The operator from CDRs generates a cross correlation dashboard for a Call Mobility (i.e. calls undergoing Handover) debug scenario. He finds there are 4 possible types of handovers, (Intra RAT (X2 and S1) Handovers, Inter 3GPP Handovers—GSM and UMTS, Inter 3GPP and non3GPP (WiFi) Handovers and CSFB). The operator initially focuses on Intra RAT (X2 handover).

The following "failure-only" data sources are collected as well as successful data sources for SIP INVITE requests:

- Pre-requisite-All successful calls for which handover (HO) was triggered
- LTE Control Plane
  - Failure-1—Before Handover—RRC Messages for Measurement-$F_{dc,rrc\text{-}preho,f\text{-}1}$
    - No handover triggered and No call drops
  - Failure-2—X2 Messages—$F_{dc,X2,f\text{-}2}$
    - Handover Preparation Phase—(Handover Request, Handover Request Ack)
    - Identify a target enodeB, S1 bearer (UL), Admission Control
  - Failure-3—RRC Messages $F_{dc,rrc\text{-}hoexecute,f\text{-}3}$
    - Handover Execution-Latch to target eNodeB and set up DRB (DL)
    - Handover Confirm
  - Failure-4—Handover Completion Phase-$F_{dc,rre\text{-}s1mme,f\text{-}4}$
    - Path Switch Request
  - Failure-5—Handover Complete Phase-$F_{dc,rrc\text{-}s11,f\text{-}5}$
    - Modify Bearer Request/Modify Bearer Response to inform the new TE (Tunnel Endpoint) Id and initiate End Marker
  - Failure-6—IMS Control Plane
    - SIP Re-Register in the new cell with a new PANI header—$F_{dc,Gm,f\text{-}6}$ A Failure Rate for Drop Calls is calculated as follows:

$$FR_{dc} = (F_{dc,rrc-preho,f-1}+F_{dc,X2,f-2}+F_{dc,rrc-hoexecute,f-3}+F_{dc,rrc-s1mme,f-4}+F_{dc,rrc-s11,f-5}+F_{dc,Gm,f-6}) /$$

-continued $$((F_{dc,rrc-preho,f-1}+F_{dc,X2,f-2}+F_{dc,rrc-hoexecute,f-3}+F_{dc,rrc-s1mme,f-4}+F_{dc,rrc-s11,f-5}+F_{dc,Gm,f-6})+Ss)$$

The user finds that there are many more failures (>90%) at the HO preparation phase because Fdc,x2,f-2 !=0, and underlying cause code is primarily S1AP cause code 1-6 (Handover failure in target) while all other protocol interface have significantly fewer failures (<10%) Fs,i,f !=0, in total.

Problem resolution: User does not have access to the target cell controlled by Target eNodeB.

Various embodiments of the present invention reduce resources (e.g. storage, memory, network and/or processing requirements) per protocol thus reducing equivalent hardware needs for analytics processing. In some embodiments, it is expected that a 90% or even greater resources requirements reduction per dependent protocol may be achieved.

Event Detail Records

Event detail records are key to perform cross-layer debugging and understanding the progression of a call through a number of states in the life cycle which can range from registration, call setup, call progression, and call teardown within the SIP protocol. One type of event detail records are call detail records (CDRs). Other event detail records can perform session establishment with LTE EUTRAN or LTE EPC, application processing such as TCP flow records. Furthermore, the layered relationship between SIP and other protocols results in a complementary set of detail records that facilitate the call scenario.

Figure 6:
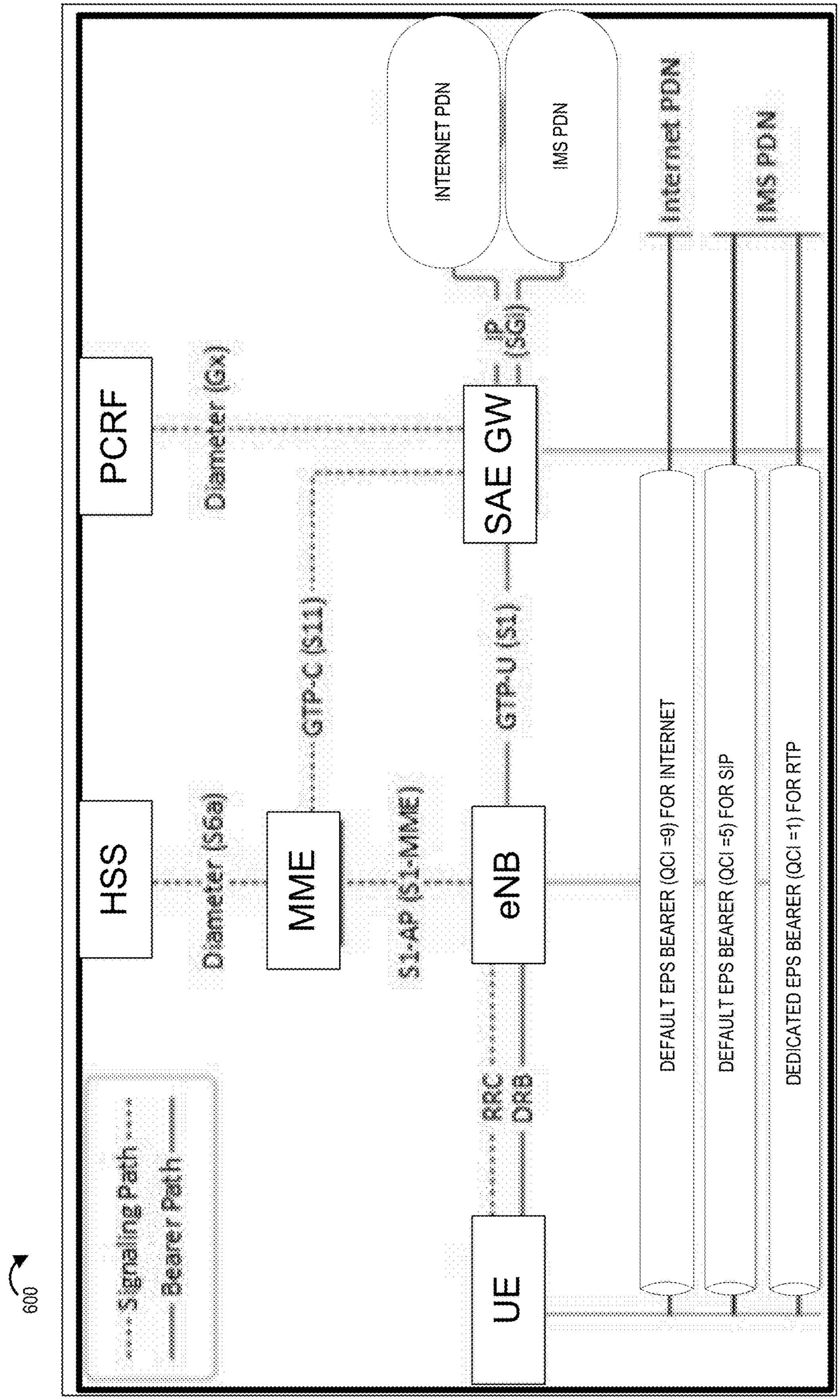
FIG. 6 is a drawing illustrating a portion of exemplary communications system on which the present invention may be utilized.

Diagram 600 in FIG. 6 is a drawing illustrating a portion of an exemplary communications network along with the signaling and bearer paths on which the present invention may be utilized. Event detail records may be, and in most embodiments are, defined for each of the network elements (e.g. MME, PCRF, HSS) and/or protocol interfaces (e.g. S1MME, S6a, S11).

Figure 7:
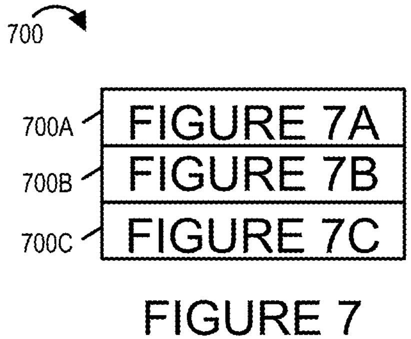
FIG. 7 comprises FIGS. 7A, 7B, and 7C.
Figure 7A:
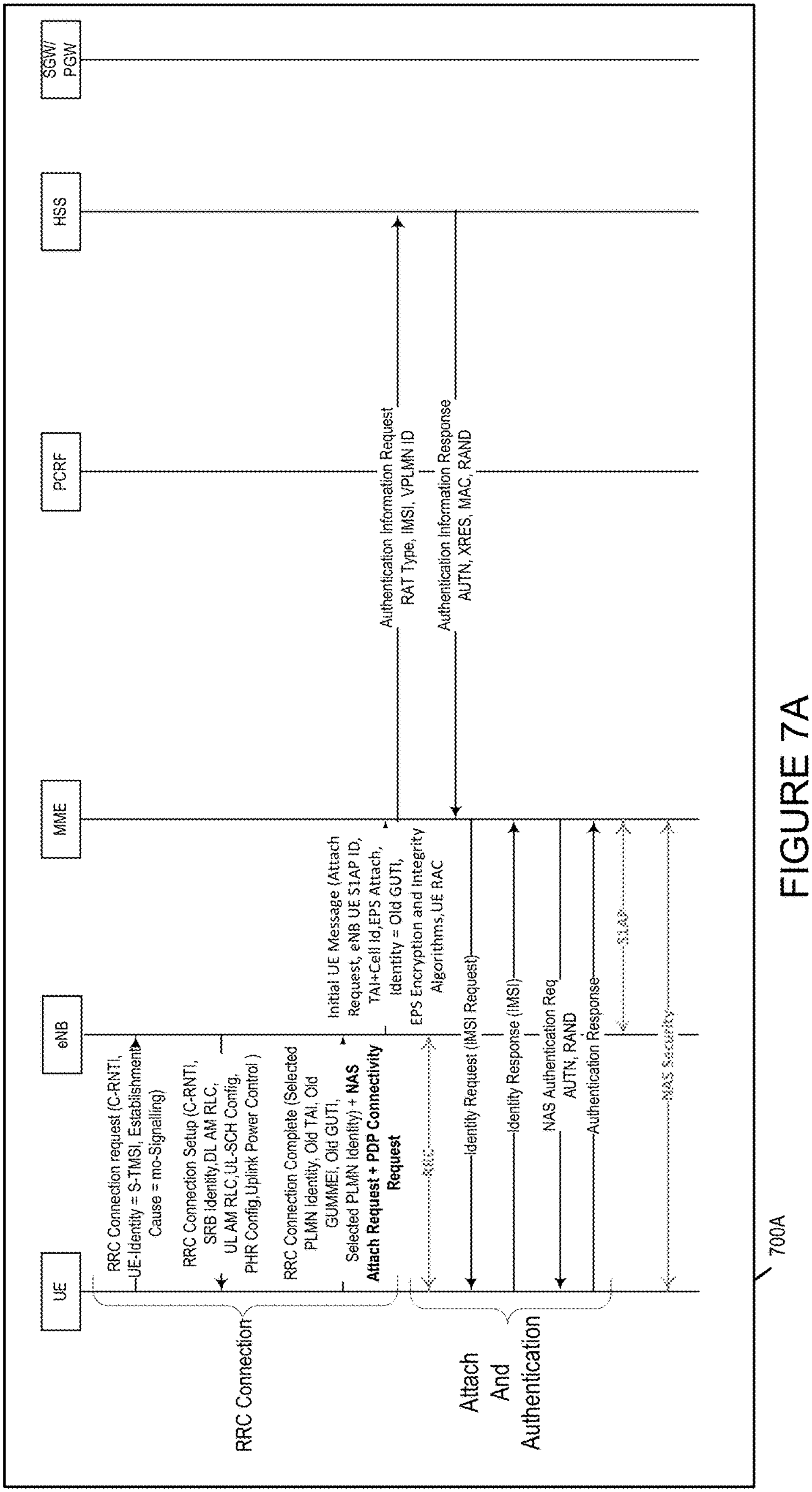
FIG. 7A illustrates a first part of a signaling diagram describing the setup of an LTE session.
Figure 7B:
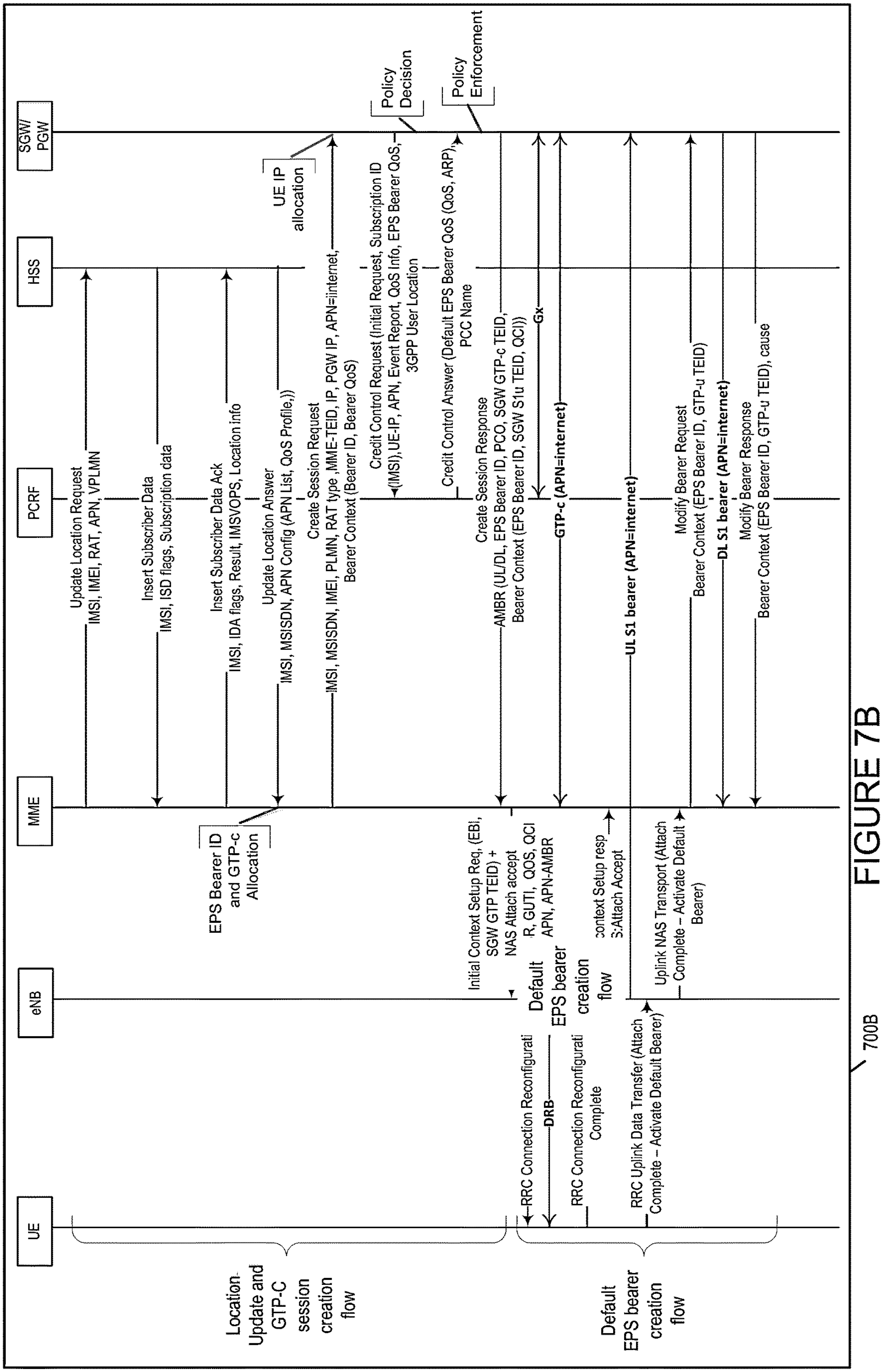
FIG. 7B illustrates a second part of a signaling diagram describing the setup of an LTE session.
Figure 7C:
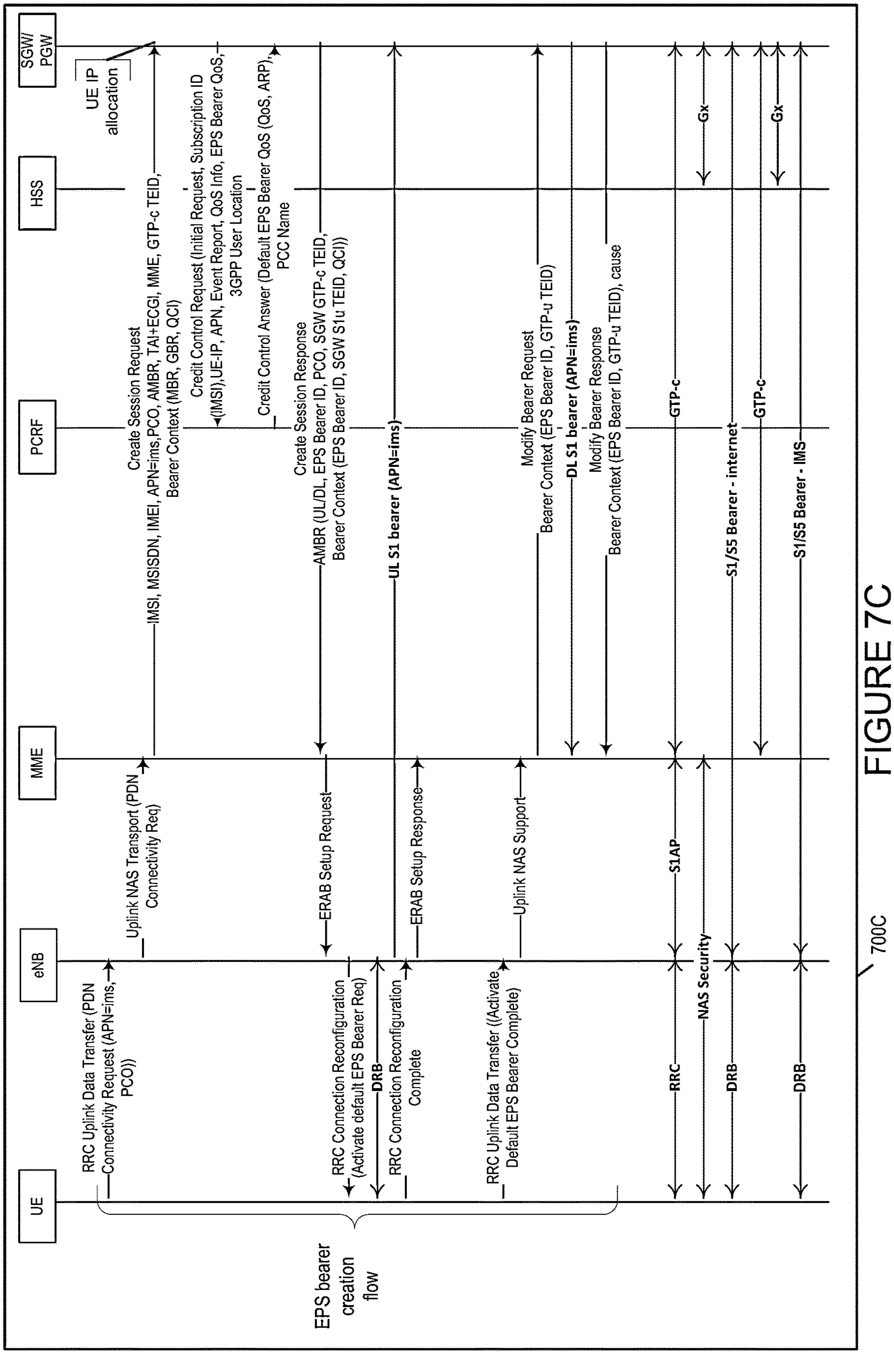
FIG. 7C illustrates a third part of a signaling diagram describing the setup of an LTE session.

FIG. 7 comprises FIGS. 7A, 7B, and 7C. Diagram 700 of FIG. 7 shows that 700*a*, 700*b* and 700*c* are part signaling ladder diagram 700. Diagram 700*a* of FIG. 7A illustrates a first part of a signaling diagram 700 describing the setup of an LTE session. Diagram 700*b* of FIG. 7B illustrates a second part of a signaling diagram 700 describing the setup of an LTE session. Diagram 700*c* of FIG. 7C illustrates a third part of a signaling diagram 700 describing the setup of an LTE session. The signaling diagram 700 illustrates the signaling across various domains of a complex network including a Radio Access Network, a Packet Core network, and an IMS Core network to setup an LTE session. The signaling diagram 700 will now be explained in connection with diagram 600 of FIG. 6 which illustrates a portion of an exemplary communications network on which the present invention may be utilized. Only relevant signaling to help understand the present invention shown. It will be understood that other signaling may, and typically is, involved in establishing an LTE session.

The connection establishment progresses through the following phases which are shown: (1) RRC Connection Establishment, (2) Attach and Authentication, and (3) Default Bearer Setup.

During RRC Connection Establishment phase, the Radio Resource Control (RRC) layer establishes a connection between the user equipment (UE) and the eNodeB. This procedure is initiated with a random access with a preamble. This is followed up with RRC connection establishment signalling on the uplink-shared channel (UL-SCH) and downlink-shared channel (DL-SCH).

In the Attach and Authentication phase, the UE now attaches to the Core Network. The Mobility Management Entity (MME) and Serving Gateway also establish a context for the UE. This phase also involves authentication for the UE as well by the network.

In the Default Bearer Setup phase, the default bearer for data transfer is finally established. The default bearer session is established at the UE, eNodeB, MME, Serving Gateway (GW) and Packet Data Network (PDN) Gateway. User data sessions is exchanged once the default bearer is setup.

When the UE is turned on, it establishes a PDN connection with a default access point name (APN). Typically, the operator provides two APNs, i.e., “Internet” APN and the “IMS” APN. The default APN is an “Internet” APN that is used for internet data traffic and its default Evolved Packet System (EPS) bearer has a Quality of Service Class Identifier (QCI) value of ‘9’. After the PDN connection is established with the internet APN, the UE attempts additional PDN connection with the IMS well known APN, i.e., “IMS APN”. The IMS APN is preconfigured in the UE and its default EPS bearer has a QCI value of ‘5’ being used for Session Initiation Protocol (SIP) signaling. Once the PDN connection with the IMS APN is completed and the default EPS bearer is successfully created, the UE is able to communicate with the IMS Core network for VOLTE call service. The signaling diagram illustrates that are multiple protocols which are involved in establishing the setup of an LTE session and which can be, and in some instances are, the source of the cause of a failure to establish an LTE session.

Similarly, as previously described, a VOLTE Registration can include RRC, S1MME, S11, S5/S8, and S6a protocols to assist with the SIP (Gm) Registration. Each of these protocols would require specific transactions, e.g., transaction events. In this call flow, before a UE can initiate a SIP Register a number of steps are required. In one call flow scenario, UE device is powered on, resulting in an RRC Connection Setup between the UE and the eNB, followed by a PDN Connectivity Request between the UE and the MME, followed by Authentication between the MME and the HSS, followed by Location Update between the MME and the HSS, followed by Create Session Request between the MME and the SGW/PGW, followed by IP-CAN Session Establishment between the PGW and the PCRF, followed by Activate Default EPS Bearer Context Accept between the UE and the MME, followed by a Modify Bearer Request between the MME and the SGW, followed by a SIP Register Request/Unauthorized response between the UE and the P-CSCF, followed by a successful SIP Register between the UE and the P-CSCF.

Each one of the network elements/entities will have an associated set of data or event detail records, e.g., call detail records (XDRs). In this example, the event detail records are call detail records (CDRs). However, the event detail records can, and in some embodiments do, include event data outputs, database or data lake schema access, equivalent logs, etc. As the network elements and underlying protocols have correlated data, the event detail records, XDRs which in this example are CDRs will have a common set of elements including:

1. protocol interface—definition of protocol
2. start timestamp—start of transaction
3. duration—lifecycle of transaction 4. protocol command—specific details of protocol interaction associated with interface (e.g. SIP method such as register or invite; Diameter command code; GTPC command, etc.).
5. call_id—identifier representing unique call, session, 5-tuple, etc.
6. cause—protocol defined result of transaction which generally falls into progress or outcome in the form of an error code, request or response code, cause code, etc.
7. sub_id—unique subscriber identifier (e.g. International Mobile Subscriber Identifier)
8. mobile_no—unique telephone calling number (e.g. MSISDN)
9. device—identification of device used by the subscriber
10. location—specific location in network such as cell location, lat/long, etc.
11. network element—one or more network elements in the form of Internet Protocol (IP) address or other canonical form
12. apn—access point name representing the application
13. mnc—identification of network within a country associated with service provider, telecom vendor, enterprise, etc.
14. mcc—identification of the country the network resides
15. rat_type—access network type
16. qos—quality of service Though many of these fields are useful for debugging and are part of a much larger set of per protocol specific fields, the key fields for the current invention may be limited to protocol, protocol_command, cause, sub_id, start timestamp, call id.

With this limited information, two additional details can be derived:

1. call_outcome—for the CDR, is the result a failure or success. This is described in a section below.
2. call_scenario—the more critical piece is categorizing every event into one or more call scenarios, which may include, in the VOLTE Services case, call registration, call setup, call progression, mobility, quality, and call teardown.

FIG. 12 is a table illustrating the commonality of various fields in event data records created for or corresponding to different protocols as well as the augmentation of the data fields to include a call-outcome field and a call_scenario field that can be derived from the information as discussed above. The entries in the first row of table 1200 includes labels identifying what the data in each column corresponds to. The label "Field Name" in the entry in the first row and first column indicates that the each of the entries in the first column identify a field in an event data record. The labels in columns 2 to 11 of the table identify different communications protocols. A "1" in a table entry for a row X, column Y of the table indicates that the field identified in row X is included in event data records for the protocol identified in column Y, X=2, . . . , 19 and Y=2, . . . , 11, whereas the absence of "1" indicates the field is not included. The entries in row 21 identify the total number of fields available for the protocol identified in the column. For example, protocol S1MME has 111 total fields while protocol GTPC (S11) has 46 total fields.

The present invention also supports the ability to automatically extend a network analytics application for various change scenarios such as for example adding new protocols, extending existing protocols, or Service Provider change requests, thus allowing for code-free feature expansion. This is achieved in at least some embodiments by maintaining metadata within the overall procedure, which can be used to automatically generate workflows, dashboards, alarm generation, and other network troubleshooting functions.

As an example, if the Service Provider is upgrading the network to support a newer release of a mobile protocol standard, this may, and sometimes does, introduce additional call flow scenarios (e.g. a new QoS parameter negotiation, or authentication procedure) which may, and in some instances does, include new failure paths of existing protocols or new protocols for VOLTE/VoWiFi services. Various embodiments of the present invention would capture these change scenarios, either manually through configuration or automatically by learning the changes through pattern recognition via protocol analysis over a period of time. These change scenarios would be run through the steps of the exemplary method discussed above, which can extend dashboards such as that shown in FIG. 5 to include new protocol(s) or new failure scenarios across the bottom half of the dashboard. Similarly, impacted cross-layer Key Performance Indicator (KPI) calculations would be automatically regenerated to include the changes. Other features would have similar automated updates.

The generation of event records, e.g., event detail records, will now be discussed as well as how "call outcome" is added for each type of protocol record. In this discussion event records are implemented and discussed as event objects. An event object being a form of an event record.

Figure 2:
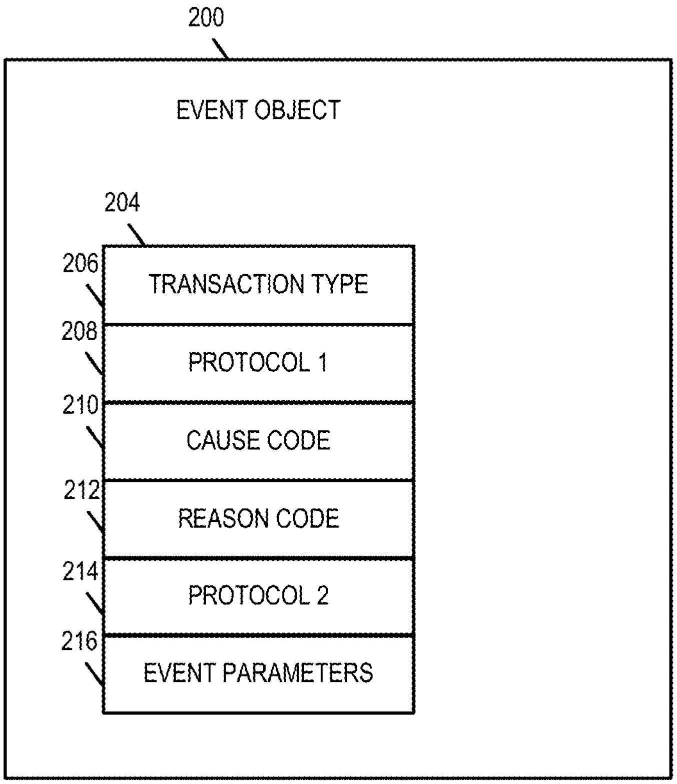
FIG. 2 is a drawing illustrating an event object in accordance with an embodiment of the present invention.
Figure 14:
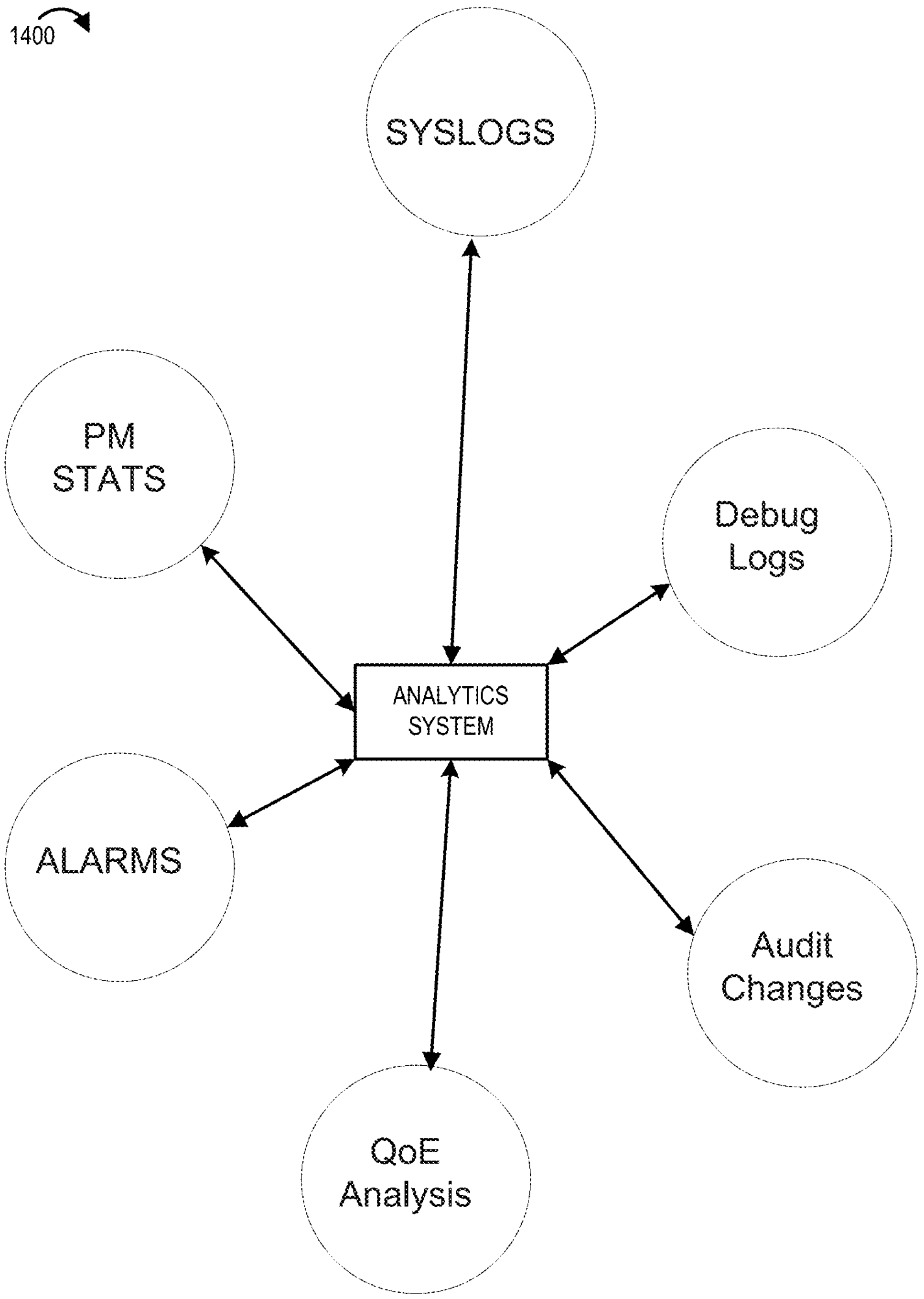
FIG. 14 is a drawing illustrating various data sources that can be utilized in some embodiments in the generation of event data records.

Event objects are generated from data received from various sources including network elements/devices, network functions (e.g., network data analytics function), OSSs/NMSs/EMSs, test points, probes and/or sensors distributed throughout the communications system and/or network being monitored. Diagram 1400 of FIG. 14 illustrates additional data sources from which event objects can be generated or obtained including SYSLOGS, performance management statistics, alarm system data, Quality of Service Analysis metrics, Debug Logs, and Audit Change data. An event object may be, and in some embodiments, is implemented as a data structure which holds data corresponding to a specific or individual event which has occurred. In some embodiments, the event object is a table stored in memory or a database accessible to the network monitoring system. FIG. 2 is a diagram showing an illustrative event object 202 that may be classified into a particular KPI based on information 204 from at least two different protocols contained therein. In the present example, the event object 202 includes a transaction type field 206, a plurality of protocol fields (i.e., a first protocol field 208, and a second protocol field 214), a cause code field 210, a reason code field 212, and an event parameters field 216. It is to be understood that while only two protocol fields have been shown in exemplary event object 202 the number of different protocols may be, and in various embodiments includes as many protocol fields as protocols being utilized in the communications network or system being monitored.

The transaction type field 206 indicates the type of transaction associated with the event. For example, the transaction type may be a register transaction. This may be, for example, a SIP register request. A register request is used by a device to let a server know where it is (i.e., it's destination address). The transaction type may also be a deregister transaction. The transaction type may also be an invite request. An invite request sends a message to a server requesting to set up a communication session. The transaction type may be a bye request, which is used to end a communication session. Other transaction types may include reinvite, an Sv_REQ_RESP transaction, an Sv_COMP_NTFY transaction, and an Sv_CNCL_NTFY transaction.

A given call is typically expected to include multiple transactions from the beginning of the call, through the data transfer, and to the end of the call. Thus, an event object associated with a particular call may include multiple transactions.

The first protocol 208 field indicates the type of communication protocol associated with a transaction of the event object 202. Various protocols may include, SIP, RTP, Q.850 and others. Such protocols include various operations to establish calls or transmit data between endpoints. Such protocols also use cause codes and reason codes to indicate the success or failure of certain actions. In fact, many protocols have their own sets of cause codes.

The cause code field 210 lists a cause code associated with the event object 202. For example, the cause code may be 200, indicating success; a cause code may be 400, indicating a failure; a cause code may include 486, indicating that the callee is busy (all three examples being SIP cause codes). There are a variety of other cause codes to indicate various outcomes. The reason code field 212 may include more specific information about the reason why a particular cause code was provided. For example, there may be several reasons why a cause code 486 is provided. The reason code may give more specific information as to why the callee is busy. Many protocols have their own sets of reason codes.

The second protocol field 214 may include information from another protocol. For example, the second protocol field 214 may include information from a lower layer such as a physical layer protocol that is associated with the transaction. In other words, while the transaction type for protocol 1 may be a SIP INVITE transaction, the information within the second protocol field 214 may indicate a radio failure. Thus, while the cause and reason codes for the first protocol transaction (e.g., SIP INVITE) provide some information, the additional information from another protocol may provide more specific information to classify an event as a dropped call and identify the underlying reason for the dropped call.

The event parameters field 216 may indicate a variety of information associated with the event. For example, the event parameters field 216 may indicate the types of device or devices indicated in the event. For example, if the event relates to a call between two mobile devices, then the event parameters field may include information identifying both caller and callee devices. In some cases, only the callee device may be provided. The event parameters may include other types of information such as geographical location, specific eNodeb's involved in the event, specific routers, specific servers, etc.

FIG. 3 is a diagram showing an exemplary rules table 300 that may be, and in some embodiments is, used to group, categorize and/or classify event objects such as for example, the event object 202 shown in FIG. 2. While the rules table 300 may be, and in some embodiments is stored in memory of the network monitoring system and/or in a storage device, e.g., a database coupled and/or connected to the network monitoring system.

According to the present example, the rules table 300 includes a number of columns. Specifically, the rules table includes a set of event columns 305, a subcategory column 311, and a set of KPI columns 312. The event columns 305 include a transaction type column 302, a first protocol column 304, cause code column 306, a reason code column 308, and a second protocol column 310. While in this example only two different protocols are shown a first protocol and a second protocol, the number of protocol columns in various embodiments will match the number of protocols utilized in the communications network and/or system being monitored.

The rules table 300 also includes several entries 301. Each entry 301, includes various combinations of information from the event columns. For example, there may be several entries that list an "invite" in the transaction field. For each of the entries that have an "invite" in the transaction field, there may be several entries with a particular cause code. For each entry with a particular transaction and cause code, there may be entries with various protocol types and reason codes.

For each entry, there are a number of KPI columns. Each KPI column 312 (e.g., A, B, C, or D) may correspond to a different KPI. As mentioned above, KPIs may include successful call attempt, failed call attempt, dropped call, media failure, successful registration, failed registration, inter-working success, and inter-working failure. In some examples, for each entry 301, there may be a "1" in one of the KPI columns indicating that the combination of information from the event columns 305 of that entry correspond to that particular one of the KPI columns. The rest of the columns in that entry 301 may include the value "0." In some examples, a particular entry may identify with more than one KPI and thus there may be multiple '1's in the KPI columns for a given entry. In some examples, instead of having a number of KPI columns with ones and zeros, there may be a single KPI column in which a particular KPI is listed. A more detailed example of a rules table may be found in U.S. provisional patent application No. 62/763,969 filed on Jul. 12, 2018.

As a more specific example, both entries 301*a* and 301*b* include a "1" in column A. Thus, in the example, where A represents a failed registration, the rules table provides two different situations in which the KPI is a failed registration. Additionally, entry 301*c* includes a 1 in both the B column and the D column. Thus, some entries may be associated with more than one KPI.

Using the rules table 300, the analytics system (e.g., 110 FIG. 1) may classify event objects received from network equipment devices, probes, sensors, Operations Support Systems, Data Lakes, EMSs and/or NMSs. For example, a received event object may indicate a register transaction using SIP with a particular cause code and reason code. The analytics module may find an entry 301 with those parameters and classify the event object based on the KPIs corresponding to that entry. For example, the analytics module may determine which columns of the matching entry have a "1" in the KPI columns 312. The classified event object may then be passed to the inference module In some examples, classifying an event object to a particular KPI may involve a subset of the protocol attributes. In other words, classification may rely on some, but not all of the protocol attributes. For example, failed call attempts and successful call attempts involve SIP protocol transaction information, but do not rely on RTP protocol information. The event table that stores records for multiple protocols may be first filtered by removing "unused" protocols, thus reducing the data volume to be processed by machine-learning functions or rules table processing. For some KPIs such as established calls, unique calls may be determined first based on concatenation of CallID with IMSI information, and then UniqueCallIds may be used to filter the event data for other KPIs such as one-way calls, media gaps etc. This information may be used to form a deep learning chain for classification.

Each transaction may include a request and one or more response events. For example, a user CALL attempt using an INVITE Transaction, may be completed with 200OK response or provisional response indicating progress, as well as a 200 OK Response. Each response has one or more cause attributes, for example status codes per SIP Protocol (RFC 3261) and reason header from ISUP (Q.850). The status and reason fields broadly differentiate success codes (1XX), client failures (4XX), server failures (5XX) etc., at the SIP transaction level. These SIP codes do not classify underlying subsystems, and also do not classify behavior of user data (RTP) such as one-way data, media gaps etc. The rules table of FIG. 3 associates a plurality of protocol flows with a VOLTE/VILTE call, characterizes the failure or quality of the call, and identifies the possible subsystems for next level of trouble-shooting for root cause.

Summarized information from RTP data records that include, downlink bytes, uplink bytes, interpacket gaps, jitter, delay, UP Link timeouts, Downlink Timeouts etc., are combined with SIP call records "DATA" events by correlation using IMSI, User IP Addresses, SGW, ENB IP Addresses, TCP/UDP Port Numbers, event Timestamps etc. Similarly, event data from other protocol events, such as S11 tunnel creation/deletion events, Sv (SRVCC) VOLTE to CS Handover are correlated using common attributes such as IMSI, MSISDN, From/To Identifiers, event time stamp etc. The cause code for the event, and its effect on the VOLTE call (SIP or RTP) flows of user calls is identified. For example, a tunnel deletion event due to "Inactivity" or "Radio Connection with UE Lost," could cause a timeout in an RTP or SIP transaction. Based on event timestamps of SIP and RTP, the call duration may be computed. For example, the difference between timestamps of BYE and INVITE with the same callID, or the difference between the 1st and last time stamp with the same IMSI.CallID may indicate the total duration of that call.

Uplink/downlink data volume for the same user (IMSI) by other applications (other Radio Access Bearers) may also be captured. This helps in identifying Multi-Application (e.g., VOLTE and NON-VOLTE applications in an overlapped time) calls and increases the confidence level for "failure category". For example, when a mobile user is in a bad coverage area, uplink/downlink volumes in the UL tunnels for both VOLTE and NON-VOLTE may be low and helps identify the failure category as "RADIO Reason."

Priorities are assigned considering the protocol, protocol status code and the reason protocol along with the reason code. The failure cases are assigned with sub categories based on the underlying status/reason codes and possible subsystems that the status or reason codes correspond to. Based on correlation IDs within event data, and event time stamps, all the protocol events corresponding to a user and call are grouped to determine the "subcategory" column 310 in the rules table 300.

The subcategory column 310 may further categorize events by more than just a generic KPI. For example, the subcategory column 310 may include labels such as Device issue, IMS core issue, server busy/packet loss, IMS core provisioning, IMS core routing, breakout call failure. If, for a particular entry, a particular combination of information from the event columns 305 does not correspond to a particular subcategory label, then the field in the subcategory for that entry may be denoted as "other."

Further details regarding the generation and use of event objects and rules tables such as for example, event object 200 and rules table 300 are discussed in U.S. Provisional Patent Application Ser. No. 62/763,969 filed on Jul. 12, 2018 and U.S. patent application Ser. No. 16/969,822 filed on Jul. 12, 2018 and which published on May 6, 2021 as U.S. Patent Application Publication No.: US 2021/0135954. The U.S. Provisional Patent Application No. 62/763,969 and U.S. patent application Ser. No. 16/969,822 are both herein incorporated by reference in their entirety.

Adding "call scenario" to core and related protocols may utilize similar method to "call outcome" procedure in simple cases. However, more typically a rules engine or machine learning algorithm to associate "call scenarios" is required to extract out particular events associated with a "call scenario". For example, to follow the core and related protocols for a VOLTE Registration the following rules are required for a set of CDRs to define call scenario of "Attach, Authenticate, and Register":

1. SIP: protocol command=REGISTER and rat_type=LTE
2. Diameter: interface=S6a, protocol command=UAR/A, rat_type=EUTRAN or Null
3. Diameter: interface=Gx, protocol command=CCR/A
4. GTPC: interface=S11, protocol command=Modify Bearer, rat_type=EUTRAN or Null, qos=5
5. EUTRAN: interface=S1mme, protocol_command=Context Setup Failure, qos=5

FIG. 13 shows table 1300 which illustrates a number of event transactions associated with call scenario "Attach, Authenticate, and Register" showing examples of success and failure on the inter-related protocols. The main advantage of this approach is that all intermediate successes are ignored as they have limited value in monitoring, managing and trouble shooting networks. The only information that is valuable or that is particularly valuable is what protocol layer resulted in a failure or did the request ultimately succeed.

In various embodiments, the relationship between protocols is automatically determined using machine learning algorithms (e.g. unsupervised clustering algorithms, natural language processing), e.g., on event data obtained from event data records (e.g., CDRs). The clustering may utilized numerical algorithms when all data is continuous such as time (e.g., time of event/transaction), or nominal algorithms when processing a combination of numerical and categorical data such as time and subscriber information (e.g., information which uniquely identifies a subscriber, IP address, user device identification information, IMSI subscriber ID, etc.). Other information such as cause code descriptions, protocol descriptions, and command code descriptions which may be more descriptive in terms of event data may also utilize natural language processing and word embeddings to learn word clusters from frequently seen sequences.

In certain scenarios, underlying protocol failure will result in cause code to percolate back to upper protocol layers. For example, in connection with a VOLTE Registration, a GTPC S11 Create Session Request may fail due to internal resources of SGW, but may also fail due to underlying PCRF Credit Control Request failure. This relationship between cause and effect can be automatically detected by correlating multiple errors or the same subscriber identifier, call identifier and time. Table 1300 shown in FIG. 13 shows this automatically discovered relationship between S6a protocol and S1mme protocol due to authentication failure. The table 1300 may be, and in some embodiments is generated by an analytics system.

While various exemplary embodiments for building of voice service assurance systems and operational analysis and management across a number of network domains in voice over LTE mobile network the invention is not limited to the exemplary embodiments described. For example, the invention is also applicable for providing network communications services across past and future mobile technologies (e.g. 2G, 3G, 5G), other fixed network solutions (e.g. Cable Networks), as well as other services such as broadband Internet access, video distribution services, etc.

Exemplary Cloud-Native Use Cases

Similar to VOLTE Service analysis and other service related use cases such as broadband Internet access utilizing protocols, the invention is also applicable and may, and in some embodiments is, used for virtualized network functions such as for example networking elements that transitioned to cloud-native applications utilizing micro services, containerization and REST APIs such as for example those specified in 5G Service Based Architecture (SBA) and 5G Core (5GC).

Exemplary 5G usage scenarios include: Classifying event feeds (observability data, log files, service APIs) from network functions into call scenarios such as Network Data Analytics Function (NWDAF).

In cloud-native network applications a number of changes are introduced including: 1) protocol interactions replaced or partially replaced with REST APIs (table 1500 shown in FIG. 15 illustrates how protocols are being replaced by REST APIs in 5GC (5G Core) while underlying 5G Radio Access Network remains protocol based like 4G RAN, 2) functions decomposed to smaller (micro) services, 3) deployment models dynamically managed through orchestration and workload management to align with resource needs and underlying resources. This paradigm shift results in a network that cannot be statically monitored and therefore requires more adaptable techniques. The present invention allows for the ability to monitor, debug, troubleshoot and/or manage networks from a data driven perspective. By equating micro services with network elements and RESTful APIs with network protocols, the methods and procedures can be carried from a physical deployment model to a cloud deployment model. A set of exemplary numbered method embodiments as well as a set of numbered system embodiments are provided below which discuss various implementations of the invention using base REST-API and dependent REST-APIs.

Figure 16:
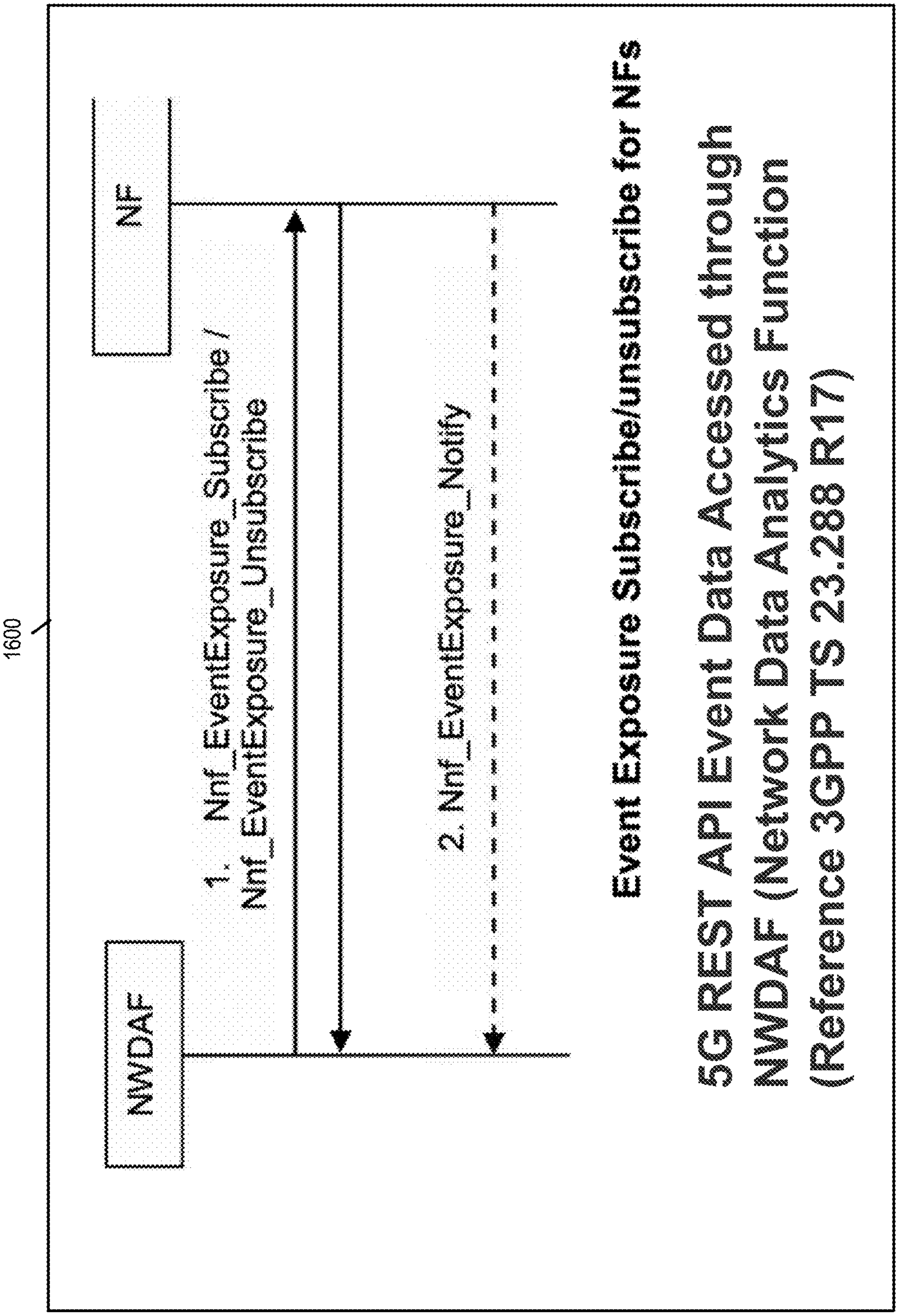
FIG. 16 is a drawing illustrating 5G REST API Event Data being Accessed through a NWDAF (Network Data Analytics Function).
Figure 17:
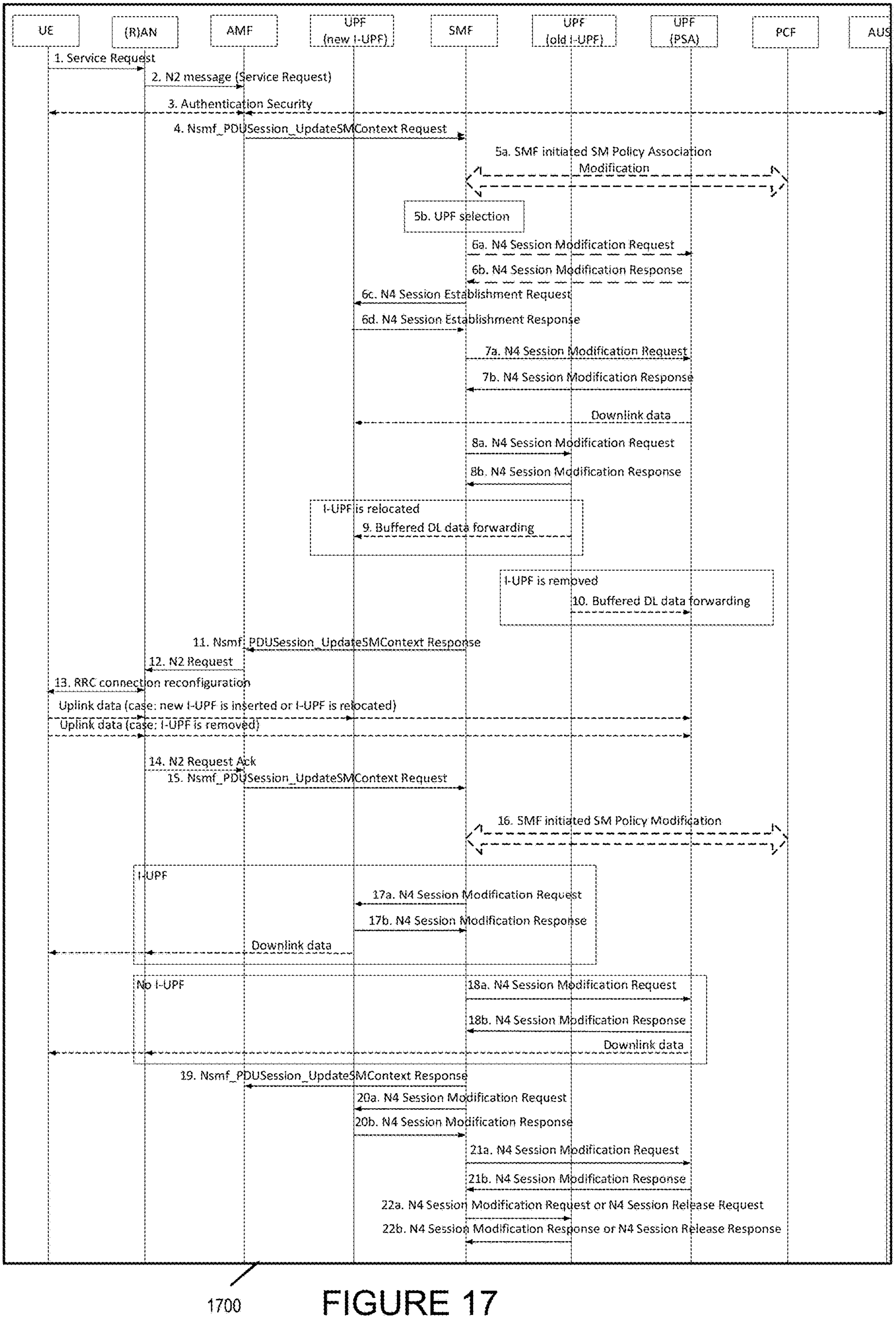
FIG. 17 illustrates a signaling diagram showing a 5G UE Triggered Service Request procedure.

3GPP TS 23.502 V17.1.0 (2021-06) technical specification entitled 3rd Generation Partnership Project; Technical Specification Group Services and System Aspects; Procedures for the 5G System (5GS); Stage 2 (Release 17) is herein incorporated by reference in its entirety. This specification discusses, among other things, a number of mixed technology examples of protocol and REST-APIs. Such as the UE Triggered Service Request Procedure, FIG. 4.2.3.2-1, illustrated on page 55, Section 4.2.3.2, which is a 5G variation of 4G Service Request. FIG. 17 illustrates this UE Triggered Service Request procedure in signaling diagram 1700. The signaling diagram 1700 illustrates among other things how the 5G protocol interface is interleaved with the equivalent 5G REST API. Furthermore, as shown in FIG. 16 diagram 1600 5G REST API Event Data can be accessed through NWDAF (Network Data Analytics Function). This diagram 1600 is taken from FIG. 6.2.2.2-1 of the 3GPP TS 23.288 R17 standard which is incorporated herein by reference in its entirety. Hence, event data is obtained in cloud based deployments using REST-APIs through NWDAF functions.

The 3GPP TS 23.501 V16.1.0 (2019-06) technical specification entitled The 3rd Generation Partnership Project; Technical Specification Group Services and System Aspects; System Architecture for the 5G System; Stage 2 (Release 16) is herein incorporated by reference in its entirety. The TS 23.501 V16.1.0 specification defines, among other things, various 5G network functions and in some cases there relationship to 4G Evolved Packet System elements.

The invention is also applicable to instances wherein mixed technology deployments are implemented. For example, in some cases the network elements are implemented as physical devices using a physical deployment model while other network elements are implemented as virtual network functions or virtual devices, e.g., virtual network functions implemented using a cloud deployment model.

In such mixed technology cases a cross-layer KPI for a scenario a which has a base protocol may be, and in some embodiments is, generated using the following equation:

CL-KPIa=((sum of base protocol failures)+(sum of dependent protocol failures for dependent protocol 0 to N, N being the number of dependent protocols)+(sum of dependent REST-API failures for 0 to M, M being the number of dependent REST-API failures))/(((sum of base protocol failures)+(sum of dependent protocol failures for dependent protocol 0 to N, N being the number of dependent protocols)+(sum of dependent REST-API failures for 0 to M, M being the number of dependent REST-API failures))+(sum of base protocol successes)), where N=0 when scenario a does not include any dependent protocols, M=0 when the scenario a does not include any REST-API protocol, with the condition that both M and N are not 0 at the same time.

Furthermore, in such mixed technology cases a cross-layer KPI for a scenario a which has a base REST-API may be, and in some embodiments is, generated using the following equation:

CL-KPIa=((sum of base REST-API failures)+(sum of dependent protocol failures for dependent protocol 1 to N, N being the number of dependent protocols)+(sum of dependent REST-API failures for 0 to M, M being the number of dependent REST-API failures))/(((sum of base REST-API failures)+(sum of dependent protocol failures for dependent protocol 0 to N, N being the number of dependent protocols)+(sum of dependent REST-API failures for 0 to M, M being the number of dependent REST-API failures))+(sum of base REST-API successes)), where N=0 when scenario a does not include any dependent protocols, M=0 when the scenario a does not include any REST-API protocol, with the condition that both M and N are not 0 at the same time.

Exemplary Wireline VOIP Use Cases

The present invention is applicable to wireline networks. Similar to VOLTE, Wireline VoIP networks utilize SIP protocol and can have a number of call scenarios to handle registration, call establishments, call drops, call quality. The difference is that Wireline VoIP may not have prerequisite protocol dependencies but nested protocol dependencies. For example, an exterior Session Border Controllers (Ingress) may receive a SIP Invite on its ingress network port (e.g. trunk group) which subsequently is transmitted to one or more intermediate systems, or handled by a routing protocol, before exiting the wireline network at some egress port (e.g. egress trunk group of an egress SBC). In this call scenario the base protocol is SIP Invite on the ingress network port and the dependent protocol may be SIP Invite internally on a number of intermediate systems or network devices and/or a routing protocol (e.g. SIP Network to Network Interface (NNI)) to handle the network complexity. In these scenarios, ingress CDRs from both a success and failure perspective as the base protocol and intermediate and egress CDRs from a failure perspective as the dependent protocols. The ingress CDRs may be, and in some embodiments are generated by the ingress SBC. The intermediate CDRs are generated by the intermediary systems or network devices. And, the egress CDRs are generated by the network device with the egress port on which SIP messages of the call scenario egress the network, e.g., an egress SBC.

Figure 9:
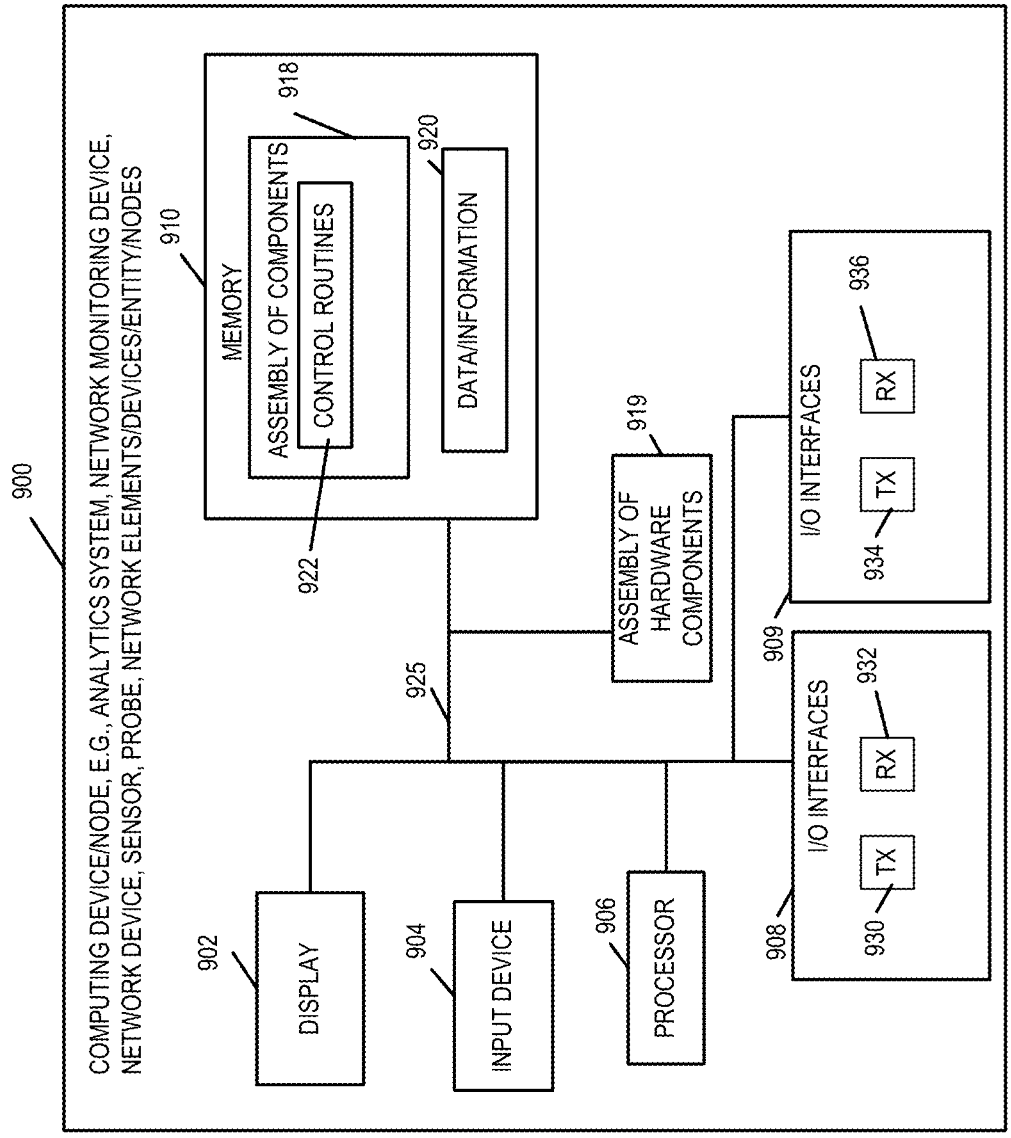
FIG. 9 illustrates an exemplary computing device/node in accordance with an embodiment of the present invention.

FIG. 9 illustrates an exemplary computing device/node, e.g., an analytics system, monitoring device, network device/element/entity, probe, sensor, database system in accordance with an embodiment of the present invention.

In some embodiments, one or more of the elements, nodes or components of the above mentioned system 100 shown in FIG. 1 and system 1000 shown in FIG. 10 are implemented in accordance with the exemplary computing device/node 900 illustrated in FIG. 9.

Exemplary computing device/node 900 includes an optional display 902, an input device 904, a processor 906, e.g., a CPU, I/O interfaces 908 and 909, which couple the computing device/node 900 to networks or communications links and/or various other nodes/devices, memory 910, and an assembly of hardware components 919, e.g., circuits corresponding to different components and/or modules, coupled together via a bus 925 over which the various elements may interchange data and information. Memory 910 includes an assembly of components 918, e.g., an assembly of software components, and data/information 920. The assembly of software components 918 includes a control routines component 922 which includes software instructions which when processed and executed by processor 306 control the operation of the computing device/node 900 to perform various functions and/or one or more steps of the various method embodiments of the invention. The I/O interface 908 includes transmitters 930 and receivers 932. The I/O interface 909 includes transmitters 934 and receivers 936. The I/O interfaces are hardware interfaces including hardware circuitry. The computing device/node 900 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), User Datagram Protocol (UDP), WebRTC protocols, Representative State Transfer (REST) protocol, SQL (Structured Query Language) Protocol, and HDFS Hadoop Distributed File System Protocol, SQL and/or HDFS being used to interface and access information from the various databases and/or storage devices to which it may be coupled. In some embodiments, the computing device/node 300 includes a communication component configured to operate using SIP, SDP, IP, TCP, UDP, REST protocol, SQL (Structured Query Language), HDFS Hadoop Distributed File System. In some embodiments, the communications component is a hardware component, a software component or a component including hardware and software components. While only a single hardware processor is illustrated in some embodiments, it is to be understood that the computing device/node 900 can include more than one processor with the processing being distributed among the plurality of processors. In some embodiments, one or more of the following are implemented in accordance with the computing device/node 900 illustrated in FIG. 9 the analytics system 110 of system 100 shown in FIG. 1 and the analytics system 1010 of system 1000 shown in FIG. 10. One or more of the devices, nodes, and or systems disclosed in FIG. 1 or FIG. 10 may be, and in some embodiments are, implemented in accordance with computing node/device 900.

Figure 11:
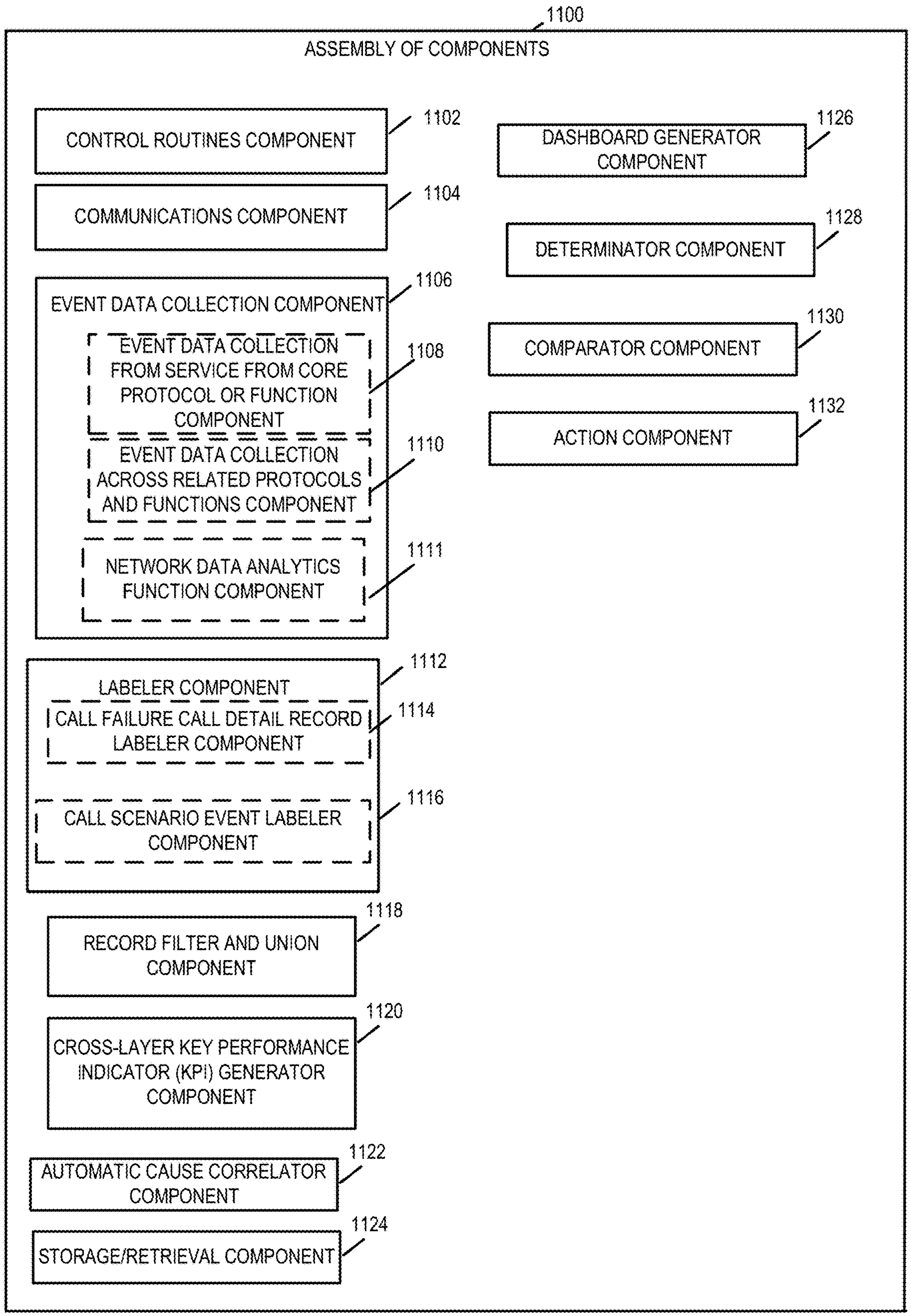
FIG. 11 is a drawing illustrating an exemplary assembly of components for a computing device/node in accordance with an embodiment of the present invention.

An exemplary assembly of components 1100 for a computing node 900 in accordance with an embodiment of the present invention is illustrated in FIG. 11. One or more of the components of the assembly of components 1100 may be implemented as hardware components in the assembly of hardware components 919 or as software components in the assembly of software components 918 stored in memory 910 of the exemplary computing node/device 900. One or more of the components of the assembly of components 900 may be used in the assembly of components depending on the features desired for use in the particular device, e.g., different components will be used for an analytics system than for network device or sensor, enodeB, etc.

Assembly of components 1100 can be, and in some embodiments is, used in computing node 900. The components in the assembly of components 1100 can, and in some embodiments are, implemented fully in hardware within the processor 906, e.g., as individual circuits. The components in the assembly of components 1100 can, and in some embodiments are, implemented fully in hardware within the assembly of components 919, e.g., as individual circuits corresponding to the different components. In other embodiments some of the components are implemented, e.g., as circuits, within the processor 906 with other components being implemented, e.g., as circuits within assembly of components 919, external to and coupled to the processor 306. As should be appreciated, the level of integration of components on the processor and/or with some components being external to the processor may be one of design choice. Alternatively, rather than being implemented as circuits, all or some of the components may be implemented in software and stored in the memory 910 of the computing node 300, with the components controlling operation of computing node 900 to implement the functions corresponding to the components when the components are executed by a processor, e.g., processor 906. In some such embodiments, the assembly of components 1100 is included in the memory 910 as assembly of components 918. In still other embodiments, various components in assembly of components 1100 are implemented as a combination of hardware and software, e.g., with another circuit external to the processor providing input to the processor 906 which then under software control operates to perform a portion of a component's function. While shown in the FIG. 9 embodiment as a single processor, e.g., computer, it should be appreciated that the processor 906 may be implemented as one or more processors, e.g., computers.

When implemented in software the components include code which, when executed by the processor 906, configure the processor 906 to implement the function corresponding to the component. In embodiments where the assembly of components 1100 is stored in the memory 910, the memory 910 is a computer program product comprising a computer readable medium comprising code, e.g., individual code for each component, for causing at least one computer, e.g., processor 906, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the computing node or device 300 or elements therein such as the processor 906, to perform the functions of corresponding steps described in one or more of the exemplary method embodiments described herein and/or described with respect to any of the Figures. Thus, the assembly of components 1100 includes various components that perform functions of corresponding steps of one or more of method embodiments.

Assembly of components 1100 includes components 1102, 1104, 1106, 1112, 1118, 1120, 1122, 1124, 1128, 1129, 1130, and 1132.

The control routines component 1102 is configured to control the operation of the node or device.

The communications component 1104 is configured to provide communications functionality including communications signaling and support for various communications protocols and interfaces. The communications component includes generating, sending, receiving and processing messages. The event data collection component 1106 collects and/or captures event data. The event data may be captured and/or collected from a number of sources including network devices, test points, sensors, network probe outputs, detail records from transparent/proxy DPI devices, event or detail records from network elements/nodes/devices. In some embodiments, the event data collection component includes one or more sub-components 1108, 1110, and 1111. Event data collection from service from core protocol or function component 1108 collects and/or captures data for service(s) from the core protocol or function/entity for a particular service, debug scenario, failure cause scenario or call flow. Event data collection across related protocols and functions component 1110 collects event data from across related protocols, REST-APIs and/or functions/entities. The network data analytics function component 1111 takes in event data feeds from any other Network Functions (e.g., Access and Mobility Management Function (AMF), Session Management Function (SMF), Policy Control Function (PCF)). In some embodiments, one or more components 1108, 1110 and 1111 are not sub-components of the event data collection component 1106 but are a separate component from the event data collection component 1106.

Labeler component 1112 labels event data and/or event data records, e.g., call detail records. In some embodiments, the labeler component 1112 includes one or more sub-components 1114 and 1116. The call failure call detail record labeler component 1114 labels event data records, e.g., call detail records, as failure event data records when the event data record indicators a failure. The call scenario event labeler component 1116 is configured to label to call scenarios on events across protocols.

The record filter and union component 1118 is configured to filter and union call scenario records extracting common field names.

The cross-protocol key performance indicator KPI generator 1120 is configured to build and/or generate cross-layer (e.g., cross-protocol) Key Performance Indicators.

The automatic cause correlator generator component 1122 is configured to automatically identify correlated causes between protocols and/or functions.

Storage/retrieval component 1124 stores and retrieves data from memory and/or databases.

The dashboard generator component 1128 is configured to generate to a display device dashboards, e.g., dashboard 500 shown in FIG. 5. Determinator component 1128 makes various determinations including, for example, determining a most likely failure cause scenario for said first base protocol to be the failure cause scenario associated with the identified CL-KPI having the highest CL-KPI value.

The comparator component 1130 is configured to make comparisons such as for example whether a value or count exceeds a threshold value.

The action component 1132 is configured to take an action such as for example, generate an alarm, make a network configuration change, generate and/or send a notification message.

Figure 8A:
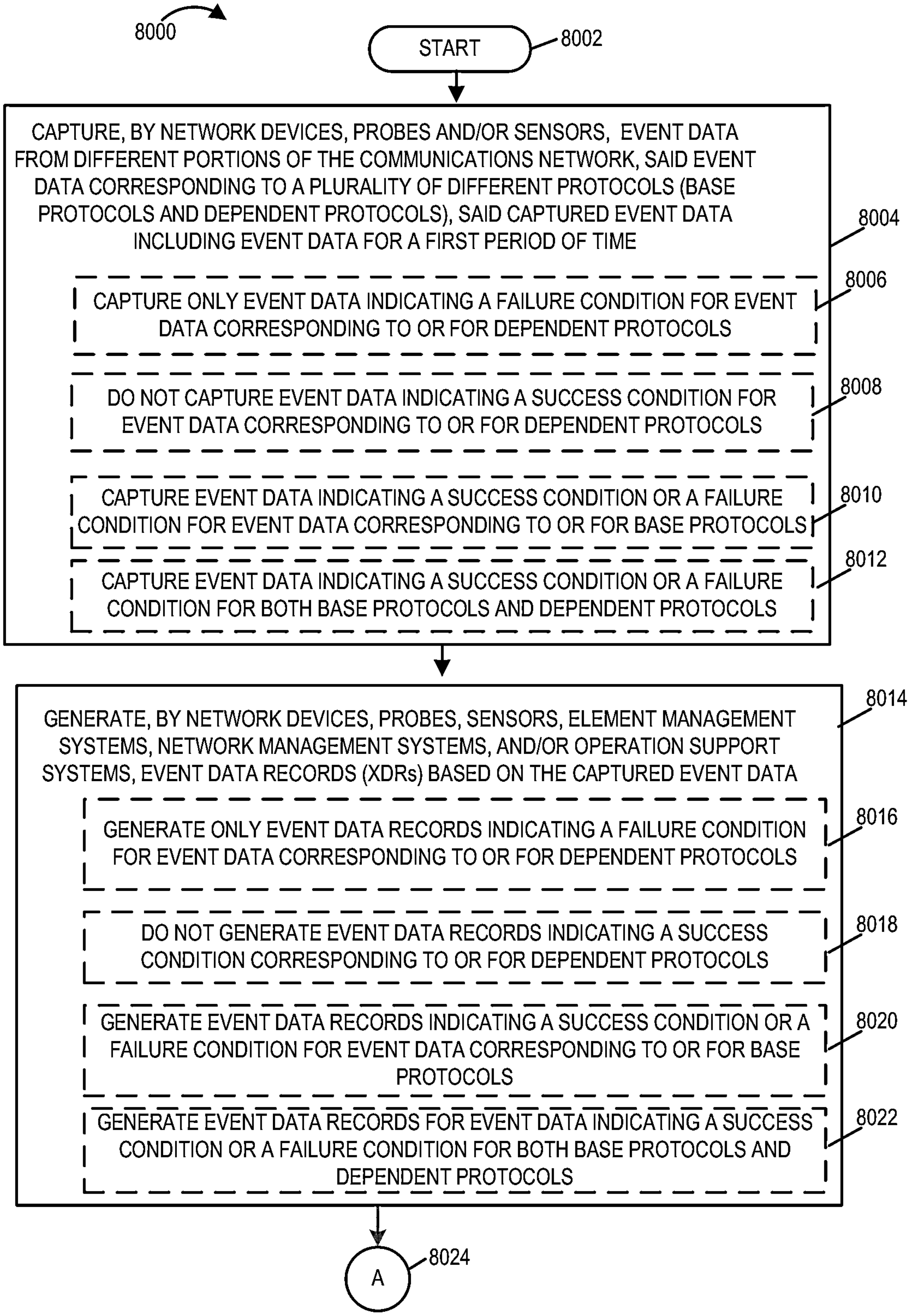
FIG. 8A illustrates a first part of an exemplary method in accordance with an embodiment of the present invention.
Figure 8B:
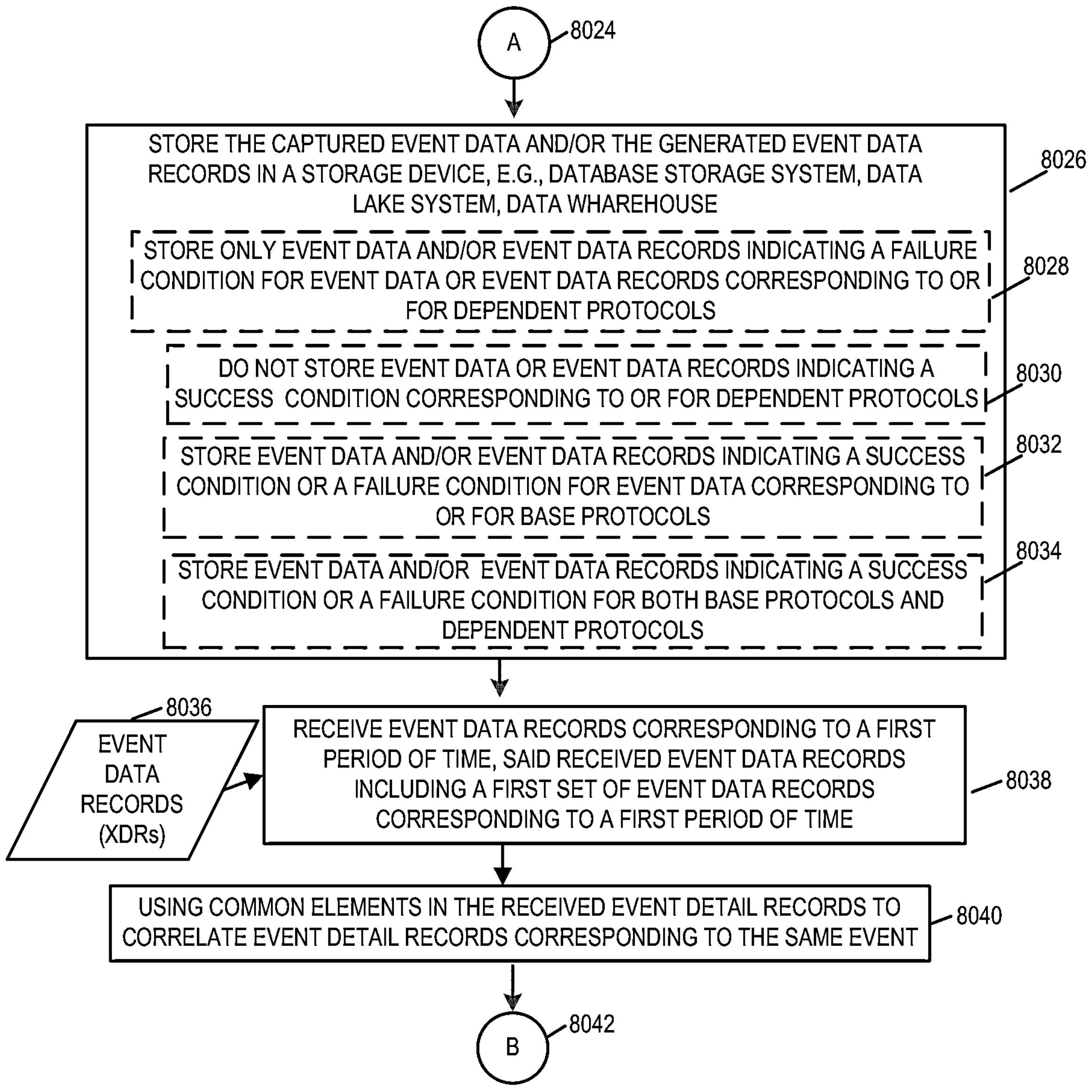
FIG. 8B illustrates a second part of an exemplary method in accordance with an embodiment of the present invention.
Figure 8D:
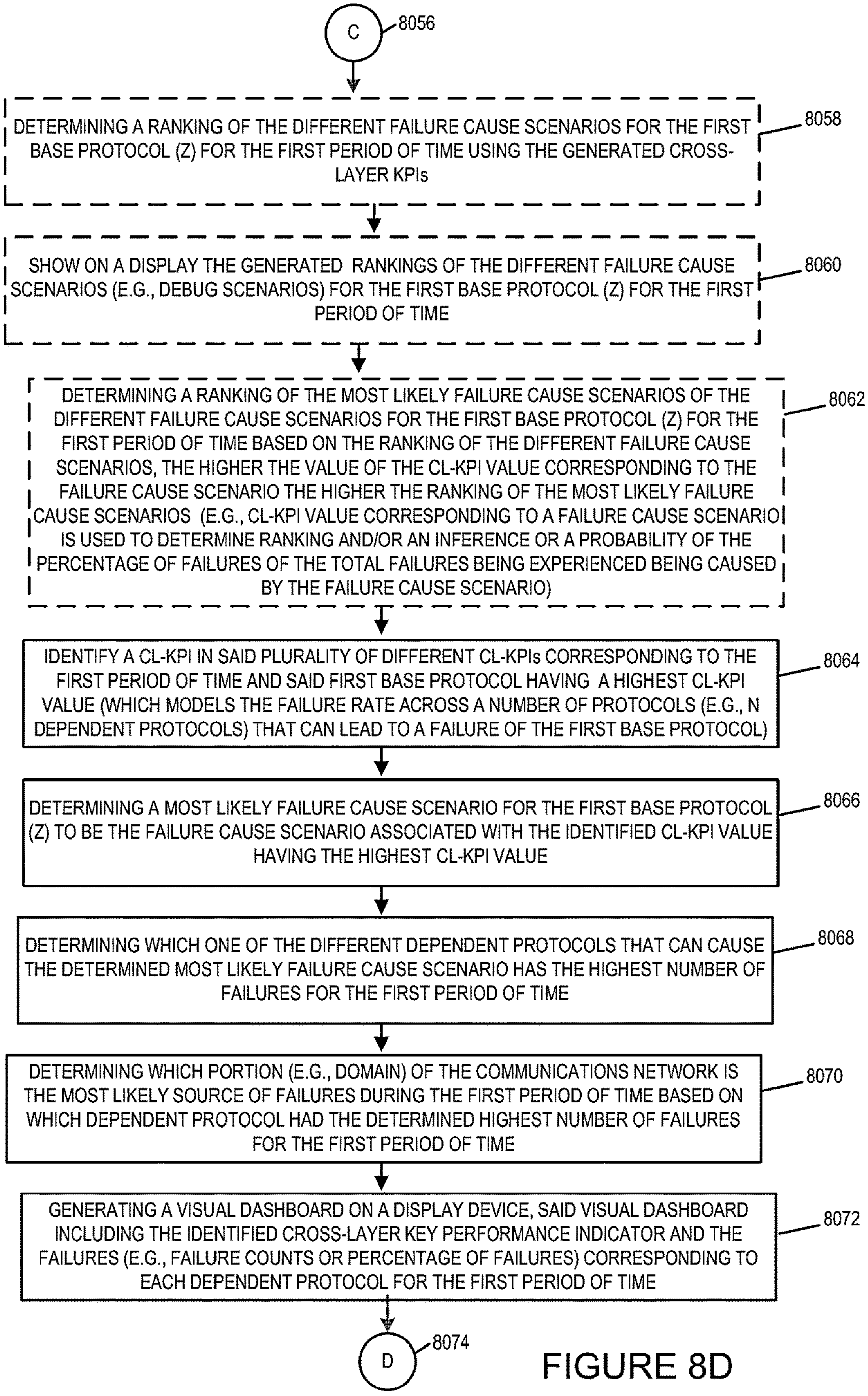
FIG. 8D illustrates a fourth part of an exemplary method in accordance with an embodiment of the present invention.
Figure 8E:
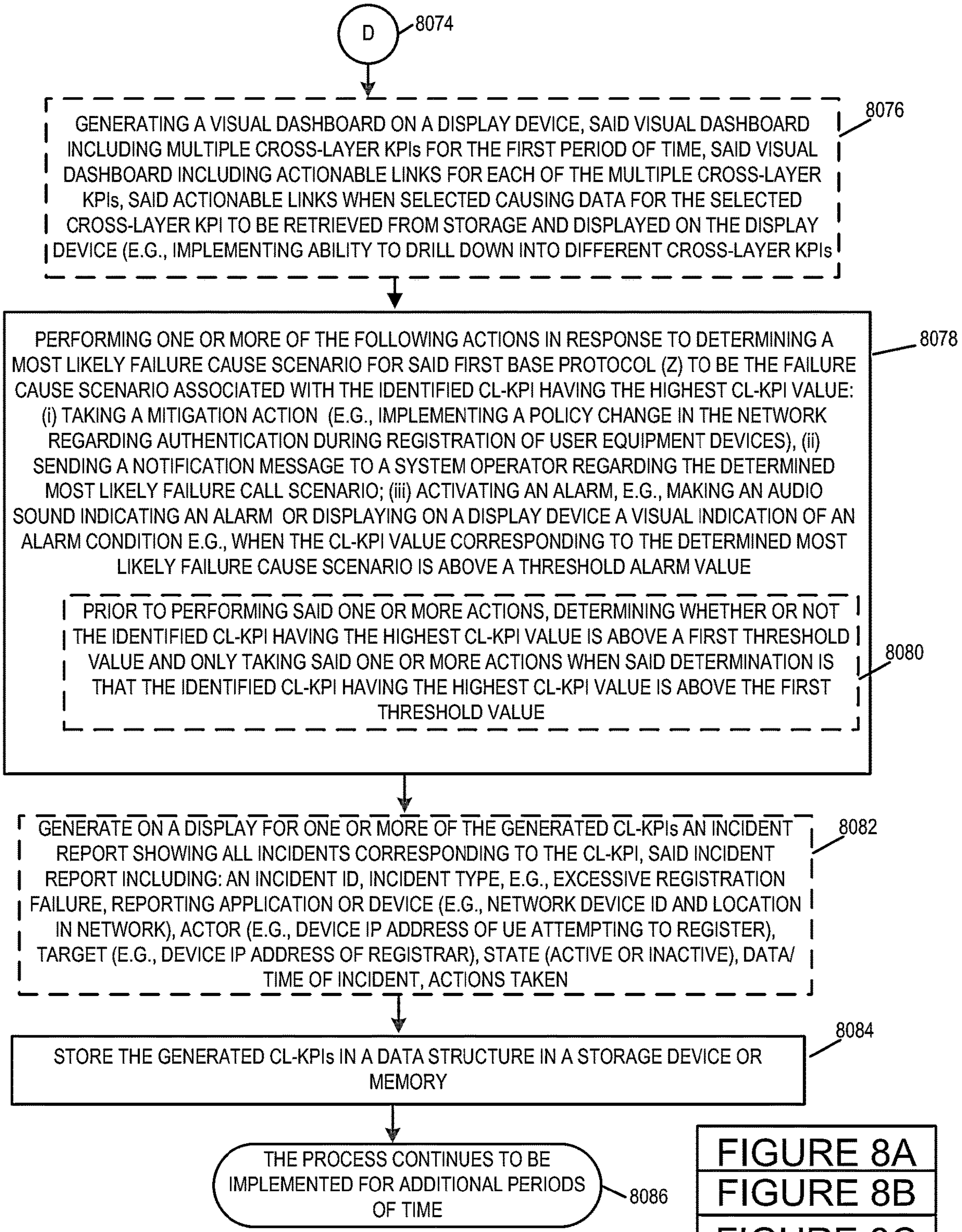
FIG. 8E illustrates a fifth part of an exemplary method in accordance with an embodiment of the present invention.
Figure 8:
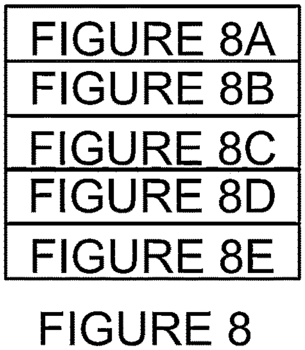
FIG. 8 comprises FIGS. 8A, 8B, 8C, 8D and 8E.

FIG. 8 illustrates a flowchart of an exemplary method 8000 in accordance with one embodiment of the present invention. FIG. 8 comprises FIGS. 8A, 8B, 8C, 8D and 8E. FIG. 8A illustrates a first part of an exemplary method in accordance with an embodiment of the present invention. FIG. 8B illustrates a second part of an exemplary method in accordance with an embodiment of the present invention. FIG. 8C illustrates a third part of an exemplary method in accordance with an embodiment of the present invention. FIG. 8D illustrates a fourth part of an exemplary method in accordance with an embodiment of the present invention. FIG. 8E illustrates a fifth part of an exemplary method in accordance with an embodiment of the present invention.

For explanatory purposes the exemplary method 8000 will be explained in connection with the exemplary system 100 illustrated in FIG. 1. However, it should be understood that the method may be implemented using other systems and other system configurations then those illustrated in FIG. 1. For example, the method 8000 may, and in some embodiments is, implemented using system 1000 shown in FIG. 10. While it will be readily understood that additional steps and signaling are performed in connection with communicating information, data, messages, and signals between devices, the method 8000 focuses on and discusses the steps and/or signaling for understanding the invention.

The method 8000 starts in start step 8002 shown on FIG. 8A. Operation proceeds from start step 8002 to step 8004.

In step 8004, event data is captured by network devices (e.g., Session Border Controllers, Gateways), probes and/or sensors from different portions of the communications network. The event data corresponds to a plurality of different protocols (e.g., base protocols and dependent protocols). The captured event data including event data for a first period of time. In some embodiments, step 8004 includes one or more sub-steps 8006, 8008, 8010, 8012.

In sub-step 8006, with respect to event data for or corresponding to dependent protocols, only event data indicating a failure condition for event data corresponding to or for dependent protocols is captured. In such embodiments, system resources are saved in that the amount of data which needs to be captured, processed, and stored is reduced and/or minimized while efficient cross-layer KPIs are generated from the reduced data set.

In sub-step 8008, with respect to dependent protocols, event data indicating a success condition for event data corresponding to or for dependent protocols is not captured. This saves resources for capturing, processing and storing such event data.

In sub-step 8010, event data indicating a success condition or a failure condition for event data corresponding to or for base protocols is captured.

In sub-step 8012, event data indicating a success condition or a failure condition for both base protocols and dependent protocols is captured. In such embodiments, while success data of dependent protocols is captured it need not necessarily be stored or used as will be discussed in connection with the steps below.

Operation proceeds from step 8012 to step 8014.

In step 8014, network devices, probes, sensors, Element Management Systems, Network Management Systems, and/ or Operations Support Systems generate event data records (XDRs) based on the captured event data. In some embodiments step 8014 includes one or more steps 8016, 8018, 8020, and 8022.

In step 8016, with respect to dependent protocols, only event data records indicating a failure condition for event data corresponding to or for dependent protocols are generated.

In step 8018, with respect to dependent protocols event data records, no event data records are generated for events indicating a success condition corresponding to or for dependent protocols.

In step 8020, with respect to base protocols, event data records indicating a failure condition or a success condition for event data corresponding to or for base protocols are generated.

In step 8022, event data records are generated for event data indicating a success condition or failure condition for both base protocols and dependent protocols.

Operation proceeds from step 8014 via connection node A 8024 to step 8026 shown on FIG. 8B.

In step 8026, the captured event data and/or the generated event data records are stored in a storage device, e.g., a database storage system, data lake system, or a data warehouse. The storage being performed by the network devices, probes, sensors, element management systems, network management systems, and operation support systems which captured the event data and/or generated the event data records. In some embodiments, step 8026 includes a substep of transferring the captured event data and/or the generated event data records to the storage device as part of storing the captured event data and/or generated event data records. In some embodiments, the method 8000 includes an additional step which precedes step 8026 in which the captured event data and/or the generated event data records are transferred, communicated and/or transmitted to the storage device prior to the storage of the captured event data and/or the generated event data record being stored in step 8026 in the storage device. In some embodiments, step 8026 includes one or more sub-steps 8028, 8030, 8032, and 8034.

In sub-step 8028, with respect to event data and event/or event records indicating a success condition corresponding to or for dependent protocols is stored.

In sub-step 8030, with respect to event data and/or event data records indicating a success condition corresponding to or for dependent protocols, the devices performing the storing refrain from that is do not store such event data or event data records.

In sub-step 8032, event data and/or event data records indicating a success condition or a failure condition for event data corresponding to or for base protocols is stored.

In sub-step 8032, event data and/or event data records for event data indicating a success condition or a failure condition are stored for both base protocols and dependent protocols. While data for both success and failure conditions are being stored system processing resources can be minimized for example when generating cross-layer KPIs but not processing the event data records indicating dependent protocol successes.

Operation proceeds from step 8026 to step 8038.

In step 8038, receive, e.g., by the cross layer analytics system 110, event data records 8036 corresponding to a first period of time. The event data records may be received from storage (e.g., in response to a database request from the cross-layer analytics system) or directly from the devices/entities that generated the event data records. Operation proceeds from step 8038 to step 8040.

In step 8040, the cross-layer analytics system uses common elements in the received event detail records to correlate event detail records corresponding to the same event or having a high probability that they correspond to the same event. Operation proceeds from step 8040 via connection node B 8042 to step 8044 shown on FIG. 8C.

In step 8044, the cross-layer analytics system generates a plurality of different cross-layer key performance indicators (CL-KPIs) from the first set of event data records corresponding to the first period of time and a first base protocol (Z), each CL-KPI in the plurality of different CL-KPIs being for a different failure cause scenario (e.g., a debug scenario). In some embodiments, step 8044 includes one or more sub-steps 8045, 8046, 8047 8048, 8050, 8052 and 8054.

In sub-step 8045, the cross-layer analytics system generates a first failure count by summing a count of failures of the first base protocol detected during the first period of time and a count of failures of different dependent protocols associated with the first base protocol (Z) detected during the first period of time.

In sub-step 8046, the cross-layer analytics system divides said first failure count by a value which is based on a sum of the first failure count and a count of successes of the first base protocol (Z) for said first period of time.

In sub-step 8047, the cross-layer analytics system generates the plurality of different cross-layer key performance indicators using and/or based on the following equation:

$$\text{cross-layer } KPI_a = (f1 + f2 + \ldots + fN)/a_z$$

Where:

(1) cross-layer $KPI_a$ is for analysis for failure cause scenario a, e.g., VOLTE analysis scenario a (e.g. CL-REG-Failure (cross-layer-registration-failure scenario);

(2) fi is the failure count from protocol i, e.g., f1 is the failure count from the base protocol, f2, . . . , fN, are the failure counts from dependent protocols 1 to N−1 respectively (protocols 1, 2, . . . , N being the base protocol and dependent protocols 1 to N−1 corresponding to and/or for the failure cause scenario a, (e.g., debug scenario a)); and (3) $a_z$ is an attempt count, e.g., an estimated attempt count, from the sum of fi, i=1, . . . , N and successes of protocol Z, Z being the base protocol for the scenario a.

In various embodiments in sub-step 8047, failures due to other dependent or underlying protocols are not counted, unless the other protocol is not monitored, i.e., no data for the other protocol has been collected. Also, there may be, and in some embodiments are, more than one failure for each dependent protocol based on failure cause scenario (e.g., call/session flow pattern of the failure cause scenario (e.g., debug scenario)), which are captured as separate failure counts for the dependent protocol for a single data event. E.g., one call flow of a debug scenario for a single data event may result in two separate, e.g., independent, failures on the same dependent protocol (e.g., dependent protocol 1). In such cases, each of the separate, e.g., independent, failures is counted separately for the dependent protocol (e.g., dependent protocol 1).

In sub-step 8048, the cross-layer analytics system determines the plurality of different cross-layer key performance indicators based on a count of dependent protocol failures but not based on a count of the number of dependent protocol successes for the first period of time.

In sub-step 8050, the cross-layer analytics system determines the plurality of different cross-layer key performance indicators based on a count a number of base protocol successes for the first period of time.

In sub-step 8052, the cross-layer analytics system processes only event data records for dependent protocols indicating a failure when processing event data records for dependent protocols. In some embodiments, sub-step 8052 includes the cross-layer analytics system to abstain from processing event data records for dependent protocols which indicate a success when processing event data records for dependent protocols.

In sub-step 8054, the cross-layer analytics system for each of the different cross-layer KPIs applies a filter to the first set of event detail records to determine a sub-set of the event detail records to be processed for the particular CL-KPI being generated, said filter being based on which dependent protocols are used in the failure cause scenario (e.g., debug scenario) corresponding to the particular CL-KPI being generated. In some such embodiments, the filter is further based on which base protocol is used in the failure cause scenario (e.g., debug scenario).

In most embodiments, there is a separate filter for each of the different CL-KPIs. In various embodiments, there are one or more filters from which the cross-layer analytics system selects. The selection being made based on the CL-KPI being generated. The filters are generated prior to the receipt of the first set of event data for the first period of time, by the cross-layer analytics system. In some embodiments, the filters are generated by the cross-layer analytics system utilizing/implementing a clustering algorithm on a large plurality of event data records captured for a particular failure call scenario, e.g., debug scenario. The clustering algorithm identifying and/or correlating the dependent protocols and event data relationships in the plurality of event data records, e.g., patterns in the event data of the plurality of event data records. In some embodiments, the filters are generated and/or determined using automated pattern recognition learning and/or machine learning to determine patterns in the event data records corresponding to a failure call scenario.

Operation proceeds from step 8044 to optional step 8058.

In optional step 8058, the cross-layer analytics system determines a ranking of the different failure cause scenarios for the first base protocol (Z) for the first period of time using the generated cross-layer KPIs. Operation proceeds from step 8058 to optional step 8060.

In step 8060, the cross layer analytics system shows on a display the generated ranking of the different failure cause scenarios (e.g., debug scenarios) for the first base protocol (Z) for the first period of time. Operation proceeds from step 8060 to optional step 8062.

In step 8062, the cross-layer analytics system determines a ranking of the most likely failure cause scenarios of the different failure cause scenarios for the first base protocol (Z) for the first period of time based on the ranking of the different failure cause scenarios. The higher the value of the CL-KPI value corresponding to failure cause scenario the higher the ranking of the most likely failure cause scenario (e.g., CL-KPI value corresponding to a failure cause scenario is used to determine ranking and/or an inference or a probability of the percentage of failures of the total number of failures being experienced during the first period of time are being caused by the failure cause scenario). Operation proceeds from step 8062 to step 8064.

In step 8064, the cross-layer analytics system identifies a CL-KPI in the plurality of different CL-KPIs corresponding to the first period of time and the first base protocol having a highest CL-KPI value (which models the failure rate across a number of protocols (e.g., N dependent protocols) that can lead to a failure of the first base protocol). Operation proceeds from step 8064 to step 8066.

In step 8066, the cross-layer analytics system determines a most likely failure cause scenario for the first base protocol (Z) to be the failure cause scenario associated with the identified CL-KPI value having the highest CL-KPI value. Operation proceeds from step 8066 to step 8068.

In step 8068, the cross-layer analytics system determines which one of the different dependent protocols that can cause the determined most likely failure cause scenario has the highest number of failures for the first period of time. Operation proceeds from step 8068 to step 8070.

In step 8070, the cross-layer analytics system determines which portion (e.g., domain) of the communications network is the most likely source of failures during the first period of time based on which dependent protocol had the determined highest number of failures for the first period of time with respect to the CL-KPI value having the highest value.

In some embodiments, the cross-layer analytics system determines based on the failure counts of the dependent protocols of the CL-KPI with the highest CL-KPI value the portion and/or domain of the communications network that is the most likely source of failures during the first period of time corresponding to the determined most likely cause scenario. Operation proceeds from step 8070 to step 8072.

In step 8072, the cross-layer analytics system generates a visual dashboard on a display device. In one or more embodiments of the present invention, the visual dashboard includes the identified cross-layer key performance indicator and the failures (e.g., failure counts or percentage of failures) corresponding to the first base protocol and/or each dependent protocol for the first period of time. FIG. 5 illustrates an exemplary cross-layer visual dashboard. In various embodiments, the visual dashboard includes actionable links which when selected causes the cross-layer analytics system to retrieve data/information corresponding to the selected action and the identified cross-layer KPI from storage and display the retrieved the retrieved data/information on the display of the display device. In some embodiments, the action links include an action link for presenting data for one or more of the dependent protocols used for generating the cross-layer KPI, an action link for presenting data for the first base protocol, an action link for presenting data for one or more event records or incidents corresponding to events in the event records used for generating the cross-layer KPIs, data on the identified cross-layer KPI for one or more past periods of time. The actionable links allowing for the ability to drill down into different dependent protocol data/information/statistics for the identified cross-layer KPI. Operation proceeds from step 8072 via connection node D 8074 to optional step 8076 shown on FIG. 8D.

In step 8076, the cross-layer analytics system generates a visual dashboard on a display device, said visual dashboard including multiple cross-layer KPIs for the first period of time, said visual dashboard including actionable links for each of the multiple cross-layer KPIs, said actionable links when selected causing data for the selected cross-layer KPI to be retrieved from storage and displayed on the display device (e.g., implementing the ability to drill down into different cross-layer KPIs). In some embodiments, when a particular cross-layer KPI is selected a cross-layer KPI dashboard is generated on the display for the selected cross-layer KPI as discussed in step 8072. Operation proceeds from step 8076 to step 8078.

In step 8078, the cross-layer analytics system performs one or more of the following actions in response to determining a most likely failure cause scenario for the first base protocol (Z) to be the failure cause scenario associated with the identified CL-KPI having the highest CL-KPI value: (i) take a mitigation action (e.g., implementing a policy change in the network regarding authentication during registration of user equipment devices), (ii) sending a notification message to a device of a system operator or to a threat detection system regarding the determined most likely failure call scenario; (iii) activating an alarm, e.g., making an audio sound indicating an alarm or displaying on a display device a visual indication of an alarm condition e.g., when the CL-KPI value corresponding to the determined most likely failure cause scenario is above a threshold alarm value. In some embodiments, step 8078 includes sub-step 8080.

In sub-step 8080, prior to performing said one or more actions, determining whether or not the identified CL-KPI having the highest CL-KPI value is above a first threshold value and only taking said one or more actions when said determination is that the identified CL-KPI having the highest CL-KPI value is able the first threshold value.

In various embodiments, which if any of the one or more actions to be taken is determined based on the CL-KPI value and one or more threshold values, e.g., different threshold values resulting in different actions or combinations of actions being taken. In some embodiments, the dashboard generated in connection with the identified CL-KPI is updated to indicate actions taken.

In some embodiments, different threshold values are used for different CL-KPIs. Upon the generation of the CL-KPI value for a period of time, the CL-KPI value is compared to a corresponding CL-KPI threshold value and one or more actions such as for example those described above are taken based on value of the generated CL-KPI value and the value of the corresponding CL-KPI threshold. In various embodiments, multiple CL-KPI threshold values correspond to a single CL-KPI. Each of the multiple CL-KPI threshold values resulting in a different action being taken when exceeded.

Operation proceeds from step 8080 to optional step 8082.

In step 8082, the cross-layer analytics system generates on a display for one or more of the generated CL-KPIs an incident report showing all incidents corresponding to the CL-KPI, said incident report including: an incident ID, Incident type, e.g., excessive registration failure, reporting application or device (e.g., network device ID and location in network), actor (e.g., device IP address of UE attempting to register), target (e.g., device IP address of registrar), state (active or inactive) data/time of incident, actions taken. Operation proceeds from step 8082 to step 8084.

In step 8084, the cross-layer analytics system stores the generated CL-KPIs in a data structure in a storage device, e.g., memory or database, attached to or included in the cross-layer analytics system. Operation proceeds from step 8084 to step 8086.

In step 8086, the process continues to be implemented for additional period of time.

Various additional features and/or steps of various embodiments of the method 8000 will now be discussed.

In some embodiments, the data structure used to store the relevant event data information for each failure scenario for each dependent protocol, includes protocol name, failure scenario, associated event data record filter, and/or other meta data.

In some embodiments, the first set of event data records for the first period of time includes a plurality of sub-sets of event data records for the first period of time. The plurality of subsets of event data records for the first period of time including at least a first subset of event data records, a second subset of event data records, and a third subset of event data records. The first subset of event data records including event data records corresponding to or for the first base protocol (e.g., for a first failure cause scenario, e.g., first debug scenario) for the first period of time. The second subset of event data records including event data records corresponding to or for a first dependent protocol (e.g., for the first failure cause scenario) for the first period of time. The third subset of event data records including event data records corresponding to or for a second dependent protocol (e.g., for the first failure cause scenario) for the first period of time.

In some embodiments, one or more event detail records in the first set of event detail records for the first period of time are event objects (e.g., event object 200 shown in FIG. 2).

In some embodiments, the event detail records of the first set of event detail records each include a common set of elements, and/or fields and/or information (e.g., protocol interface, start timestamp, duration, protocol command, cause, location, device).

In various embodiments, the plurality of different cross-layer key performance indicators which are generated each depend on a count of the number of dependent protocol failures but do not depend on a count of the number of dependent protocol success for the first period of time.

In some embodiments, the plurality of different cross-layer key performance indicators further depends on a count of a number of base layer protocol successes for the first period of time.

In some embodiments, the cross-layer analytics system generates a visual dashboard on a display device, the visual dash board including one or more of the following: (i) the identity of the cross-layer performance indicator to which the visual dashboard corresponds, (ii) identifying the failure cause scenario (e.g., debug scenario to which the CL-KPI and/or the dashboard corresponds), (iii) dependent protocol failures categorized by cause of failure for one or more of the dependent protocols corresponding to the CL-KPI and/or failure cause scenario (e.g., display a first graph identified for the first dependent protocol showing the first dependent protocol failure codes and the number of failures per each failure code for the first period of time, display a second graph identified for the second dependent protocol showing the second dependent protocol failure codes and the number of failures per each failure code for the first period of time), (iv) failure rate (failure rate (fails/(fails+successes) as a percentage, (v) dependent protocol failure breakdown as a percentage shown as number and/or as chart, (vi) failure rate over time as a graph, (vii) source of the data used to generate the CL-KPI (e.g., sources of the event data records utilized to generate failure and success counts); (viii) total number of failures or sum of failures in the first set of event data records utilized to generate the CL-KPI. In some embodiments, the dashboard generated includes the information shown in the dashboard 500 illustrated in FIG. 5.

In some embodiments, the event data records include call detail records and/or session detail records. In various embodiments, the event detail records are generalized data records include information for events including call events, session events, transaction events, registration events, transaction events, log files including event information and performance statistics including event information.

In some embodiments, the different failure cause scenarios are different registration failure cause scenarios.

In some embodiments, the different failure cause scenarios are different dropped call during handover scenarios (e.g., call mobility failure scenarios).

In the some embodiments, the different dropped call during handover scenarios include the following four different dropped call during handover scenarios: (i) intra RAT handover failure scenario involving X2 protocol and S1 protocol, (ii) inter 3GPP handover failure scenario involving GSM and UMTS protocols, (iii) inter 3GPP and WiFi handover failure scenario, and (iv) non-3GPP and WiFi handover failure scenario.

In some embodiments, the first set of event data records for the first period of time includes only event data records including failure information for dependent protocols (i.e., event data records which are for failure events).

In some embodiments, the first set of event data records for the first period of time excludes event data records for dependent protocols that do not include failure codes).

In some embodiments, the first set of event data records for the first period of time includes event data records for the first base protocol for successful events (e.g., include codes indicating a success such as a successful registration, successful call establishment, successful handover, etc.)

In some embodiments the first set of event data records are generated by one or more of the following: network devices, probes, and sensors located in different portions (e.g., domains, geographic regions) of the communications network.

In some embodiments, the first set of event data records are generated by or obtained from one or more of the following network devices, probes, storage device(s), Element Management Systems, Data Lakes, storage devices (databases), and Data warehouses located in or containing data related to different portions (e.g., domains, geographical regions) of the network.

In various embodiments, the different portions of the communications network utilize different protocols to communicate.

While the identification of the failure cause scenario corresponding to the CL-KPI with the highest value was implemented in the method of 8000, it is to be understood that various other identification can be made to determine which failure scenarios are problematic or should have actions taken and the metric to determine which is problematic and/or should have actions taken. In various embodiments, network elements, entities and devices are implemented as virtualized elements, entities and devices, e.g., on a compute node.

First Set of Exemplary Numbered Method Embodiments:

Method Embodiment 1. A method, the method comprising: generating a plurality of different cross-layer key performance indicators (CL-KPIs) from a set of event data records corresponding to a first period of time and a first base protocol (Z), each CL-KPI in said plurality of different CL-KPIs being for a different failure cause scenario (e.g., debug scenario); identifying a CL-KPI in said plurality of different CL-KPIs corresponding to the first period of time and said first base protocol having a highest CL-KPI value (which models the failure rate across a number of protocols that can lead to a failure of the first base protocol); and determining a most likely failure cause scenario for said first base protocol (Z) to be the failure cause scenario associated with the identified CL-KPI having the highest CL-KPI value.

Method Embodiment 1A. The method of Method Embodiment 1 further comprising: determining a ranking of the different failure cause scenarios for said first base protocol (Z) for the first period of time using said generated CL-KPIs.

Method Embodiment 2. The method of Method Embodiment 1 wherein generating a plurality of different cross-layer key performance indicators (CL-KPIs) from a set of event data records corresponding to a first period of time and a first base protocol (Z), includes: generating a first failure count by summing a count of failures of the first base protocol detected during the first period of time and a count of failures of different dependent protocols associated with the first base protocol (Z) detected during the first period of time; dividing said first failure count by a value which is based on a sum of the first failure count and a count of successes of the first base protocol (Z) for said first period of time.

Method Embodiment 2A. The method of Method Embodiment 1 wherein generating a plurality of different cross-layer key performance indicators (CL-KPIs) from a set of event data records corresponding to a first period of time and a first base protocol (Z), includes: generating a first failure count by summing a count of failures for different dependent protocols associated with the first base protocol (Z) detected during said first period of time and a count of failures of the first base protocol during the first period of time; and dividing the first failure count by a value (az) which is based on a sum of the number of protocol failures (sum of fi, i=1 to N (f1=count of failures of the first base protocol and f2+ . . . , fN=count of failures for each of the different dependent N−1 protocols)) and a count of the number of successes of the first base protocol (Z) for said first period of time.

Method Embodiment 3. The method of Method Embodiment 2, wherein the set of event data records for the first period of time includes a plurality of subsets of event data records for the first period of time, said plurality of subsets for the first period of time including at least a first subset of event data records, a second subset of event data records and a third subset of event data records; and wherein the first subset of event data records includes event data records corresponding to the first base protocol for the first period of time; wherein the second subset of event data records includes event data records corresponding to a first dependent protocol for the first period of time; wherein the third subset of event data records includes event data records corresponding to a second dependent protocol for the first period of time.

Method Embodiment 4. The method of Method Embodiment 1, wherein one or more event detail records in the set of event detail records for the first period of time are event objects.

Method Embodiment 5. The method of Method Embodiment 1, wherein the event detail records of the set of event detail records each include a common set of elements (e.g., protocol interface, start timestamp, duration, protocol command, cause, location, device).

Method Embodiment 6. The method of Method Embodiment 5, further comprising: using the common set of elements in the event detail records to correlate event detail records corresponding to the same event.

Method Embodiment 7. The method of Method Embodiment 1, further comprising: determining which one of the different dependent protocols that can cause the determined most likely failure cause scenario has the highest number of failures for the first period of time.

Method Embodiment 8. The method of Method Embodiment 7, further comprising: determining which portion (e.g., domain) of the communications network is the most likely source of the failures during the first period of time based on which dependent protocol had the determined highest number of failures for the first period of time.

Method Embodiment 9. The method of Method Embodiment 1, wherein the plurality of different cross-layer key performance indicators depends on a count of the number of dependent protocol failures but does not depend on a count of the number of dependent protocol successes for said first period of time.

Method Embodiment 9A. The method of Method Embodiment 1, wherein when a first dependent protocol is identified as having multiple different failures occur in connection with the same event, each of the multiple different failures is included in the count of the dependent protocol failures for the first dependent protocol.

Method Embodiment 10. The method of Method Embodiment 9, wherein the plurality of different cross-layer key performance indicators further depends on a count of a number of base layer protocol successes for said first period of time.

Method Embodiment 11. The method of Method Embodiment 8, wherein the plurality of different cross-layer key performance indicators depends on a count of a number of base layer protocol failures for said first period of time.

Method Embodiment 12. The method of Method Embodiment 10 further comprising: generating a visual dashboard on a display device, said visual dashboard including the identified cross-layer key performance indicator and the failures (e.g., failure counts or percentage of failures) corresponding to each dependent protocol for the first period of time.

Method Embodiment 13. The method of Method Embodiment 12, wherein the visual dashboard further includes dependent protocol failures categorized by cause of failure (e.g., display a first graph identified for the first dependent protocol showing the first dependent protocol failure codes and the number of failures per each failure code for the first period of time, display a second graph identified for the second dependent protocol showing the second dependent protocol failure codes and the number of failures per each failure code for the first period of time).

Method Embodiment 14. The method of Method Embodiment 10, further comprising: generating a visual dashboard on a display device, said visual dashboard including: (i) an identification of a failure call scenario (e.g., debug scenario), (ii) the failure rate over the first period of time corresponding to the failure call scenario (e.g., debug scenario), (iii) a breakdown of dependent protocol failures for each dependent protocol (e.g., breakdown of protocol failures as a percentage of the overall total number protocol failures during the first period of time).

Method Embodiment 15. The method of claim 1 further comprising: generating a visual dashboard on a display device, said visual dashboard including multiple cross-layer KPIs for the first period of time.

Method Embodiment 16. The method of Method Embodiment 1, wherein the different failure cause scenarios are different registration failure cause scenarios.

Method Embodiment 17. The method of Method Embodiment 1, wherein the different failure cause scenarios are different dropped call during handover scenarios (e.g., call mobility failure scenarios).

Method Embodiment 18. The method of Method Embodiment 1, wherein the different dropped call during handover scenarios include the following four different dropped call during handover scenarios: (i) intra RAT handover failure scenario involving X2 protocol and S1 protocol, (ii) inter 3GPP handover failure scenario involving GSM and UMTS protocols, (iii) inter 3GPP and WiFi handover failure scenario, and (iv) non-3GPP and WiFi handover failure scenario.

Method Embodiment 19. The method of Method Embodiment 1, wherein the set of event data records for the first period of time includes only event data records including failure information for dependent protocols (i.e., event data records which are for failure events).

Method Embodiment 20. The method of Method Embodiment 1, wherein the set of event data records for the first period of time excludes event data records for dependent protocols corresponding to successful events (e.g., excluding event data records for dependent protocols that do not include failure codes).

Method Embodiment 21. The method of Method Embodiment 1, wherein the set of event data record for the first period of time includes event data record for the first base protocol for successful events (e.g., include codes indicating a success such as a successful registration, successful call establishment, successfully handover, etc.)

Method Embodiment 22. The method of Method Embodiment 1, wherein the set of event data records are generated by one or more of the following: network devices, probes, and sensors located in different portions (e.g., domains, geographical regions) of the communications network.

Method Embodiment 22A. The method of Method Embodiment 1, wherein the set of event data records are generated by or obtained from one or more of the following: network devices, probes, storage device(s), Element Management Systems, Data Lakes, and Data Warehouses located in or containing data related to different portions (e.g., domains, geographical regions) of the communications network.

Method Embodiment 23. The method of Method Embodiment 22, wherein said different portions of the communications network utilize different protocols.

Method Embodiment 24. The method of Method Embodiment 1, further comprising: capturing or storing only event data records for failures for dependent protocols for the first period of time.

Method Embodiment 25. The method of Method Embodiment 1, further comprising: automatically making a network configuration change in response to determining a most likely failure cause scenario for said first base protocol (Z) to be the failure cause scenario associated with the identified CL-KPI having the highest CL-KPI value.

Method Embodiment 26. The method of Method Embodiment 1, further comprising: sending a notification message to an operator in response to determining a most likely failure cause scenario for said first base protocol (Z) to be the failure cause scenario associated with the identified CL-KPI having the highest CL-KPI value and that the highest CL-KPI value is above a first threshold value.

First Set of Exemplary Numbered System Embodiments:

System Embodiment 1. An analytics system comprising: memory; and a first processor, the first processor controlling the analytics system to perform the following operations:

generating a plurality of different cross-layer key performance indicators (CL-KPIs) from a set of event data records corresponding to a first period of time and a first base protocol (Z), each CL-KPI in said plurality of different CL-KPIs being for a different failure cause scenario (e.g., debug scenario); identifying a CL-KPI in said plurality of different CL-KPIs corresponding to the first period of time and said first base protocol having a highest CL-KPI value (which models the failure rate across a number of protocols that can lead to a failure of the first base protocol); and determining a most likely failure cause scenario for said first base protocol (Z) to be the failure cause scenario associated with the identified CL-KPI having the highest CL-KPI value.

System Embodiment 1A. The system of System Embodiment 1 wherein the first processor further controls the analytics system perform the additional operation of: determining a ranking of the different failure cause scenarios for said first base protocol (Z) for the first period of time using said generated CL-KPIs.

System Embodiment 2. The system of System Embodiment 1, wherein generating a plurality of different cross-layer key performance indicators (CL-KPIs) from a set of event data records corresponding to a first period of time and a first base protocol (Z), includes: generating a first failure count by summing a count of failures of the first base protocol detected during the first period of time and a count of failures of different dependent protocols associated with the first base protocol (Z) detected during the first period of time; dividing said first failure count by a value which is based on a sum of the first failure count and a count of successes of the first base protocol (Z) for said first period of time.

The system of System Embodiment 1, wherein generating a plurality of different cross-layer key performance indicators (CL-KPIs) from a set of event data records corresponding to a first period of time and a first base protocol (Z), includes: generating a first failure count by summing a count of failures for different dependent protocols associated with the first base protocol (Z) detected during said first period of time and a count of failures of the first base protocol during the first period of time; and dividing the first failure count by a value (az) which is based on a sum of the number of protocol failures (sum of fi, i=1 to N (f1=count of failures of the first base protocol and f2+ . . . , fN=count of failures for each of the different dependent N−1 protocols)) and a count of the number of successes of the first base protocol (Z) for said first period of time.

System Embodiment 3. The system of System Embodiment 2, wherein the set of event data records for the first period of time includes a plurality of subsets of event data records for the first period of time, said plurality of subsets for the first period of time including at least a first subset of event data records, a second subset of event data records and a third subset of event data records; and wherein the first subset of event data records includes event data records corresponding to the first base protocol for the first period of time; wherein the second subset of event data records includes event data records corresponding to a first dependent protocol for the first period of time; wherein the third subset of event data records includes event data records corresponding to a second dependent protocol for the first period of time.

System Embodiment 4. The system of System Embodiment 1, wherein one or more event detail records in the set of event detail records for the first period of time are event objects.

System Embodiment 5. The system of System Embodiment 1, wherein the event detail records of the set of event detail records each include a common set of elements (e.g., protocol interface, start timestamp, duration, protocol command, cause, location, device).

System Embodiment 6. The system of System Embodiment 5, wherein the first processor further controls the analytics system to perform the additional operation of: using the common set of elements in the event detail records to correlate event detail records corresponding to the same event.

System Embodiment 7. The system of System Embodiment 1, wherein the first processor further controls the analytics system to perform the additional operation of: determining which one of the different dependent protocols that can cause the determined most likely failure cause scenario has the highest number of failures for the first period of time.

System Embodiment 8. The system of System Embodiment 7, wherein the first processor further controls the analytics system to perform the additional operation of: determining which portion (e.g., domain) of the communications network is the most likely source of the failures during the first period of time based on which dependent protocol had the determined highest number of failures for the first period of time.

System Embodiment 9. The system of System Embodiment 1, wherein the plurality of different cross-layer key performance indicators depends on a count of the number of dependent protocol failures but does not depend on a count of the number of dependent protocol successes for said first period of time.

System Embodiment 9A. The system of System Embodiment 1, wherein when a first dependent protocol is identified as having multiple different failures occur in connection with the same event, each of the multiple different failures is included in the count of the dependent protocol failures for the first dependent protocol.

System Embodiment 10. The system of System Embodiment 9, wherein the plurality of different cross-layer key performance indicators further depends on a count of a number of base layer protocol successes for said first period of time.

System Embodiment 11. The system of System Embodiment 8, wherein the plurality of different cross-layer key performance indicators depends on a count of a number of base layer protocol failures for said first period of time.

System Embodiment 12. The system of System Embodiment 10 wherein the first processor further controls the analytics system to perform the additional operation of: generating a visual dashboard on a display device, said visual dashboard including the identified cross-layer key performance indicator and the failures (e.g., failure counts or percentage of failures) corresponding to each dependent protocol for the first period of time.

System Embodiment 13. The system of System Embodiment 12, wherein the visual dashboard further includes dependent protocol failures categorized by cause of failure (e.g., display a first graph identified for the first dependent protocol showing the first dependent protocol failure codes and the number of failures per each failure code for the first period of time, display a second graph identified for the second dependent protocol showing the second dependent protocol failure codes and the number of failures per each failure code for the first period of time).

System Embodiment 14. The system of System Embodiment 10, wherein the first processor further controls the analytics system to perform the additional operation of: generating a visual dashboard on a display device, said visual dashboard including: (i) an identification of a failure call scenario (e.g., debug scenario), (ii) the failure rate over the first period of time corresponding to the failure call scenario (e.g., debug scenario), (iii) a breakdown of dependent protocol failures for each dependent protocol (e.g., breakdown of protocol failures as a percentage of the overall total number protocol failures during the first period of time).

System Embodiment 15. The system of System Embodiment 1, wherein the first processor further controls the analytics system to perform the additional operation of: generating a visual dashboard on a display device, said visual dashboard including multiple cross-layer KPIs for the first period of time.

System Embodiment 16. The system of System Embodiment 1, wherein the different failure cause scenarios are different registration failure cause scenarios.

System Embodiment 17. The system of System Embodiment 1, wherein the different failure cause scenarios are different dropped call during handover scenarios (e.g., call mobility failure scenarios).

System Embodiment 18. The system of System Embodiment 1, wherein the different dropped call during handover scenarios include the following four different dropped call during handover scenarios: (i) intra RAT handover failure scenario involving X2 protocol and S1 protocol, (ii) inter 3GPP handover failure scenario involving GSM and UMTS protocols, (iii) inter 3GPP and WiFi handover failure scenario, and (iv) non-3GPP and WiFi handover failure scenario.

System Embodiment 19. The system of System Embodiment 1, wherein the set of event data records for the first period of time includes only event data records including failure information for dependent protocols (i.e., event data records which are for failure events).

System Embodiment 20. The system of System Embodiment 1, wherein the set of event data records for the first period of time excludes event data records for dependent protocols corresponding to successful events (e.g., excluding event data records for dependent protocols that do not include failure codes).

System Embodiment 21. The system of System Embodiment 1, wherein the set of event data record for the first period of time includes event data record for the first base protocol for successful events (e.g., include codes indicating a success such as a successful registration, successful call establishment, successfully handover, etc.)

System Embodiment 22. The system of System Embodiment 1, wherein the set of event data records are generated by one or more of the following: network devices, probes, and sensors located in different portions (e.g., domains, geographical regions) of the communications network.

System Embodiment 22A. The system of System Embodiment 1, wherein the set of event data records are generated by or obtained from one or more of the following: network devices, probes, storage device(s), Element Management Systems, Data Lakes, and Data Warehouses located in or containing data related to different portions (e.g., domains, geographical regions) of the communications network.

System Embodiment 23. The system of System Embodiment 22, wherein said different portions of the communications network utilize different protocols.

System Embodiment 24. The system of System Embodiment 22, wherein only event data records for failures for dependent protocols for the first period of time are captured or stored.

System Embodiment 24A. The system of System Embodiment 1, wherein the first processor further controls the analytics system to perform the additional operation of: instructing one or more network devices, probes, storage device(s), Element Management Systems, Data Lakes, and Data Warehouses to capture only event data records for failures for dependent protocols for the first period of time.

System Embodiment 24B. The system of System Embodiment 1, wherein the first processor further controls the analytics system to perform the additional operation of: instructing one or more network devices, probes, storage device(s), Element Management Systems, Data Lakes, and Data Warehouses to store only event data records for failures for dependent protocols for the first period of time.

System Embodiment 25. The system of System Embodiment 1, wherein the first processor further controls the analytics system to perform the additional operation of: making a network configuration change in response to determining a most likely failure cause scenario for said first base protocol (Z) to be the failure cause scenario associated with the identified CL-KPI having the highest CL-KPI value.

System Embodiment 26. The system of System Embodiment 1, wherein the first processor further controls the analytics system to perform the additional operation of: sending a notification message to an operator in response to determining a most likely failure cause scenario for said first base protocol (Z) to be the failure cause scenario associated with the identified CL-KPI having the highest CL-KPI value and that the highest CL-KPI value is above a first threshold value.

First List of Exemplary Numbered Non-Transitory Computer Readable Medium Embodiments:

Non-Transitory Computer Readable Medium Embodiment 1

A non-transitory computer readable medium including a first set of computer executable instructions which when executed by a processor of a node cause the node to: generate a plurality of different cross-layer key performance indicators (CL-KPIs) from a set of event data records corresponding to a first period of time and a first base protocol (Z), each CL-KPI in said plurality of different CL-KPIs being for a different failure cause scenario (e.g., debug scenario); identify a CL-KPI in said plurality of different CL-KPIs corresponding to the first period of time and said first base protocol having a highest CL-KPI value (which models the failure rate across a number of protocols that can lead to a failure of the first base protocol); and determine a most likely failure cause scenario for said first base protocol (Z) to be the failure cause scenario associated with the identified CL-KPI having the highest CL-KPI value.

Second Set of Exemplary Numbered Method Embodiments:

Method Embodiment 1. A method, the method comprising: generating a plurality of different cross-layer key performance indicators (CL-KPIs) from a set of event data records corresponding to a first period of time and a first base REST-API (Z), each CL-KPI in said plurality of different CL-KPIs being for a different failure cause scenario (e.g., debug scenario); identifying a CL-KPI in said plurality of different CL-KPIs corresponding to the first period of time and said first base REST-API having a highest CL-KPI value (which models the failure rate across a number of REST-APIs that can lead to a failure of the first base REST-API); and determining a most likely failure cause scenario for said first base REST-API (Z) to be the failure cause scenario associated with the identified CL-KPI having the highest CL-KPI value.

Method Embodiment 1A. The method of Method Embodiment 1 further comprising: determining a ranking of the different failure cause scenarios for said first base REST-API (Z) for the first period of time using said generated CL-KPIs.

Method Embodiment 2. The method of Method Embodiment 1 wherein generating a plurality of different cross-layer key performance indicators (CL-KPIs) from a set of event data records corresponding to a first period of time and a first base REST-API (Z), includes: generating a first failure count by summing a count of failures of the first base REST-API detected during the first period of time and a count of failures of different dependent REST-APIs associated with the first base REST-API (Z) detected during the first period of time; dividing said first failure count by a value which is based on a sum of the first failure count and a count of successes of the first base REST-API (Z) for said first period of time.

Method Embodiment 2A. The method of Method Embodiment 1 wherein generating a plurality of different cross-layer key performance indicators (CL-KPIs) from a set of event data records corresponding to a first period of time and a first base REST API (Z), includes: generating a first failure count by summing a count of failures for different dependent REST-APIs associated with the first base REST-API (Z) detected during said first period of time and a count of failures of the first base REST-API during the first period of time; and dividing the first failure count by a value (az) which is based on a sum of the number of REST-API failures (sum of fi, i=1 to N (f1=count of failures of the first base REST-API and f2+ . . . , fN=count of failures for each of the different dependent N−1 REST-APIs)) and a count of the number of successes of the first base REST-API (Z) for said first period of time.

Method Embodiment 2B. The method of Method Embodiment 1 wherein generating a plurality of different cross-layer key performance indicators (CL-KPIs) from a set of event data records corresponding to a first period of time and a first base REST-API (Z), includes: summing a count of failures for different dependent REST-APIs associated with the first base REST-API (z) detected during said first period of time.

Method Embodiment 3. The method of Method Embodiment 2, wherein the set of event data records for the first period of time includes a plurality of subsets of event data records for the first period of time, said plurality of subsets for the first period of time including at least a first subset of event data records, a second subset of event data records and a third subset of event data records; and wherein the first subset of event data records includes event data records corresponding to the first base REST-API for the first period of time; wherein the second subset of event data records includes event data records corresponding to a first dependent REST-API for the first period of time; wherein the third subset of event data records includes event data records corresponding to a second dependent REST-API for the first period of time.

Method Embodiment 4. The method of Method Embodiment 1, wherein one or more event detail records in the set of event detail records for the first period of time are event objects.

Method Embodiment 5. The method of Method Embodiment 1, wherein the event detail records of the set of event detail records each include a common set of elements (e.g., REST-API interface, start timestamp, duration, REST-API command, cause, location, device).

Method Embodiment 6. The method of Method Embodiment 5, further comprising: using the common set of elements in the event detail records to correlate event detail records corresponding to the same event.

Method Embodiment 7. The method of Method Embodiment 1, further comprising: determining which one of the different dependent REST-APIs that can cause the determined most likely failure cause scenario has the highest number of failures for the first period of time.

Method Embodiment 8. The method of Method Embodiment 7, further comprising: determining which portion (e.g., domain) of the communications network is the most likely source of the failures during the first period of time based on which dependent REST-API had the determined highest number of failures for the first period of time.

Method Embodiment 9. The method of Method Embodiment 1, wherein the plurality of different cross-layer key performance indicators depends on a count of the number of dependent REST-API failures but does not depend on a count of the number of dependent REST-API successes for said first period of time.

Method Embodiment 9A. The method of Method Embodiment 1, wherein when a first dependent REST-API is identified as having multiple different failures occur in connection with the same event, each of the multiple different failures is included in the count of the dependent REST-API failures for the first dependent REST-API.

Method Embodiment 10. The method of Method Embodiment 9, wherein the plurality of different cross-layer key performance indicators further depends on a count of a number of base layer REST-API successes for said first period of time.

Method Embodiment 11. The method of Method Embodiment 8, wherein the plurality of different cross-layer key performance indicators depends on a count of a number of base layer REST-API failures for said first period of time.

Method Embodiment 12. The method of Method Embodiment 10 further comprising: generating a visual dashboard on a display device, said visual dashboard including the identified cross-layer key performance indicator and the failures (e.g., failure counts or percentage of failures) corresponding to each dependent REST-API for the first period of time.

Method Embodiment 13. The method of Method Embodiment 12, wherein the visual dashboard further includes dependent REST-API failures categorized by cause of failure (e.g., display a first graph identified for the first dependent REST-API showing the first dependent REST-API failure codes and the number of failures per each failure code for the first period of time, display a second graph identified for the second dependent REST-API showing the second dependent REST-API failure codes and the number of failures per each failure code for the first period of time).

Method Embodiment 14. The method of Method Embodiment 10, further comprising: generating a visual dashboard on a display device, said visual dashboard including: (i) an identification of a failure call scenario (e.g., debug scenario), (ii) the failure rate over the first period of time corresponding to the failure call scenario (e.g., debug scenario), (iii) a breakdown of dependent REST-API failures for each dependent REST-API (e.g., breakdown of REST-API failures as a percentage of the overall total number REST-API failures during the first period of time).

Method Embodiment 15. The method of claim 1 further comprising: generating a visual dashboard on a display device, said visual dashboard including multiple cross-layer KPIs for the first period of time.

Method Embodiment 16. The method of Method Embodiment 1, wherein the different failure cause scenarios are different registration failure cause scenarios.

Method Embodiment 17. The method of Method Embodiment 1, wherein the different failure cause scenarios are different dropped call during handover scenarios (e.g., call mobility failure scenarios).

Method Embodiment 18. The method of Method Embodiment 1, wherein the different dropped call during handover scenarios include the following four different dropped call during handover scenarios: (i) intra RAT handover failure scenario involving X2 REST-API and S1 REST-API, (ii) inter 3GPP handover failure scenario involving GSM and UMTS REST-APIs, (iii) inter 3GPP and WiFi handover failure scenario, and (iv) non-3GPP and WiFi handover failure scenario.

Method Embodiment 19. The method of Method Embodiment 1, wherein the set of event data records for the first period of time includes only event data records including failure information for dependent REST-APIs (i.e., event data records which are for failure events).

Method Embodiment 20. The method of Method Embodiment 1, wherein the set of event data records for the first period of time excludes event data records for dependent REST-APIs corresponding to successful events (e.g., excluding event data records for dependent REST-APIs that do not include failure codes).

Method Embodiment 21. The method of Method Embodiment 1, wherein the set of event data record for the first period of time includes event data record for the first base REST-API for successful events (e.g., include codes indicating a success such as a successful registration, successful call establishment, successfully handover, etc.)

Method Embodiment 22. The method of Method Embodiment 1, wherein the set of event data records are generated by one or more of the following: Network Data Analytics Functions, network devices, probes, and sensors located in different portions (e.g., domains, geographical regions) of the communications network.

Method Embodiment 22A. The method of Method Embodiment 1, wherein the set of event data records are generated by or obtained from one or more of the following: Network Data Analytics Functions, network devices, probes, storage device(s), Element Management Systems, Data Lakes, and Data Warehouses located in or containing data related to different portions (e.g., domains, geographical regions) of the communications network.

Method Embodiment 23. The method of Method Embodiment 22, wherein said different portions of the communications network utilize different REST-APIs.

Method Embodiment 24. The method of Method Embodiment 1, further comprising: capturing or storing only event data records for failures for dependent REST-APIs for the first period of time.

Method Embodiment 25. The method of Method Embodiment 1, further comprising: automatically making a network configuration change in response to determining a most likely failure cause scenario for said first base REST-API (Z) to be the failure cause scenario associated with the identified CL-KPI having the highest CL-KPI value.

Method Embodiment 26. The method of Method Embodiment 1, further comprising: sending a notification message to an operator in response to determining a most likely failure cause scenario for said first base REST-API (Z) to be the failure cause scenario associated with the identified CL-KPI having the highest CL-KPI value and that the highest CL-KPI value is above a first threshold value.

Second Set of Exemplary Numbered System Embodiments:

System Embodiment 1. An analytics system comprising: memory; and a first processor, the first processor controlling the analytics system to perform the following operations: generating a plurality of different cross-layer key performance indicators (CL-KPIs) from a set of event data records corresponding to a first period of time and a first base REST-API (Z), each CL-KPI in said plurality of different CL-KPIs being for a different failure cause scenario (e.g., debug scenario); identifying a CL-KPI in said plurality of different CL-KPIs corresponding to the first period of time and said first base REST-API having a highest CL-KPI value (which models the failure rate across a number of REST-APIs that can lead to a failure of the first base REST-API); and determining a most likely failure cause scenario for said first base REST-API (Z) to be the failure cause scenario associated with the identified CL-KPI having the highest CL-KPI value.

System Embodiment 1A. The system of System Embodiment 1 wherein the first processor further controls the analytics system perform the additional operation of: determining a ranking of the different failure cause scenarios for said first base REST-API (Z) for the first period of time using said generated CL-KPIs.

System Embodiment 2. The system of System Embodiment 1 wherein generating a plurality of different cross-layer key performance indicators (CL-KPIs) from a set of event data records corresponding to a first period of time and a first base REST-API (Z), includes: generating a first failure count by summing a count of failures of the first base REST-API detected during the first period of time and a count of failures of different dependent REST-APIs associated with the first base protocol (Z) detected during the first period of time; dividing said first failure count by a value which is based on a sum of the first failure count and a count of successes of the first base REST-API (Z) for said first period of time.

System Embodiment 2A. The system of System Embodiment 1 wherein generating a plurality of different cross-layer key performance indicators (CL-KPIs) from a set of event data records corresponding to a first period of time and a first base REST-API (Z), includes: generating a first failure count by summing a count of failures for different dependent REST-APIs associated with the first base protocol (Z) detected during said first period of time and a count of failures of the first base REST-API during the first period of time; and dividing the first failure count by a value (az) which is based on a sum of the number of REST-API failures (sum of fi, i=1 to N (f1=count of failures of the first base REST-API and f2+ . . . , fN=count of failures for each of the different dependent N−1 REST-APIs)) and a count of the number of successes of the first base REST-APIs (Z) for said first period of time.

System Embodiment 2B. The system of System Embodiment 1, wherein generating a plurality of different cross-layer key performance indicators (CL-KPIs) from a set of event data records corresponding to a first period of time and a first base REST-API (Z), includes: summing a count of failures for different dependent REST-APIs associated with the first base REST-API (z) detected during said first period of time.

System Embodiment 3. The system of System Embodiment 2, wherein the set of event data records for the first period of time includes a plurality of subsets of event data records for the first period of time, said plurality of subsets for the first period of time including at least a first subset of event data records, a second subset of event data records and a third subset of event data records; and wherein the first subset of event data records includes event data records corresponding to the first base REST-API for the first period of time; wherein the second subset of event data records includes event data records corresponding to a first dependent REST-API for the first period of time; wherein the third subset of event data records includes event data records corresponding to a second dependent REST-API for the first period of time.

System Embodiment 4. The system of System Embodiment 1, wherein one or more event detail records in the set of event detail records for the first period of time are event objects.

System Embodiment 5. The system of System Embodiment 1, wherein the event detail records of the set of event detail records each include a common set of elements (e.g., REST-API interface, start timestamp, duration, REST-API command, cause, location, device).

System Embodiment 6. The system of System Embodiment 5, wherein the first processor further controls the analytics system to perform the additional operation of: using the common set of elements in the event detail records to correlate event detail records corresponding to the same event.

System Embodiment 7. The system of System Embodiment 1, wherein the first processor further controls the analytics system to perform the additional operation of: determining which one of the different dependent REST-APIs that can cause the determined most likely failure cause scenario has the highest number of failures for the first period of time.

System Embodiment 8. The system of System Embodiment 7, wherein the first processor further controls the analytics system to perform the additional operation of: determining which portion (e.g., domain) of the communications network is the most likely source of the failures during the first period of time based on which dependent REST-API had the determined highest number of failures for the first period of time.

System Embodiment 9. The system of System Embodiment 1, wherein the plurality of different cross-layer key performance indicators depends on a count of the number of dependent REST-API failures but does not depend on a count of the number of dependent REST-API successes for said first period of time.

System Embodiment 9A. The system of System Embodiment 1, wherein when a first dependent REST-API is identified as having multiple different failures occur in connection with the same event, each of the multiple different failures is included in the count of the dependent REST-API failures for the first dependent REST-API.

System Embodiment 10. The system of System Embodiment 9, wherein the plurality of different cross-layer key performance indicators further depends on a count of a number of base layer REST-API successes for said first period of time.

System Embodiment 11. The system of System Embodiment 8, wherein the plurality of different cross-layer key performance indicators depends on a count of a number of base layer REST-API failures for said first period of time.

System Embodiment 12. The system of System Embodiment 10 wherein the first processor further controls the analytics system to perform the additional operation of: generating a visual dashboard on a display device, said visual dashboard including the identified cross-layer key performance indicator and the failures (e.g., failure counts or percentage of failures) corresponding to each dependent REST-API for the first period of time.

System Embodiment 13. The system of System Embodiment 12, wherein the visual dashboard further includes dependent REST-API failures categorized by cause of failure (e.g., display a first graph identified for the first dependent REST-API showing the first dependent REST-API failure codes and the number of failures per each failure code for the first period of time, display a second graph identified for the second dependent REST-API showing the second dependent REST-API failure codes and the number of failures per each failure code for the first period of time).

System Embodiment 14. The system of System Embodiment 10, wherein the first processor further controls the analytics system to perform the additional operation of: generating a visual dashboard on a display device, said visual dashboard including: (i) an identification of a failure call scenario (e.g., debug scenario), (ii) the failure rate over the first period of time corresponding to the failure call scenario (e.g., debug scenario), (iii) a breakdown of dependent REST-API failures for each dependent REST-API (e.g., breakdown of REST-API failures as a percentage of the overall total number REST-API failures during the first period of time).

System Embodiment 15. The system of System Embodiment 1, wherein the first processor further controls the analytics system to perform the additional operation of: generating a visual dashboard on a display device, said visual dashboard including multiple cross-layer KPIs for the first period of time.

System Embodiment 16. The system of System Embodiment 1, wherein the different failure cause scenarios are different registration failure cause scenarios.

System Embodiment 17. The system of System Embodiment 1, wherein the different failure cause scenarios are different dropped call during handover scenarios (e.g., call mobility failure scenarios).

System Embodiment 18. The system of System Embodiment 1, wherein the different dropped call during handover scenarios include the following four different dropped call during handover scenarios: (i) intra RAT handover failure scenario involving X2 REST-API and S1 REST-API, (ii) inter 3GPP handover failure scenario involving GSM and UMTS REST-APIs, (iii) inter 3GPP and WiFi handover failure scenario, and (iv) non-3GPP and WiFi handover failure scenario.

System Embodiment 19. The system of System Embodiment 1, wherein the set of event data records for the first period of time includes only event data records including failure information for dependent REST-APIs (i.e., event data records which are for failure events).

System Embodiment 20. The system of System Embodiment 1, wherein the set of event data records for the first period of time excludes event data records for dependent REST-APIs corresponding to successful events (e.g., excluding event data records for dependent REST-APIs that do not include failure codes).

System Embodiment 21. The system of System Embodiment 1, wherein the set of event data record for the first period of time includes event data record for the first base REST-API for successful events (e.g., include codes indicating a success such as a successful registration, successful call establishment, successfully handover, etc.)

System Embodiment 22. The system of System Embodiment 1, wherein the set of event data records are generated by one or more of the following: Network Data Analytics Functions, network devices, probes, and sensors located in different portions (e.g., domains, geographical regions) of the communications network.

System Embodiment 22A. The system of System Embodiment 1, wherein the set of event data records are generated by or obtained from one or more of the following: Network Data Analytics Functions, network devices, probes, storage device(s), Element Management Systems, Data Lakes, and Data Warehouses located in or containing data related to different portions (e.g., domains, geographical regions) of the communications network.

System Embodiment 23. The system of System Embodiment 22, wherein said different portions of the communications network utilize different REST-APIs.

System Embodiment 24. The system of System Embodiment 22, wherein only event data records for failures for dependent REST-APIs for the first period of time are captured or stored.

System Embodiment 24A. The system of System Embodiment 1, wherein the first processor further controls the analytics system to perform the additional operation of: instructing one or more network devices, probes, storage device(s), Element Management Systems, Data Lakes, and Data Warehouses to capture only event data records for failures for dependent REST-APIs for the first period of time.

System Embodiment 24B. The system of System Embodiment 1, wherein the first processor further controls the analytics system to perform the additional operation of: instructing one or more network devices, probes, storage device(s), Element Management Systems, Data Lakes, and Data Warehouses to store only event data records for failures for dependent REST-APIs for the first period of time.

System Embodiment 25. The system of System Embodiment 1, wherein the first processor further controls the analytics system to perform the additional operation of: making a network configuration change in response to determining a most likely failure cause scenario for said first base REST-API (Z) to be the failure cause scenario associated with the identified CL-KPI having the highest CL-KPI value.

System Embodiment 26. The system of System Embodiment 1, wherein the first processor further controls the analytics system to perform the additional operation of: sending a notification message to an operator in response to determining a most likely failure cause scenario for said first base REST-API (Z) to be the failure cause scenario associated with the identified CL-KPI having the highest CL-KPI value and that the highest CL-KPI value is above a first threshold value.

First List of Exemplary Numbered Non-Transitory Computer Readable Medium Embodiments:

Non-transitory Computer Readable Medium Embodiment 1

A non-transitory computer readable medium including a first set of computer executable instructions which when executed by a processor of a node cause the node to: generate a plurality of different cross-layer key performance indicators (CL-KPIs) from a set of event data records corresponding to a first period of time and a first base REST-API (Z), each CL-KPI in said plurality of different CL-KPIs being for a different failure cause scenario (e.g., debug scenario); identify a CL-KPI in said plurality of different CL-KPIs corresponding to the first period of time and said first base REST-API having a highest CL-KPI value (which models the failure rate across a number of REST-APIs that can lead to a failure of the first base REST-API); and determine a most likely failure cause scenario for said first base REST-API (Z) to be the failure cause scenario associated with the identified CL-KPI having the highest CL-KPI value.

In some embodiments, one or more of the elements, systems and/or devices are implemented on a compute node in the cloud. In some embodiments, the analytics system 1010 and 110 of system 1000 and 100 are implemented as virtual devices and/or virtual network functions on a compute node in the cloud.

In various embodiments nodes and/or elements described herein are implemented using one or more components to perform the steps corresponding to one or more methods, for example, message reception, signal processing, sending, comparing, determining, KPI generation, event data capture, event data record generation, filtering, protocol analysis, dashboard generation, REST-API analysis, debug scenario analysis, call flow analysis, and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border, network nodes and/or network equipment devices, including a processor configured to implement one, multiple or all of the steps of one or more methods of the invention.

In some embodiments, the processor or processors, e.g., GPUs and/or CPUs, of one or more devices, e.g., computing nodes, are configured to perform the steps of the methods described as being performed by the computing nodes, e.g., SBC, SLB, DB. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node with a processor which includes a component corresponding to each of the steps of the various described methods performed by the device in which the processor is included. In some but not all embodiments a device, e.g., computing node, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., GPU or CPU, configured to implement some or all of the steps of the methods described herein. The processor may be for use in a computer node described in the present application.

Numerous additional variations on the methods and apparatus of the various embodiments described above will be apparent to those skilled in the art in view of the above description. Such variations and embodiments are to be considered within the scope of the invention.

What is claimed is:

1. A method comprising:

generating a plurality of different cross-layer key performance indicators (CL-KPIs) from a set of event data records corresponding to a first period of time and a first base protocol, each CL-KPI in said plurality of different CL-KPIs being for a different failure cause scenario, said first base protocol being an application layer protocol corresponding to a first application and being a protocol to which a plurality of dependent protocols correspond;

identifying a CL-KPI in said plurality of different CL-KPIs corresponding to the first period of time and said first base protocol having a highest CL-KPI value; and determining a most likely failure cause scenario for said first base protocol to be the failure cause scenario associated with the identified CL-KPI having the highest CL-KPI value;

wherein the set of event data records corresponding to the first period of time includes a plurality of subsets of event data records for the first period of time, said plurality of subsets of event data records for the first period of time including at least a first subset of event data records, a second subset of event data records, and a third subset of event data records;

wherein the first subset of event data records includes event data records corresponding to the first base protocol for the first period of time;

wherein the second subset of event data records includes event data records corresponding to a first dependent protocol for the first period of time, said first dependent protocol being one of said one or more dependent protocols; and wherein the third subset of event data records includes event data records corresponding to a second dependent protocol for the first period of time, said second dependent protocol being one of said one or more dependent protocols.

2. The method of claim 1, further comprising:

determining a ranking of the different failure cause scenarios for said first base protocol for the first period of time using said generated CL-KPIs;

wherein said first base protocol is a Session Initiation Protocol; and wherein said more plurality of dependent protocols includes a S1MME interface protocol and a S6a interface protocol.

3. The method of claim 1, wherein said generating a plurality of different cross-layer key performance indicators (CL-KPIs) from a set of event data records corresponding to a first period of time and a first base protocol includes:

generating a first failure count by summing a count of failures of the first base protocol detected during the first period of time and a count of failures of different dependent protocols corresponding to the first base protocol detected during the first period of time; and dividing said first failure count by a value which is based on a sum of the first failure count and a count of successes of the first base protocol for said first period of time.

4. The method of claim 1, wherein said plurality of dependent protocols includes different dependent protocols corresponding to the first base protocol; and wherein the method further comprises:

determining which one of the different dependent protocols corresponding to the first base protocol that can cause the determined most likely failure cause scenario has the highest number of failures for the first period of time.

5. The method of claim 4, further comprising:

determining which portion of a communications network is the most likely source of the failures during the first period of time based on which dependent protocol of said different dependent protocols had the determined highest number of failures for the first period of time.

6. The method of claim 1, wherein the plurality of different cross-layer key performance indicators depends on a count of a number of dependent protocol failures of the plurality of dependent protocols but does not depend on a count of a number of dependent protocol successes of the plurality of dependent protocols for said first period of time.

7. The method of claim 6, wherein the plurality of different cross-layer key performance indicators further depends on a count of a number of said first base protocol successes for said first period of time.

8. The method of claim 7, further comprising:

generating a visual dashboard on a display device, said visual dashboard including the identified cross-layer key performance indicator and the failures corresponding to each dependent protocol of the plurality of dependent protocols for the first period of time.

9. The method of claim 1, wherein the set of event data records for the first period of time excludes event data records for the first dependent protocol and the second dependent protocol corresponding to successful events.

10. The method of claim 1, further comprising:

capturing or storing only event data records for failures for said plurality of dependent protocols for the first period of time.

11. The method of claim 1, further comprising:

automatically making a network configuration change in response to determining a most likely failure cause scenario for said first base protocol to be the failure cause scenario associated with the identified CL-KPI having the highest CL-KPI value.

12. The method of claim 1, further comprising:

generating a plurality of different cross-layer key performance indicators (CL-KPIs) from a set of event data records corresponding to a second period of time and a first Representative State Transfer-Application Programming Interface (REST-API), each CL-KPI in said plurality of different CL-KPIs being for a different failure cause scenario, each of said CL-KPI modeling a failure rate across a number of different REST-APIs that can lead to a failure of the first REST-API;

identifying a CL-KPI in said plurality of different CL-KPIs corresponding to the second period of time and said first REST-API having a highest CL-KPI value, and determining a most likely failure cause scenario for said first REST-API to be the failure cause scenario associated with the identified CL-KPI having the highest CL-KPI value.

13. The method of claim 12, further comprising: determining a ranking of the different failure cause scenarios for said first REST-API for the second period of time using said generated CL-KPIs.

14. The method of claim 12, wherein generating a plurality of different cross-layer key performance indicators (CL-KPIs) from a set of event data records corresponding to a second period of time and a first REST-API includes:

generating a first failure count by summing a count of failures of the first REST-API detected during the second period of time and a count of failures of different REST-APIs corresponding to the first REST-API detected during the second period of time, said different REST-APIs upon failing causing a failure of the first REST-API; and dividing said first failure count by a value which is based on a sum of the first failure count and a count of successes of the first REST-API for said second period of time.

15. The method of claim 14, further comprising:

generating a visual dashboard on a display device, said visual dashboard including: (i) an identification of a failure call scenario, (ii) a failure rate over the second period of time corresponding to the failure call scenario, and (iii) a breakdown of the different REST-API failures for each of the different REST-APIs.

16. The method of claim 1, wherein said first base protocol is Session Initiation Protocol (SIP) or Hypertext Transfer Protocol (HTTP).

17. The method of claim 1, wherein said plurality of dependent protocols are protocols used to provide the first application.

18. A non-transitory computer readable medium including a first set of computer executable instructions which when executed by a processor of a node cause the node to:

generate a plurality of different cross-layer key performance indicators (CL-KPIs) from a set of event data records corresponding to a first period of time and a first base protocol, each CL-KPI in said plurality of different CL-KPIs being for a different failure cause scenario, said first base protocol being an application layer protocol corresponding to a first application and being a protocol to which a plurality of dependent protocols correspond;

identify a CL-KPI in said plurality of different CL-KPIs corresponding to the first period of time and said first base protocol having a highest CL-KPI value; and determine a most likely failure cause scenario for said first base protocol to be the failure cause scenario associated with the identified CL-KPI having the highest CL-KPI value;

wherein the set of event data records corresponding to the first period of time includes a plurality of subsets of event data records for the first period of time, said plurality of subsets of event data records for the first period of time including at least a first subset of event data records, a second subset of event data records, and a third subset of event data records;

wherein the first subset of event data records includes event data records corresponding to the first base protocol for the first period of time;

wherein the second subset of event data records includes event data records corresponding to a first dependent protocol for the first period of time, said first dependent protocol being one of said plurality of dependent protocols; and wherein the third subset of event data records includes event data records corresponding to a second dependent protocol for the first period of time, said second dependent protocol being one of said plurality of dependent protocols.

19. An analytics system comprising:

memory; and a first processor, the first processor controlling the analytics system to perform the following operations:

generating a plurality of different cross-layer key performance indicators (CL-KPIs) from a set of event data records corresponding to a first period of time and a first base protocol, each CL-KPI in said plurality of different CL-KPIs being for a different failure cause scenario, said first base protocol being an application layer protocol corresponding to a first application and being a protocol to which a plurality of dependent protocols correspond;

identifying a CL-KPI in said plurality of different CL-KPIs corresponding to the first period of time and said first base protocol having a highest CL-KPI value; and determining a most likely failure cause scenario for said first base protocol to be the failure cause scenario associated with the identified CL-KPI having the highest CL-KPI value;

wherein the set of event data records corresponding to the first period of time includes a plurality of subsets of event data records for the first period of time, said plurality of subsets of event data records for the first period of time including at least a first subset of event data records, a second subset of event data records, and a third subset of event data records:

wherein the first subset of event data records includes event data records corresponding to the first base protocol for the first period of time;

wherein the second subset of event data records includes event data records corresponding to a first dependent protocol for the first period of time, said first dependent protocol being one of said plurality of dependent protocols; and wherein the third subset of event data records includes event data records corresponding to a second dependent protocol for the first period of time, said second dependent protocol being one of said plurality of dependent protocols.

20. The analytics system of claim 19, wherein said generating a plurality of different cross-layer key performance indicators (CL-KPIs) from a set of event data records corresponding to a first period of time and a first base protocol includes:

generating a first failure count by summing a count of failures of the first base protocol detected during the first period of time and a count of failures of different dependent protocols corresponding to the first base protocol detected during the first period of time; and dividing said first failure count by a value which is based on a sum of the first failure count and a count of successes of the first base protocol for said first period of time.

21. The analytics system of claim 19, wherein the plurality of different cross-layer key performance indicators depends on a count of a number of dependent protocol failures of the plurality of dependent protocols but does not depend on a count of a number of dependent protocol successes of the plurality of dependent protocols for said first period of time.

* * * * *